(12) United States Patent
Raleigh et al.

(10) Patent No.: US 11,665,186 B2
(45) Date of Patent: *May 30, 2023

(54) COMMUNICATIONS DEVICE WITH SECURE DATA PATH PROCESSING AGENTS

(71) Applicant: Headwater Research LLC, Tyler, TX (US)

(72) Inventors: Gregory G. Raleigh, Woodside, CA (US); James Lavine, Corte Madera, CA (US); Alireza Raissinia, Monte Sereno, CA (US); Michael J. Sabin, Sunnyvale, CA (US)

(73) Assignee: HEADWATER RESEARCH LLC, Tyler, TX (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/008,031

(22) Filed: Aug. 31, 2020

(65) Prior Publication Data

US 2021/0120025 A1    Apr. 22, 2021

Related U.S. Application Data

(60) Continuation of application No. 15/977,731, filed on May 11, 2018, now Pat. No. 10,771,980, which is a
(Continued)

(51) Int. Cl.
*H04L 29/06* (2006.01)
*H04L 9/40* (2022.01)
(Continued)

(52) U.S. Cl.
CPC ........ *H04L 63/1425* (2013.01); *H04L 41/046* (2013.01); *H04W 12/12* (2013.01); *H04W 12/128* (2021.01); *G06F 21/575* (2013.01)

(58) Field of Classification Search
CPC ............... H04L 63/1425; H04L 41/046; G06F 15/73; G06F 21/575; G06Q 40/025;
(Continued)

(56) References Cited

U.S. PATENT DOCUMENTS

| 5,131,020 A | 7/1992 | Liebesny et al. |
| 5,283,904 A | 2/1994 | Carson et al. |
| 5,325,532 A | 6/1994 | Crosswy et al. |
| 5,572,528 A | 11/1996 | Shuen |
| 5,577,100 A | 11/1996 | McGregor et al. |

(Continued)

FOREIGN PATENT DOCUMENTS

| CA | 2688553 A1 | 12/2008 |
| CN | 1310401 A | 8/2001 |

(Continued)

OTHER PUBLICATIONS

Nuzman et al., "A compund model for TCP connection arrivals for LAN and WAN applications," Oct. 22, 2002.
(Continued)

*Primary Examiner* — Andrew Joseph Rudy
(74) *Attorney, Agent, or Firm* — Farjami & Farjami LLP

(57) ABSTRACT

Secure device data records (DDRs) are provided. In some embodiments, a system for secure DDRs includes a processor of a wireless communication device for wireless communication with a wireless network, in which the processor is configured with a secure execution environment, and in which the secure execution environment is configured to: monitor service usage of the wireless communication device with the wireless network; and generate a plurality of device data records of the monitored service usage of the wireless communication device with the wireless network, in which each device data record is associated with a unique sequence order identifier; and a memory coupled to the processor and configured to provide the processor with instructions. In
(Continued)

some embodiments, the secure execution environment is located in an application processor, in a modem processor, and/or in a subscriber identity module (SIM).

18 Claims, 16 Drawing Sheets

Related U.S. Application Data continuation of application No. 15/158,522, filed on May 18, 2016, now Pat. No. 9,980,146, which is a continuation of application No. 14/272,274, filed on May 7, 2014, now abandoned, which is a division of application No. 13/247,998, filed on Sep. 28, 2011, now Pat. No. 8,725,123, which is a continuation-in-part of application No. 13/134,028, filed on May 25, 2011, now Pat. No. 8,589,541, which is a continuation-in-part of application No. 12/695,019, filed on Jan. 27, 2010, now Pat. No. 8,275,830, which is a continuation-in-part of application No. 12/695,020, filed on Jan. 27, 2010, now Pat. No. 8,406,748, which is a continuation-in-part of application No. 12/694,455, filed on Jan. 27, 2010, now Pat. No. 8,402,111, which is a continuation-in-part of application No. 13/134,005, filed on May 25, 2011, now Pat. No. 8,635,335, which is a continuation-in-part of application No. 12/695,021, filed on Jan. 27, 2010, now Pat. No. 8,346,225, which is a continuation-in-part of application No. 12/380,780, filed on Mar. 2, 2009, now Pat. No. 8,839,388.

(60) Provisional application No. 61/389,547, filed on Oct. 4, 2010, provisional application No. 61/387,243, filed on Sep. 28, 2010, provisional application No. 61/387,247, filed on Sep. 28, 2010, provisional application No. 61/407,358, filed on Oct. 27, 2010, provisional application No. 61/418,507, filed on Dec. 1, 2010, provisional application No. 61/418,509, filed on Dec. 1, 2010, provisional application No. 61/420,727, filed on Dec. 7, 2010, provisional application No. 61/422,565, filed on Dec. 13, 2010, provisional application No. 61/422,572, filed on Dec. 13, 2010, provisional application No. 61/422,574, filed on Dec. 13, 2010, provisional application No. 61/435,564, filed on Jan. 24, 2011, provisional application No. 61/472,606, filed on Apr. 6, 2011, provisional application No. 61/348,022, filed on May 25, 2010, provisional application No. 61/381,159, filed on Sep. 9, 2010, provisional application No. 61/381,162, filed on Sep. 9, 2010, provisional application No. 61/384,456, filed on Sep. 20, 2010, provisional application No. 61/385,020, filed on Sep. 21, 2010, provisional application No. 61/264,126, filed on Nov. 24, 2009, provisional application No. 61/270,353, filed on Jul. 6, 2009, provisional application No. 61/275,208, filed on Aug. 25, 2009, provisional application No. 61/237,753, filed on Aug. 28, 2009, provisional application No. 61/264,120, filed on Nov. 24, 2009, provisional application No. 61/252,151, filed on Oct. 15, 2009, provisional application No. 61/252,153, filed on Oct. 15, 2009, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009.

(51) Int. Cl.
| | |
|---|---|
| *H04L 41/046* | (2022.01) |
| *H04W 12/12* | (2021.01) |
| *H04W 12/128* | (2021.01) |
| *G06F 21/57* | (2013.01) |

(58) Field of Classification Search
CPC ........ G06Q 30/06; H04W 4/24; H04W 28/10; H04W 28/0289; H04W 84/12; H04W 12/12; H04W 8/18; H04W 12/08; H04W 24/10; H04W 12/06; H04M 15/8083; H04M 15/00; H04M 15/68; H04M 2215/0192; H04M 24/00; H04M 15/58; H04M 2215/0188; H04M 15/61; H04M 15/66; H04M 15/8214; H04M 15/846; H04M 15/83; H04M 15/852; H04M 15/46; H04M 15/70; H04M 15/80; H04M 15/72; H04M 15/723
USPC ............ 726/1; 709/203, 217, 219, 223, 224; 705/16, 28–32; 455/405, 406, 414.1, 455/432.1, 456.1; 370/252, 259, 328; 340/5.1
See application file for complete search history.

(56) References Cited

U.S. PATENT DOCUMENTS

| | | |
|---|---|---|
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,751,719 A | 5/1998 | Chen et al. |
| 5,754,953 A | 5/1998 | Briancon et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,915,226 A | 6/1999 | Martineau |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,047,270 A | 4/2000 | Joao et al. |
| 6,058,434 A | 5/2000 | Wilt et al. |
| 6,061,571 A | 5/2000 | Tamura |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,115,823 A | 9/2000 | Velasco et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A | 12/2000 | Voit et al. |
| 6,185,576 B1 | 2/2001 | Mcintosh |
| 6,198,915 B1 | 3/2001 | McGregor et al. |
| 6,219,786 B1 | 4/2001 | Cunningham et al. |
| 6,226,277 B1 | 5/2001 | Chuah |
| 6,246,870 B1 | 6/2001 | Dent et al. |
| 6,263,055 B1 | 7/2001 | Garland et al. |
| 6,292,828 B1 | 9/2001 | Williams |
| 6,317,584 B1 | 11/2001 | Abu-Amara et al. |

(56) References Cited

U.S. PATENT DOCUMENTS

| | | |
|---|---|---|
| 6,370,139 B2 | 4/2002 | Redmond |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B2 | 6/2002 | Lazaridis et al. |
| 6,418,147 B1 | 7/2002 | Wiedeman |
| 6,438,575 B1 | 8/2002 | Khan et al. |
| 6,445,777 B1 | 9/2002 | Clark |
| 6,449,479 B1 | 9/2002 | Sanchez |
| 6,466,984 B1 | 10/2002 | Naveh et al. |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,522,629 B1 | 2/2003 | Anderson, Sr. |
| 6,526,066 B1 | 2/2003 | Weaver |
| 6,532,235 B1 | 3/2003 | Benson et al. |
| 6,532,579 B2 | 3/2003 | Sato et al. |
| 6,535,855 B1 | 3/2003 | Cahill et al. |
| 6,535,949 B1 | 3/2003 | Parker |
| 6,539,082 B1 | 3/2003 | Lowe et al. |
| 6,542,465 B1 | 4/2003 | Wang |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,591,098 B1 | 7/2003 | Shieh et al. |
| 6,598,034 B1 | 7/2003 | Kloth |
| 6,601,040 B1 | 7/2003 | Kolls |
| 6,603,969 B1 | 8/2003 | Vuoristo et al. |
| 6,603,975 B1 | 8/2003 | Inouchi et al. |
| 6,606,744 B1 | 8/2003 | Mikurak |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,694,362 B1 | 2/2004 | Secor et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,732,176 B1 | 5/2004 | Stewart et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,760,417 B1 | 7/2004 | Wallenius |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,842,628 B1 | 1/2005 | Arnold et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gurnani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,202 B2 | 10/2005 | Heinonen et al. |
| 6,959,393 B2 | 10/2005 | Hollis et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,970,927 B1 | 11/2005 | Stewart et al. |
| 6,982,733 B1 | 1/2006 | McNally et al. |
| 6,983,370 B2 | 1/2006 | Eaton et al. |
| 6,996,062 B1 | 2/2006 | Freed et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,000,001 B2 | 2/2006 | Lazaridis |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,020,781 B1 | 3/2006 | Saw et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,031,733 B2 | 4/2006 | Alminana et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibl et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 | 9/2006 | Campen |
| 7,113,780 B2 | 9/2006 | Mckenna et al. |
| 7,113,997 B2 | 9/2006 | Jayapalan et al. |
| 7,120,133 B1 | 10/2006 | Joo et al. |
| 7,131,578 B2 | 11/2006 | Paschini et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,165,040 B2 | 1/2007 | Ehrman et al. |
| 7,167,078 B2 | 1/2007 | Pourchot |
| 7,174,156 B1 | 2/2007 | Mangal |
| 7,174,174 B2 | 2/2007 | Boris et al. |
| 7,177,919 B1 | 2/2007 | Truong et al. |

(56) References Cited

U.S. PATENT DOCUMENTS

| | | |
|---|---|---|
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,200,551 B1 | 4/2007 | Senez |
| 7,203,169 B1 | 4/2007 | Okholm et al. |
| 7,203,721 B1 | 4/2007 | Ben-Efraim et al. |
| 7,203,752 B2 | 4/2007 | Rice et al. |
| 7,209,664 B1 | 4/2007 | McNicol et al. |
| 7,212,491 B2 | 5/2007 | Koga |
| 7,219,123 B1 | 5/2007 | Fiechter et al. |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,269,157 B2 | 9/2007 | Klinker et al. |
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,315,892 B2 | 1/2008 | Freimuth et al. |
| 7,317,699 B2 | 1/2008 | Godfrey et al. |
| 7,318,111 B2 | 1/2008 | Zhao |
| 7,320,029 B2 | 1/2008 | Rinne et al. |
| 7,320,781 B2 | 1/2008 | Lambert et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,340,244 B1 | 3/2008 | Osborne et al. |
| 7,340,772 B2 | 3/2008 | Panasyuk et al. |
| 7,346,410 B2 | 3/2008 | Uchiyama |
| 7,349,695 B2 | 3/2008 | Oommen et al. |
| 7,349,698 B2 | 3/2008 | Gallagher et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,366,934 B1 | 4/2008 | Narayan et al. |
| 7,369,848 B2 | 5/2008 | Jiang |
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,389,412 B2 | 6/2008 | Sharma et al. |
| 7,391,724 B2 | 6/2008 | Alakoski et al. |
| 7,395,056 B2 | 7/2008 | Petermann |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanah |
| 7,418,257 B2 | 8/2008 | Kim |
| 7,421,004 B2 | 9/2008 | Feher |
| 7,423,971 B1 | 9/2008 | Mohaban et al. |
| 7,428,750 B1 | 9/2008 | Dunn et al. |
| 7,433,362 B2 | 10/2008 | Mallya et al. |
| 7,436,816 B2 | 10/2008 | Mehta et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,466,652 B2 | 12/2008 | Lau et al. |
| 7,467,160 B2 | 12/2008 | McIntyre |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,489,918 B2 | 2/2009 | Zhou et al. |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,505,756 B2 | 3/2009 | Bahl |
| 7,505,795 B1 | 3/2009 | Lim et al. |
| 7,508,794 B2 | 3/2009 | Feather et al. |
| 7,508,799 B2 | 3/2009 | Sumner et al. |
| 7,512,128 B2 | 3/2009 | DiMambro et al. |
| 7,512,131 B2 | 3/2009 | Svensson et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,522,549 B2 | 4/2009 | Karaoguz et al. |
| 7,522,576 B2 | 4/2009 | Du et al. |
| 7,526,541 B2 | 4/2009 | Roese et al. |
| 7,529,204 B2 | 5/2009 | Bourlas et al. |
| 7,533,158 B2 | 5/2009 | Grannan et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,539,862 B2 | 5/2009 | Edgett et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,875 B2 | 6/2009 | Mikkelsen et al. |
| 7,548,976 B2 | 6/2009 | Bahl et al. |
| 7,551,921 B2 | 6/2009 | Petermann |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,565,328 B1 | 7/2009 | Donner |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,584,298 B2 | 9/2009 | Klinker et al. |
| 7,585,217 B2 | 9/2009 | Lutnick et al. |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,599,714 B2 | 10/2009 | Kuzminskiy |
| 7,602,746 B2 | 10/2009 | Calhoun et al. |
| 7,603,710 B2 | 10/2009 | Harvey et al. |
| 7,606,357 B2 | 10/2009 | Daigle |
| 7,606,918 B2 | 10/2009 | Holzman et al. |
| 7,607,041 B2 | 10/2009 | Kraemer et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |

(56) References Cited

U.S. PATENT DOCUMENTS

| | | |
|---|---|---|
| 7,610,057 B2 | 10/2009 | Bahl et al. |
| 7,610,328 B2 | 10/2009 | Haase et al. |
| 7,610,396 B2 | 10/2009 | Taglienti et al. |
| 7,612,712 B2 | 11/2009 | LaMance et al. |
| 7,613,444 B2 | 11/2009 | Lindqvist et al. |
| 7,614,051 B2 | 11/2009 | Glaum et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,620,383 B2 | 11/2009 | Taglienti et al. |
| 7,627,314 B2 | 12/2009 | Carlson et al. |
| 7,627,600 B2 | 12/2009 | Citron et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,253 B2 | 12/2009 | Plestid et al. |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,644,414 B2 | 1/2010 | Smith et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,656,271 B2 | 2/2010 | Ehrman et al. |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,668,966 B2 | 2/2010 | Klinker et al. |
| 7,676,673 B2 | 3/2010 | Weller et al. |
| 7,680,086 B2 | 3/2010 | Eglin |
| 7,681,226 B2 | 3/2010 | Kraemer et al. |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,688,792 B2 | 3/2010 | Babbar et al. |
| 7,693,107 B2 | 4/2010 | De Froment |
| 7,693,720 B2 | 4/2010 | Kennewick et al. |
| 7,697,540 B2 | 4/2010 | Haddad et al. |
| 7,707,320 B2 | 4/2010 | Singhai et al. |
| 7,710,932 B2 | 5/2010 | Muthuswamy et al. |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 | 5/2010 | Gopi et al. |
| 7,720,960 B2 | 5/2010 | Pruss et al. |
| 7,721,296 B2 | 5/2010 | Ricagni |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,742,961 B2 | 6/2010 | Aaron et al. |
| 7,743,119 B2 | 6/2010 | Friend et al. |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,509 B2 | 7/2010 | Rajagopalan et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,769,397 B2 | 8/2010 | Funato et al. |
| 7,770,785 B2 | 8/2010 | Jha et al. |
| 7,774,323 B2 | 8/2010 | Helfman |
| 7,774,412 B1 | 8/2010 | Schnepel |
| 7,774,456 B1 | 8/2010 | Lownsbrough et al. |
| 7,778,176 B2 | 8/2010 | Morford |
| 7,778,643 B2 | 8/2010 | Laroia et al. |
| 7,783,754 B2 | 8/2010 | Morford et al. |
| 7,788,700 B1 | 8/2010 | Feezel et al. |
| 7,792,257 B1 | 9/2010 | Vanier et al. |
| 7,792,538 B2 | 9/2010 | Kozisek |
| 7,792,708 B2 | 9/2010 | Alva |
| 7,797,019 B2 | 9/2010 | Friedmann |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,522 B2 | 9/2010 | Schlüter et al. |
| 7,805,606 B2 | 9/2010 | Birger et al. |
| 7,809,351 B1 | 10/2010 | Panda et al. |
| 7,809,372 B2 | 10/2010 | Rajaniemi |
| 7,813,746 B2 | 10/2010 | Rajkotia |
| 7,817,615 B1 | 10/2010 | Breau et al. |
| 7,817,983 B2 | 10/2010 | Cassett et al. |
| 7,822,837 B1 | 10/2010 | Urban et al. |
| 7,822,849 B2 | 10/2010 | Titus |
| 7,826,427 B2 | 11/2010 | Sood et al. |
| 7,826,607 B1 | 11/2010 | De Carvalho Resende et al. |
| 7,835,275 B1 | 11/2010 | Swan et al. |
| 7,843,831 B2 | 11/2010 | Morrill et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,170 B1 | 12/2010 | Hargens et al. |
| 7,849,477 B2 | 12/2010 | Cristofalo et al. |
| 7,853,250 B2 | 12/2010 | Harvey et al. |
| 7,853,255 B2 | 12/2010 | Karaoguz et al. |
| 7,853,656 B2 | 12/2010 | Yach et al. |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,868,814 B1 | 1/2011 | Bergman |
| 7,873,001 B2 | 1/2011 | Silver |
| 7,873,344 B2 | 1/2011 | Bowser et al. |
| 7,873,346 B2 | 1/2011 | Petersson et al. |
| 7,873,540 B2 | 1/2011 | Arumugam |
| 7,873,705 B2 | 1/2011 | Kalish |
| 7,873,985 B2 | 1/2011 | Baum |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,882,247 B2 | 2/2011 | Sturniolo et al. |
| 7,882,560 B2 | 2/2011 | Kraemer et al. |
| 7,885,644 B2 | 2/2011 | Gallagher et al. |
| 7,886,047 B2 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,890,581 B2 | 2/2011 | Rao et al. |
| 7,894,431 B2 | 2/2011 | Goring et al. |
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,908,358 B1 | 3/2011 | Prasad et al. |
| 7,911,975 B2 | 3/2011 | Droz et al. |
| 7,912,025 B2 | 3/2011 | Pattenden et al. |

(56) References Cited

U.S. PATENT DOCUMENTS

| | | |
|---|---|---|
| 7,912,056 B1 | 3/2011 | Brassem |
| 7,916,707 B2 | 3/2011 | Fontaine |
| 7,917,130 B1 | 3/2011 | Christensen et al. |
| 7,920,529 B1 | 4/2011 | Mahler et al. |
| 7,921,463 B2 | 4/2011 | Sood et al. |
| 7,925,740 B2 | 4/2011 | Nath et al. |
| 7,925,778 B1 | 4/2011 | Wijnands et al. |
| 7,929,446 B2 | 4/2011 | Bozarth et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,930,553 B2 | 4/2011 | Satarasinghe et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,937,470 B2 | 5/2011 | Curley et al. |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,470 B1 | 5/2011 | Cohen et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,967,682 B2 | 6/2011 | Huizinga |
| 7,969,950 B2 | 6/2011 | Iyer et al. |
| 7,970,350 B2 | 6/2011 | Sheynman |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,979,889 B2 | 7/2011 | Gladstone et al. |
| 7,979,896 B2 | 7/2011 | McMurtry et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,449 B1 | 7/2011 | Marolia et al. |
| 7,987,496 B2 | 7/2011 | Bryce et al. |
| 7,987,510 B2 | 7/2011 | Kocher et al. |
| 7,990,049 B2 | 8/2011 | Shioya |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,726 B1 | 8/2011 | Bao |
| 8,005,913 B1 | 8/2011 | Carlander |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,010,623 B2 | 8/2011 | Fitch et al. |
| 8,010,990 B2 | 8/2011 | Ferguson et al. |
| 8,015,133 B1 | 9/2011 | Wu et al. |
| 8,015,234 B2 | 9/2011 | Lum et al. |
| 8,015,249 B2 | 9/2011 | Nayak et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,024,424 B2 | 9/2011 | Freimuth et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 3,064,418 A1 | 11/2011 | Maki |
| 8,050,275 B1 | 11/2011 | Iyer |
| 8,050,690 B2 | 11/2011 | Neeraj |
| 8,050,705 B2 | 11/2011 | Sicher et al. |
| 8,054,778 B2 | 11/2011 | Polson |
| 8,059,530 B1 | 11/2011 | Cole |
| 8,060,017 B2 | 11/2011 | Schlicht et al. |
| 8,060,463 B1 | 11/2011 | Spiegel |
| 8,060,603 B2 | 11/2011 | Caunter et al. |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,361 B2 | 1/2012 | Hagan |
| 8,090,616 B2 | 1/2012 | Proctor, Jr. et al. |
| 8,091,087 B2 | 1/2012 | Ali et al. |
| 8,094,551 B2 | 1/2012 | Huber et al. |
| 8,095,112 B2 | 1/2012 | Chow et al. |
| 8,095,124 B2 | 1/2012 | Balia |
| 8,095,175 B2 | 1/2012 | Todd et al. |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,108,680 B2 | 1/2012 | Murray |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,121,117 B1 | 2/2012 | Amdahl et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,301 B2 | 3/2012 | Ahmed et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcelling et al. |
| 8,135,657 B2 | 3/2012 | Kapoor et al. |

(56) References Cited

U.S. PATENT DOCUMENTS

| | | | |
|---|---|---|---|
| 8,140,690 B2 | 3/2012 | Ly et al. |
| 8,144,591 B2 | 3/2012 | Ghai et al. |
| 8,144,853 B1 | 3/2012 | Aboujaoude et al. |
| 8,145,194 B2 | 3/2012 | Yoshikawa et al. |
| 8,146,142 B2 | 3/2012 | Lortz et al. |
| 8,149,748 B2 | 4/2012 | Bata et al. |
| 8,149,771 B2 | 4/2012 | Khivesara et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,152,246 B2 | 4/2012 | Miller et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,159,520 B1 | 4/2012 | Dhanoa et al. |
| 8,160,015 B2 | 4/2012 | Rashid et al. |
| 8,160,056 B2 | 4/2012 | Van der Merwe et al. |
| 8,160,554 B2 | 4/2012 | Gosselin et al. |
| 8,160,555 B2 | 4/2012 | Gosselin et al. |
| 8,160,556 B2 | 4/2012 | Gosselin et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,175,966 B2 | 5/2012 | Steinberg et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,087 B2 | 5/2012 | Fisher et al. |
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,204,794 B1 | 6/2012 | Peng et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,214,890 B2 | 7/2012 | Kirovski et al. |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,230,061 B2 | 7/2012 | Hassan et al. |
| 8,233,433 B2 | 7/2012 | Kalhan |
| 8,233,878 B2 | 7/2012 | Gosnell et al. |
| 8,233,883 B2 | 7/2012 | De Froment |
| 8,233,895 B2 | 7/2012 | Tysowski |
| 8,234,583 B2 | 7/2012 | Sloo et al. |
| 8,238,287 B1 | 8/2012 | Gopi et al. |
| 8,238,913 B1 | 8/2012 | Bhattacharyya et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,264,965 B2 | 9/2012 | Dolganow et al. |
| 8,265,004 B2 | 9/2012 | Toutonghi |
| 8,266,249 B2 | 9/2012 | Hu |
| 8,266,269 B2 | 9/2012 | Short et al. |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,197 B2 * | 10/2012 | Preiss ............... H04L 67/2814 |
| | | 455/414.1 |
| 8,285,249 B2 | 10/2012 | Baker et al. |
| 8,285,992 B2 | 10/2012 | Mathur et al. |
| 8,290,820 B2 | 10/2012 | Plastina et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,505 B2 | 11/2012 | Bennett |
| 8,306,518 B1 | 11/2012 | Gailloux et al. |
| 8,306,741 B2 | 11/2012 | Tu |
| 8,307,067 B2 | 11/2012 | Ryan |
| 8,307,095 B2 | 11/2012 | Clark et al. |
| 8,310,943 B2 | 11/2012 | Mehta et al. |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,902 B2 | 11/2012 | Moring et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,359 B2 | 12/2012 | Kauffman |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,339,991 B2 | 12/2012 | Biswas et al. |
| 8,340,625 B1 | 12/2012 | Johnson et al. |
| 8,340,628 B2 | 12/2012 | Taylor et al. |
| 8,340,644 B2 | 12/2012 | Sigmund et al. |
| 8,340,678 B1 | 12/2012 | Pandey |

(56) References Cited

U.S. PATENT DOCUMENTS

| | | |
|---|---|---|
| 8,340,718 B2 | 12/2012 | Colonna et al. |
| 8,346,023 B2 | 1/2013 | Lin |
| 8,346,210 B2 | 1/2013 | Balsan et al. |
| 8,346,225 B2 | 1/2013 | Raleigh |
| 8,346,923 B2 | 1/2013 | Rowles et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,355,570 B2 | 1/2013 | Karsanbhai et al. |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,102 B2 | 2/2013 | Luft et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,379,847 B2 | 2/2013 | Bell et al. |
| 8,380,247 B2 | 2/2013 | Engstrom |
| 8,380,804 B2 | 2/2013 | Jain et al. |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 | 3/2013 | Raleigh |
| 8,392,982 B2 | 3/2013 | Harris et al. |
| 8,396,458 B2 | 3/2013 | Raleigh |
| 8,396,929 B2 | 3/2013 | Helfman et al. |
| 8,401,906 B2 | 3/2013 | Ruckart |
| 8,401,968 B1 | 3/2013 | Schattauer et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,406,756 B1 | 3/2013 | Reeves et al. |
| 8,407,472 B2 | 3/2013 | Hao et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B1 | 4/2013 | Wang |
| 8,413,245 B2 | 4/2013 | Kraemer et al. |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,437,734 B2 | 5/2013 | Ray et al. |
| 8,441,955 B2 | 5/2013 | Wilkinson et al. |
| 8,442,015 B2 | 5/2013 | Behzad et al. |
| 8,442,507 B2 | 5/2013 | Duggal et al. |
| 8,443,390 B2 | 5/2013 | Lo et al. |
| 8,446,831 B2 | 5/2013 | Kwan et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,457,603 B2 | 6/2013 | El-Kadri et al. |
| 8,457,609 B2 * | 6/2013 | Tyhurst ............... H04W 4/50 455/414.1 |
| 8,461,958 B2 | 6/2013 | Saenz et al. |
| 8,463,194 B2 | 6/2013 | Erlenback et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,478,840 B2 | 7/2013 | Skutela et al. |
| 8,483,057 B2 | 7/2013 | Cuervo |
| 8,483,135 B2 | 7/2013 | Cai et al. |
| 8,483,694 B2 | 7/2013 | Lewis et al. |
| 8,484,327 B2 | 7/2013 | Werner et al. |
| 8,484,568 B2 | 7/2013 | Rados et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,207 B2 | 7/2013 | Lee |
| 8,495,227 B2 | 7/2013 | Kaminsky et al. |
| 8,495,360 B2 | 7/2013 | Falk et al. |
| 8,495,700 B2 | 7/2013 | Shahbazi |
| 8,495,743 B2 | 7/2013 | Kraemer et al. |
| 8,499,087 B2 | 7/2013 | Hu |
| RE44,412 E | 8/2013 | Naqvi et al. |
| 8,500,533 B2 | 8/2013 | Lutnick et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,574 B2 | 8/2013 | Dvorak et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,510,743 B2 | 8/2013 | Hackborn et al. |
| 8,510,804 B1 | 8/2013 | Bonn et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,526,350 B2 | 9/2013 | Xue et al. |
| 8,527,013 B2 | 9/2013 | Guba et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,531,995 B2 | 9/2013 | Khan et al. |
| 8,532,610 B2 | 9/2013 | Manning Cassett et al. |
| 8,533,341 B2 | 9/2013 | Aguirre et al. |
| 8,533,775 B2 | 9/2013 | Alcorn et al. |
| 8,535,160 B2 | 9/2013 | Lutnick et al. |
| 8,538,394 B2 | 9/2013 | Zimmerman et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,539,561 B2 | 9/2013 | Gupta et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |
| 8,548,428 B2 | 10/2013 | Raleigh |
| 8,549,173 B1 | 10/2013 | Wu et al. |
| 8,549,588 B2 | 10/2013 | Wynn et al. |
| 8,554,876 B2 | 10/2013 | Winsor |
| 8,559,369 B2 | 10/2013 | Barkan |
| 8,561,138 B2 | 10/2013 | Rothman et al. |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |

(56) References Cited

U.S. PATENT DOCUMENTS

| | | |
|---|---|---|
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,584,226 B2 | 11/2013 | Kudla et al. |
| 8,588,240 B2 | 11/2013 | Ramankutty et al. |
| 8,589,541 B2 | 11/2013 | Raleigh et al. |
| 8,589,955 B2 | 11/2013 | Roundtree et al. |
| 8,594,626 B1 | 11/2013 | Woodson et al. |
| 8,594,665 B2 | 11/2013 | Anschutz |
| 8,595,186 B1 | 11/2013 | Mandyam et al. |
| 8,600,850 B2 | 12/2013 | Zabawskyj et al. |
| 8,600,895 B2 | 12/2013 | Felsher |
| 8,601,125 B2 | 12/2013 | Huang et al. |
| 8,605,691 B2 | 12/2013 | Soomro et al. |
| 8,609,911 B1 | 12/2013 | Nicholas et al. |
| 8,611,919 B2 | 12/2013 | Barnes, Jr. |
| 8,615,507 B2 | 12/2013 | Varadarajulu et al. |
| 8,619,735 B2 | 12/2013 | Montemurro et al. |
| 8,620,257 B2 | 12/2013 | Qiu et al. |
| 8,620,281 B2 | 12/2013 | Gosselin et al. |
| 8,621,056 B2 | 12/2013 | Coussemaeker et al. |
| 8,630,314 B2 | 1/2014 | York |
| 8,630,925 B2 | 1/2014 | Bystrom et al. |
| 8,631,428 B2 | 1/2014 | Scott et al. |
| 8,634,425 B2 | 1/2014 | Gorti et al. |
| 8,635,164 B2 | 1/2014 | Rosenhaf et al. |
| 8,635,335 B2 | 1/2014 | Raleigh et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,654,952 B2 | 2/2014 | Wang et al. |
| 8,655,357 B1 | 2/2014 | Gazzard et al. |
| 8,656,472 B2 | 2/2014 | McMurtry et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,670,752 B2 | 3/2014 | Fan et al. |
| 8,675,507 B2 | 3/2014 | Raleigh |
| 8,675,852 B2 | 3/2014 | Maes |
| 8,676,682 B2 | 3/2014 | Kalliola |
| 8,676,925 B1 | 3/2014 | Liu et al. |
| 8,688,671 B2 | 4/2014 | Ramer et al. |
| 8,688,784 B2 | 4/2014 | Zabawskyj et al. |
| 8,693,323 B1 | 4/2014 | McDysan |
| 8,694,772 B2 | 4/2014 | Kao et al. |
| 8,699,355 B2 | 4/2014 | Macias |
| 8,700,729 B2 | 4/2014 | Dua |
| 8,701,015 B2 | 4/2014 | Bonnat |
| 8,701,080 B2 | 4/2014 | Tripathi |
| 8,705,361 B2 | 4/2014 | Venkataraman et al. |
| 8,706,863 B2 | 4/2014 | Fadell |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,724,486 B2 | 5/2014 | Seto et al. |
| 8,725,700 B2 | 5/2014 | Rappaport |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,738,860 B1 | 5/2014 | Griffin et al. |
| 8,739,035 B2 | 5/2014 | Trethewey |
| 8,742,694 B2 | 6/2014 | Bora et al. |
| 8,744,339 B2 | 6/2014 | Halfmann et al. |
| 8,761,711 B2 | 6/2014 | Grignani et al. |
| 8,761,809 B2 | 6/2014 | Faith et al. |
| 8,775,233 B1 | 7/2014 | Lybrook et al. |
| 8,780,857 B2 | 7/2014 | Balasubramanian et al. |
| 8,787,249 B2 | 7/2014 | Giaretta et al. |
| 8,792,857 B2 | 7/2014 | Cai et al. |
| 8,793,304 B2 | 7/2014 | Lu et al. |
| 8,793,758 B2 | 7/2014 | Raleigh et al. |
| 8,798,610 B2 | 8/2014 | Prakash et al. |
| 8,799,440 B2 | 8/2014 | Zhou et al. |
| 8,804,517 B2 | 8/2014 | Oerton |
| 8,804,695 B2 | 8/2014 | Branam |
| 8,811,338 B2 | 8/2014 | Jin et al. |
| 8,811,991 B2 | 8/2014 | Jain et al. |
| 8,812,525 B1 | 8/2014 | Taylor, III |
| 8,818,394 B2 | 8/2014 | Bienas et al. |
| 8,819,253 B2 | 8/2014 | Simeloff et al. |
| 8,825,109 B2 | 9/2014 | Montemurro et al. |
| 8,826,411 B2 | 9/2014 | Moen et al. |
| 8,831,561 B2 | 9/2014 | Sutaria et al. |
| 8,837,322 B2 | 9/2014 | Venkataramanan et al. |
| 8,838,686 B2 | 9/2014 | Getchius |
| 8,838,752 B2 | 9/2014 | Lor et al. |
| 8,839,388 B2 | 9/2014 | Raleigh |
| 8,843,849 B2 | 9/2014 | Neil et al. |
| 8,845,415 B2 | 9/2014 | Lutnick et al. |
| 8,849,262 B2 | 9/2014 | Desai et al. |
| 8,849,297 B2 | 9/2014 | Balasubramanian |
| 8,855,620 B2 | 10/2014 | Sievers et al. |
| 8,856,015 B2 | 10/2014 | Mesaros |
| 8,862,751 B2 | 10/2014 | Faccin et al. |
| 8,863,111 B2 | 10/2014 | Selitser et al. |
| 8,868,725 B2 | 10/2014 | Samba |
| 8,868,727 B2 | 10/2014 | Yumerefendi et al. |
| 8,875,042 B2 | 10/2014 | LeJeune et al. |
| 8,880,047 B2 | 11/2014 | Konicek et al. |
| 8,891,483 B2 | 11/2014 | Connelly et al. |
| 8,891,524 B2 | 11/2014 | Chandrapal |
| 8,898,748 B2 | 11/2014 | Burks et al. |
| 8,908,516 B2 | 12/2014 | Tzamaloukas et al. |
| 8,924,469 B2 | 12/2014 | Raleigh et al. |
| 8,929,374 B2 | 1/2015 | Tönsing et al. |
| 8,930,238 B2 | 1/2015 | Coffman et al. |
| 8,930,551 B2 | 1/2015 | Pandya et al. |
| 8,943,551 B2 | 1/2015 | Ganapathy et al. |
| 8,948,198 B2 | 2/2015 | Nee et al. |
| 8,948,726 B2 | 2/2015 | Smith et al. |
| 8,949,382 B2 | 2/2015 | Cornett et al. |
| 8,949,591 B2 * | 2/2015 | Ovsiannikov ..... H04L 29/08792 713/168 |
| 8,949,597 B1 | 2/2015 | Reeves et al. |
| 8,955,038 B2 | 2/2015 | Nicodemus et al. |
| 8,966,018 B2 | 2/2015 | Bugwadia et al. |
| 8,971,841 B2 | 3/2015 | Menezes et al. |
| 8,971,912 B2 | 3/2015 | Chou et al. |
| 8,977,284 B2 | 3/2015 | Reed |
| 8,995,952 B1 | 3/2015 | Baker et al. |
| 9,002,342 B2 | 4/2015 | Tenhunen et al. |
| 9,008,653 B2 | 4/2015 | Sparks et al. |
| 9,014,059 B2 | 4/2015 | Richardson et al. |
| 9,014,973 B2 | 4/2015 | Ruckart |
| 9,015,331 B2 | 4/2015 | Lai et al. |
| 9,020,467 B2 | 4/2015 | Zhang et al. |
| 9,026,100 B2 | 5/2015 | Castro et al. |
| 9,030,934 B2 | 5/2015 | Shah et al. |
| 9,032,427 B2 | 5/2015 | Gallant et al. |
| 9,049,010 B2 | 6/2015 | Jueneman et al. |
| 9,064,275 B1 | 6/2015 | Lu et al. |
| 9,105,031 B2 | 8/2015 | Shen et al. |
| 9,106,414 B2 | 8/2015 | Laves |
| 9,107,053 B2 | 8/2015 | Davis et al. |
| 9,111,088 B2 | 8/2015 | Ghai et al. |
| 9,135,037 B1 | 9/2015 | Petrescu-Prahova et al. |
| 9,137,286 B1 | 9/2015 | Yuan |
| 9,143,933 B2 | 9/2015 | Ikeda et al. |
| 9,172,553 B2 | 10/2015 | Dawes et al. |
| 9,173,090 B2 | 10/2015 | Tuchman et al. |
| 9,177,455 B2 | 11/2015 | Remer |
| 9,183,524 B2 | 11/2015 | Carter |
| 9,225,847 B2 | 12/2015 | Daymond et al. |
| 9,252,977 B2 | 2/2016 | Levi et al. |
| 9,262,370 B2 | 2/2016 | Hofstaedter et al. |
| 9,265,003 B2 | 2/2016 | Zhao et al. |
| 9,277,433 B2 | 3/2016 | Raleigh et al. |
| 9,282,460 B2 | 3/2016 | Souissi |

(56) References Cited

U.S. PATENT DOCUMENTS

| | | |
|---|---|---|
| 9,286,469 B2 | 3/2016 | Kraemer et al. |
| 9,286,604 B2 | 3/2016 | Aabye et al. |
| 9,288,276 B2 | 3/2016 | Adamczyk et al. |
| 9,313,708 B2 | 4/2016 | Nam et al. |
| 9,325,737 B2 | 4/2016 | Gutowski et al. |
| 9,326,173 B2 | 4/2016 | Luft |
| 9,344,557 B2 | 5/2016 | Gruchala et al. |
| 9,350,842 B2 | 5/2016 | Swanburg et al. |
| 9,363,285 B2 | 6/2016 | Kitamura |
| 9,367,680 B2 | 6/2016 | Mahaffey et al. |
| 9,402,254 B2 | 7/2016 | Kneckt et al. |
| 9,413,546 B2 | 8/2016 | Meier et al. |
| 9,418,381 B2 | 8/2016 | Ahuja et al. |
| 9,419,867 B2 | 8/2016 | Okholm et al. |
| 9,436,805 B1 | 9/2016 | Kravets |
| 9,438,642 B2 | 9/2016 | Alberth, Jr. et al. |
| 9,479,917 B1 | 10/2016 | Gota et al. |
| 9,491,199 B2 | 11/2016 | Raleigh et al. |
| 9,501,803 B2 | 11/2016 | Bilac et al. |
| 9,525,992 B2 | 12/2016 | Rao et al. |
| 9,534,861 B1 | 1/2017 | Kellgren |
| 9,544,397 B2 | 1/2017 | Raleigh et al. |
| 9,557,889 B2 | 1/2017 | Raleigh et al. |
| 9,585,088 B2 * | 2/2017 | Hanson ............ H04W 48/16 |
| 9,589,117 B2 | 3/2017 | Ali et al. |
| 9,609,459 B2 | 3/2017 | Raleigh |
| 9,609,510 B2 | 3/2017 | Raleigh et al. |
| 9,609,544 B2 | 3/2017 | Raleigh et al. |
| 9,615,192 B2 | 4/2017 | Raleigh |
| 9,634,850 B2 | 4/2017 | Taft et al. |
| 9,642,004 B2 | 5/2017 | Wang et al. |
| 9,648,022 B2 | 5/2017 | Peterka et al. |
| 9,673,996 B1 | 6/2017 | Upadhyay et al. |
| 9,680,658 B2 | 6/2017 | Goel et al. |
| 9,681,003 B1 | 6/2017 | Kim et al. |
| 9,691,082 B1 | 6/2017 | Burnett et al. |
| 9,712,443 B1 | 7/2017 | Phaal |
| 9,712,476 B2 | 7/2017 | Boynton et al. |
| 9,749,899 B2 | 8/2017 | Raleigh et al. |
| 9,755,842 B2 | 9/2017 | Raleigh et al. |
| 9,766,873 B2 | 9/2017 | Steigleder |
| 9,852,426 B2 | 12/2017 | Bacastow |
| 9,923,790 B2 | 3/2018 | Patel et al. |
| 9,942,796 B2 | 4/2018 | Raleigh |
| 9,954,975 B2 | 4/2018 | Raleigh et al. |
| 9,986,413 B2 | 5/2018 | Raleigh |
| 10,002,332 B2 | 6/2018 | Spong |
| 10,021,463 B2 | 7/2018 | Qiu et al. |
| 10,024,948 B2 | 7/2018 | Ganick et al. |
| 10,034,220 B2 | 7/2018 | Silver |
| 10,057,775 B2 | 8/2018 | Raleigh et al. |
| 10,064,033 B2 | 8/2018 | Raleigh |
| 10,171,681 B2 | 1/2019 | Raleigh et al. |
| 10,171,988 B2 | 1/2019 | Raleigh et al. |
| 10,171,990 B2 | 1/2019 | Raleigh et al. |
| 10,237,773 B2 | 3/2019 | Raleigh et al. |
| 10,248,996 B2 | 4/2019 | Raleigh |
| 10,264,138 B2 | 4/2019 | Raleigh et al. |
| 10,285,025 B1 | 5/2019 | Baker et al. |
| 10,321,515 B2 | 6/2019 | Shen et al. |
| 10,395,216 B2 | 8/2019 | Coffing |
| 10,462,627 B2 | 10/2019 | Raleigh et al. |
| 10,492,102 B2 | 11/2019 | Raleigh et al. |
| 10,521,781 B1 | 12/2019 | Singfield |
| 10,523,726 B2 | 12/2019 | Pantos et al. |
| 10,536,983 B2 | 1/2020 | Raleigh et al. |
| 10,567,930 B2 | 2/2020 | Silver |
| 10,582,375 B2 | 3/2020 | Raleigh |
| 10,616,818 B2 | 4/2020 | Silver |
| 10,771,980 B2 * | 9/2020 | Raleigh ............ H04W 12/12 |
| 10,783,581 B2 * | 9/2020 | Raleigh ............ G06Q 40/025 |
| 10,798,252 B2 | 10/2020 | Raleigh et al. |
| 10,798,254 B2 | 10/2020 | Raleigh et al. |
| 10,798,558 B2 | 10/2020 | Raleigh et al. |
| 2001/0048738 A1 | 12/2001 | Baniak et al. |
| 2001/0053694 A1 | 12/2001 | Igarashi et al. |
| 2002/0013844 A1 | 1/2002 | Garrett et al. |
| 2002/0022472 A1 | 2/2002 | Watler et al. |
| 2002/0022483 A1 | 2/2002 | Thompson et al. |
| 2002/0049074 A1 | 4/2002 | Eisinger et al. |
| 2002/0085516 A1 | 7/2002 | Bridgelall |
| 2002/0099848 A1 | 7/2002 | Lee |
| 2002/0116338 A1 | 8/2002 | Gonthier et al. |
| 2002/0120370 A1 | 8/2002 | Parupudi et al. |
| 2002/0120540 A1 | 8/2002 | Kende et al. |
| 2002/0131397 A1 | 9/2002 | Patel et al. |
| 2002/0131404 A1 | 9/2002 | Mehta et al. |
| 2002/0138599 A1 | 9/2002 | Dilman et al. |
| 2002/0138601 A1 | 9/2002 | Piponius et al. |
| 2002/0154751 A1 | 10/2002 | Thompson et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0191573 A1 | 12/2002 | Whitehill et al. |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0028623 A1 | 2/2003 | Hennessey et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0060189 A1 | 3/2003 | Minear et al. |
| 2003/0084321 A1 | 5/2003 | Tarquini et al. |
| 2003/0088671 A1 | 5/2003 | Klinker et al. |
| 2003/0133408 A1 | 7/2003 | Cheng et al. |
| 2003/0134650 A1 | 7/2003 | Sundar et al. |
| 2003/0159030 A1 | 8/2003 | Evans |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0184793 A1 | 10/2003 | Pineau |
| 2003/0188006 A1 | 10/2003 | Bard |
| 2003/0188117 A1 | 10/2003 | Yoshino et al. |
| 2003/0191646 A1 | 10/2003 | D'Avello et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0019564 A1 | 1/2004 | Goldthwaite et al. |
| 2004/0021697 A1 | 2/2004 | Beaton et al. |
| 2004/0024756 A1 | 2/2004 | Rickard |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0054779 A1 | 3/2004 | Takeshima et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0114553 A1 | 6/2004 | Jiang et al. |
| 2004/0116140 A1 | 6/2004 | Babbar et al. |
| 2004/0123153 A1 | 6/2004 | Wright et al. |
| 2004/0127200 A1 | 7/2004 | Shaw et al. |
| 2004/0127208 A1 | 7/2004 | Nair et al. |
| 2004/0127256 A1 | 7/2004 | Goldthwaite et al. |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0165596 A1 | 8/2004 | Garcia et al. |
| 2004/0167958 A1 | 8/2004 | Stewart et al. |
| 2004/0168052 A1 | 8/2004 | Clisham et al. |
| 2004/0170191 A1 | 9/2004 | Guo et al. |
| 2004/0176104 A1 | 9/2004 | Arcens |
| 2004/0198331 A1 | 10/2004 | Coward et al. |
| 2004/0203755 A1 | 10/2004 | Brunet et al. |

(56) References Cited

U.S. PATENT DOCUMENTS

| | | |
|---|---|---|
| 2004/0203833 A1 | 10/2004 | Rathunde et al. |
| 2004/0225561 A1 | 11/2004 | Hertzberg et al. |
| 2004/0225898 A1 | 11/2004 | Frost et al. |
| 2004/0236547 A1 | 11/2004 | Rappaport et al. |
| 2004/0243680 A1 | 12/2004 | Mayer |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2004/0260766 A1 | 12/2004 | Barros et al. |
| 2004/0267872 A1 | 12/2004 | Serdy et al. |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0041617 A1 | 2/2005 | Huotari et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | Demello et al. |
| 2005/0060525 A1 | 3/2005 | Schwartz et al. |
| 2005/0075115 A1 | 4/2005 | Corneille et al. |
| 2005/0079863 A1 | 4/2005 | Macaluso |
| 2005/0091505 A1 | 4/2005 | Riley et al. |
| 2005/0096024 A1 | 5/2005 | Bicker et al. |
| 2005/0097516 A1 | 5/2005 | Donnelly et al. |
| 2005/0107091 A1 | 5/2005 | Vannithamby et al. |
| 2005/0108075 A1 | 5/2005 | Douglis et al. |
| 2005/0111463 A1 | 5/2005 | Leung et al. |
| 2005/0128967 A1 | 6/2005 | Scobbie |
| 2005/0135264 A1 | 6/2005 | Popoff et al. |
| 2005/0163320 A1 | 7/2005 | Brown et al. |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0226178 A1 | 10/2005 | Forand et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0020787 A1 | 1/2006 | Choyi et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072550 A1 | 4/2006 | Davis et al. |
| 2006/0072646 A1 | 4/2006 | Feher |
| 2006/0075506 A1 | 4/2006 | Sanda et al. |
| 2006/0085543 A1 | 4/2006 | Hrastar et al. |
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0101507 A1 | 5/2006 | Camenisch |
| 2006/0112016 A1 | 5/2006 | Ishibashi |
| 2006/0114821 A1 | 6/2006 | Willey et al. |
| 2006/0114832 A1 | 6/2006 | Hamilton et al. |
| 2006/0126562 A1 | 6/2006 | Liu |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0178943 A1 | 8/2006 | Rollinson et al. |
| 2006/0182137 A1 | 8/2006 | Zhou et al. |
| 2006/0183462 A1 | 8/2006 | Kolehmainen |
| 2006/0190314 A1 | 8/2006 | Hernandez |
| 2006/0190987 A1 | 8/2006 | Ohta et al. |
| 2006/0193280 A1 | 8/2006 | Lee et al. |
| 2006/0199608 A1 | 9/2006 | Dunn et al. |
| 2006/0200663 A1 | 9/2006 | Thornton |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0221829 A1 | 10/2006 | Holmstrom et al. |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0274706 A1 | 12/2006 | Chen et al. |
| 2006/0277590 A1 | 12/2006 | Limont et al. |
| 2006/0291419 A1 | 12/2006 | McConnell et al. |
| 2006/0291477 A1 | 12/2006 | Croak et al. |
| 2007/0005795 A1 | 1/2007 | Gonzalez |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0035390 A1 | 2/2007 | Thomas et al. |
| 2007/0036312 A1 | 2/2007 | Cai et al. |
| 2007/0038763 A1 | 2/2007 | Oestvall |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061800 A1 | 3/2007 | Cheng et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0104169 A1 | 5/2007 | Polson |
| 2007/0109983 A1 | 5/2007 | Shankar et al. |
| 2007/0111740 A1 | 5/2007 | Wandel |
| 2007/0124077 A1 | 5/2007 | Hedlund |
| 2007/0130283 A1 | 6/2007 | Klein et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0165630 A1 | 7/2007 | Rasanen et al. |
| 2007/0168499 A1 | 7/2007 | Chu |
| 2007/0171856 A1 | 7/2007 | Bruce et al. |
| 2007/0174490 A1 | 7/2007 | Choi et al. |
| 2007/0191006 A1 | 8/2007 | Carpenter |
| 2007/0192460 A1 | 8/2007 | Choi et al. |
| 2007/0198656 A1 | 8/2007 | Mazzaferri et al. |
| 2007/0201502 A1 | 8/2007 | Abramson |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0234402 A1 | 10/2007 | Khosravi et al. |
| 2007/0242619 A1 | 10/2007 | Murakami et al. |
| 2007/0242659 A1 | 10/2007 | Cantu et al. |
| 2007/0243862 A1 | 10/2007 | Coskun et al. |

(56) References Cited

U.S. PATENT DOCUMENTS

| | | |
|---|---|---|
| 2007/0244965 A1 | 10/2007 | Dowling |
| 2007/0248100 A1 | 10/2007 | Zuberi et al. |
| 2007/0254646 A1 | 11/2007 | Sokondar |
| 2007/0254675 A1 | 11/2007 | Zorlu Ozer et al. |
| 2007/0255769 A1 | 11/2007 | Agrawal et al. |
| 2007/0255797 A1 | 11/2007 | Dunn et al. |
| 2007/0255848 A1 | 11/2007 | Sewall et al. |
| 2007/0256128 A1 | 11/2007 | Jung et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomone |
| 2007/0265003 A1 | 11/2007 | Kezys et al. |
| 2007/0266422 A1 | 11/2007 | Germano et al. |
| 2007/0274327 A1 | 11/2007 | Kaarela et al. |
| 2007/0280453 A1 | 12/2007 | Kelley |
| 2007/0282896 A1 | 12/2007 | Wydroug et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0297378 A1 | 12/2007 | Poyhonen et al. |
| 2007/0298764 A1 | 12/2007 | Clayton |
| 2007/0299965 A1 | 12/2007 | Nieh et al. |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0057894 A1 | 3/2008 | Aleksic et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0066181 A1 | 3/2008 | Haveson et al. |
| 2008/0070550 A1 | 3/2008 | Hose |
| 2008/0077705 A1 | 3/2008 | Li et al. |
| 2008/0080457 A1 | 4/2008 | Cole |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0089303 A1 | 4/2008 | Wirtanen et al. |
| 2008/0095339 A1 | 4/2008 | Elliott et al. |
| 2008/0096559 A1 | 4/2008 | Phillips et al. |
| 2008/0098062 A1 | 4/2008 | Balia |
| 2008/0101291 A1 | 5/2008 | Jiang et al. |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0125079 A1 | 5/2008 | O'Neil et al. |
| 2008/0126287 A1 | 5/2008 | Cox et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0148402 A1 | 6/2008 | Bogineni et al. |
| 2008/0160958 A1 | 7/2008 | Abichandani et al. |
| 2008/0161041 A1 | 7/2008 | Pernu |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168275 A1 | 7/2008 | DeAtley et al. |
| 2008/0168523 A1 | 7/2008 | Ansari et al. |
| 2008/0177998 A1 | 7/2008 | Apsangi et al. |
| 2008/0178300 A1 | 7/2008 | Brown et al. |
| 2008/0181117 A1 | 7/2008 | Acke et al. |
| 2008/0183811 A1 | 7/2008 | Kotras et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0212751 A1 | 9/2008 | Chung |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0242290 A1 | 10/2008 | Bhatia et al. |
| 2008/0250053 A1 | 10/2008 | Aaltonen et al. |
| 2008/0256593 A1 | 10/2008 | Vinberg et al. |
| 2008/0259924 A1 | 10/2008 | Gooch et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0279216 A1 | 11/2008 | Sharif-Ahmadi et al. |
| 2008/0280656 A1 | 11/2008 | Gonikberg et al. |
| 2008/0282319 A1 | 11/2008 | Fontijn et al. |
| 2008/0291872 A1 | 11/2008 | Henriksson |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0316983 A1 | 12/2008 | Daigle |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2008/0320497 A1 | 12/2008 | Tarkoma et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0006229 A1 | 1/2009 | Sweeney et al. |
| 2009/0013157 A1 | 1/2009 | Beaule |
| 2009/0016310 A1 | 1/2009 | Rasal |
| 2009/0017809 A1 | 1/2009 | Jethi et al. |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0054030 A1 | 2/2009 | Golds |
| 2009/0054061 A1 | 2/2009 | Dawson et al. |
| 2009/0065571 A1 | 3/2009 | Jain |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |

(56) References Cited

U.S. PATENT DOCUMENTS

| | | |
|---|---|---|
| 2009/0079699 A1 | 3/2009 | Sun |
| 2009/0109898 A1 | 4/2009 | Adams et al. |
| 2009/0113514 A1 | 4/2009 | Hu |
| 2009/0125619 A1 | 5/2009 | Antani |
| 2009/0132860 A1 | 5/2009 | Liu et al. |
| 2009/0149154 A1 | 6/2009 | Bhasin et al. |
| 2009/0157792 A1 | 6/2009 | Fiatal |
| 2009/0163173 A1 | 6/2009 | Williams |
| 2009/0170554 A1 | 7/2009 | Want et al. |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0203352 A1 | 8/2009 | Fordon et al. |
| 2009/0217065 A1 | 8/2009 | Araujo, Jr. |
| 2009/0217364 A1 | 8/2009 | Salmela et al. |
| 2009/0219170 A1 | 9/2009 | Clark et al. |
| 2009/0248883 A1 | 10/2009 | Suryanarayana et al. |
| 2009/0254857 A1 | 10/2009 | Romine et al. |
| 2009/0257379 A1 | 10/2009 | Robinson et al. |
| 2009/0261783 A1 | 10/2009 | Gonzales et al. |
| 2009/0262715 A1 | 10/2009 | Juang |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0291665 A1 | 11/2009 | Gaskarth et al. |
| 2009/0292815 A1 | 11/2009 | Gao et al. |
| 2009/0299857 A1 | 12/2009 | Brubaker |
| 2009/0307696 A1 | 12/2009 | Vals et al. |
| 2009/0307746 A1 | 12/2009 | Di et al. |
| 2009/0315735 A1 | 12/2009 | Bhavani et al. |
| 2009/0320110 A1 | 12/2009 | Nicolson et al. |
| 2010/0010873 A1 | 1/2010 | Moreau |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027525 A1 | 2/2010 | Zhu |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0041365 A1 | 2/2010 | Lott et al. |
| 2010/0041391 A1 | 2/2010 | Spivey et al. |
| 2010/0042675 A1 | 2/2010 | Fujii |
| 2010/0043068 A1 | 2/2010 | Varadhan et al. |
| 2010/0046373 A1 | 2/2010 | Smith et al. |
| 2010/0069074 A1 | 3/2010 | Kodialam et al. |
| 2010/0071053 A1 | 3/2010 | Ansari et al. |
| 2010/0075666 A1 | 3/2010 | Garner |
| 2010/0077035 A1 | 3/2010 | Li et al. |
| 2010/0080202 A1 | 4/2010 | Hanson |
| 2010/0082431 A1 | 4/2010 | Ramer et al. |
| 2010/0088387 A1 | 4/2010 | Calamera |
| 2010/0103820 A1 | 4/2010 | Fuller et al. |
| 2010/0113020 A1 | 5/2010 | Subramanian et al. |
| 2010/0121744 A1 | 5/2010 | Belz et al. |
| 2010/0131584 A1 | 5/2010 | Johnson |
| 2010/0142478 A1 | 6/2010 | Forssell et al. |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0190469 A1 | 7/2010 | Vanderveen et al. |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0227632 A1 | 9/2010 | Bell et al. |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0254387 A1 | 10/2010 | Trinh et al. |
| 2010/0284327 A1 | 11/2010 | Miklos |
| 2010/0284388 A1 | 11/2010 | Fantini et al. |
| 2010/0287599 A1 | 11/2010 | He et al. |
| 2010/0311402 A1 | 12/2010 | Srinivasan et al. |
| 2010/0318652 A1 | 12/2010 | Samba |
| 2010/0322071 A1 | 12/2010 | Avdanin et al. |
| 2010/0325420 A1 | 12/2010 | Kanekar |
| 2011/0004917 A1 | 1/2011 | Saisa et al. |
| 2011/0013569 A1 | 1/2011 | Scherzer et al. |
| 2011/0019574 A1 | 1/2011 | Malomsoky et al. |
| 2011/0071854 A1 | 3/2011 | Medeiros et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0177811 A1 | 7/2011 | Heckman et al. |
| 2011/0182220 A1 | 7/2011 | Black et al. |
| 2011/0185202 A1 | 7/2011 | Black et al. |
| 2011/0195700 A1 | 8/2011 | Kukuchka et al. |
| 2011/0238545 A1 | 9/2011 | Fanaian et al. |
| 2011/0241624 A1 | 10/2011 | Park et al. |
| 2011/0244837 A1 | 10/2011 | Murata et al. |
| 2011/0249668 A1 | 10/2011 | Milligan et al. |
| 2011/0252430 A1 | 10/2011 | Chapman et al. |
| 2011/0264923 A1 | 10/2011 | Kocher et al. |
| 2011/0277019 A1 | 11/2011 | Pritchard, Jr. |
| 2011/0294502 A1 | 12/2011 | Oerton |
| 2012/0020296 A1 | 1/2012 | Scherzer et al. |
| 2012/0029718 A1 | 2/2012 | Davis |
| 2012/0108225 A1 | 5/2012 | Luna et al. |
| 2012/0144025 A1 | 6/2012 | Melander et al. |
| 2012/0155296 A1 | 6/2012 | Kashanian |
| 2012/0166364 A1 | 6/2012 | Ahmad et al. |
| 2012/0166604 A1 | 6/2012 | Fortier et al. |
| 2012/0195200 A1 | 8/2012 | Regan |
| 2012/0196644 A1 | 8/2012 | Scherzer et al. |
| 2012/0215682 A1 | 8/2012 | Lent et al. |
| 2012/0238287 A1 | 9/2012 | Scherzer |
| 2012/0330792 A1 | 12/2012 | Kashanian |
| 2013/0024914 A1 | 1/2013 | Ahmed et al. |
| 2013/0029653 A1 | 1/2013 | Baker et al. |
| 2013/0030960 A1 | 1/2013 | Kashanian |
| 2013/0058274 A1 | 3/2013 | Scherzer et al. |
| 2013/0065555 A1 | 3/2013 | Baker et al. |
| 2013/0072177 A1 | 3/2013 | Ross et al. |
| 2013/0084835 A1 | 4/2013 | Scherzer et al. |
| 2013/0095787 A1 | 4/2013 | Kashanian |
| 2013/0117140 A1 | 5/2013 | Kashanian |
| 2013/0144789 A1 | 6/2013 | Aaltonen et al. |
| 2013/0176908 A1 | 7/2013 | Baniel et al. |
| 2013/0225151 A1 | 8/2013 | King et al. |
| 2013/0326356 A9 | 12/2013 | Zheng et al. |
| 2014/0071895 A1 | 3/2014 | Bane et al. |
| 2014/0073291 A1 | 3/2014 | Hildner et al. |
| 2014/0074719 A1 | 3/2014 | Gressel et al. |
| 2014/0082142 A1 | 3/2014 | Geffin |
| 2014/0198687 A1 | 7/2014 | Raleigh |
| 2014/0241342 A1 | 8/2014 | Constantinof |
| 2015/0039763 A1 | 2/2015 | Chaudhary et al. |
| 2015/0181628 A1 | 6/2015 | Haverinen et al. |
| 2016/0057011 A1 | 2/2016 | Drope |
| 2017/0063695 A1 | 3/2017 | Ferrell |

FOREIGN PATENT DOCUMENTS

| | | |
|---|---|---|
| CN | 1345154 A | 4/2002 |
| CN | 1508734 A | 6/2004 |
| CN | 1538730 A | 10/2004 |

(56) References Cited

FOREIGN PATENT DOCUMENTS

| | | |
|---|---|---|
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 B | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1098490 A2 | 5/2001 |
| EP | 1289326 A1 | 3/2003 |
| EP | 1463238 | 9/2004 |
| EP | 1503548 A1 | 2/2005 |
| EP | 1545114 A1 | 6/2005 |
| EP | 1739518 | 1/2007 |
| EP | 1772988 | 4/2007 |
| EP | 1850575 A1 | 10/2007 |
| EP | 1887732 A1 | 2/2008 |
| EP | 1942698 A1 | 7/2008 |
| EP | 1978772 | 10/2008 |
| EP | 2007065 A1 | 12/2008 |
| EP | 2026514 A1 | 2/2009 |
| EP | 2466831 A1 | 6/2012 |
| EP | 2154602 B1 | 6/2017 |
| JP | 3148713 B2 | 3/2001 |
| JP | 2005339247 A | 12/2005 |
| JP | 2006041989 | 2/2006 |
| JP | 2006155263 A | 6/2006 |
| JP | 2006197137 | 7/2006 |
| JP | 2006344007 A | 12/2006 |
| JP | 2007318354 A | 12/2007 |
| JP | 2008301121 A | 12/2008 |
| JP | 2009111919 | 5/2009 |
| JP | 2009212707 A | 9/2009 |
| JP | 2009218773 | 9/2009 |
| JP | 2009232107 A | 10/2009 |
| KR | 20040053858 A | 6/2004 |
| WO | 1998058505 | 12/1998 |
| WO | 1999027723 | 6/1999 |
| WO | 1999065185 | 12/1999 |
| WO | 0208863 | 1/2002 |
| WO | 2002045315 A2 | 6/2002 |
| WO | 2002067616 A1 | 8/2002 |
| WO | 2002093877 A1 | 11/2002 |
| WO | 2003014891 | 2/2003 |
| WO | 2003017063 A2 | 2/2003 |
| WO | 2003017065 A2 | 2/2003 |
| WO | 2003058880 | 7/2003 |
| WO | 2004028070 | 4/2004 |
| WO | 2004064306 A2 | 7/2004 |
| WO | 2004077797 | 9/2004 |
| WO | 2004095753 | 11/2004 |
| WO | 2005008995 | 1/2005 |
| WO | 2005053335 A1 | 6/2005 |
| WO | 2005083934 A1 | 9/2005 |
| WO | 2006004467 | 1/2006 |
| WO | 2006004784 A1 | 1/2006 |
| WO | 2006012610 A2 | 2/2006 |
| WO | 2006050758 | 5/2006 |
| WO | 2006073837 | 7/2006 |
| WO | 2006077481 | 7/2006 |
| WO | 2006093961 A1 | 9/2006 |
| WO | 2006120558 | 11/2006 |
| WO | 2006130960 | 12/2006 |
| WO | 2007001833 | 1/2007 |
| WO | 2007014630 | 2/2007 |
| WO | 2007018363 | 2/2007 |
| WO | 2007053848 | 5/2007 |
| WO | 2007068288 | 6/2007 |
| WO | 2007069245 | 6/2007 |
| WO | 2007097786 A | 8/2007 |
| WO | 2007107701 | 9/2007 |
| WO | 2007120310 | 10/2007 |
| WO | 2007124279 | 11/2007 |
| WO | 2007126352 | 11/2007 |
| WO | 2007129180 A2 | 11/2007 |
| WO | 2007133844 A | 11/2007 |
| WO | 2008017837 | 2/2008 |
| WO | 2008051379 | 5/2008 |
| WO | 2008066419 | 6/2008 |
| WO | 2008080139 | 7/2008 |
| WO | 2008080430 A1 | 7/2008 |
| WO | 2008099802 | 8/2008 |
| WO | 2009008817 A1 | 1/2009 |
| WO | 2009091295 A1 | 7/2009 |
| WO | 2010088413 | 8/2010 |
| WO | 2010128391 A2 | 11/2010 |
| WO | 2010128391 A3 | 1/2011 |
| WO | 2011002450 A1 | 1/2011 |
| WO | 2011149532 A1 | 12/2011 |

OTHER PUBLICATIONS

Open Mobile Alliance (OMA), Push Architecture, Candidate Version 2.2; Oct. 2, 2007; OMA-AD-Push-V2_2-20071002-C.
Oppliger, Rolf, "Internet Security: Firewalls and Bey," Communications of the ACM, May 1997, vol. 40. No. 5.
Quintana, David, "Mobile Multitasking," Apr. 14, 2010.
Rao et al., "Evolution of Mobile Location-Based Services," Communication of the ACM, Dec. 2003.
Richtel, "Cellphone consumerism; If even a debit card is too slow, now you have a new way to act on impulse: [National Edition]," National Post, Canada, Oct. 2, 2007.
Rivadeneyra et al., "A communication architecture to access data services through GSM," San Sebastian, Spain, 1998.
Roy et al., "Energy Management in Mobile Devices with the Cinder Operating System", Stanford University, MIT CSAIL, Jun. 3, 2010.
Ruckus Wireless—White Paper; "Smarter Wi-Fi for Mobile Operator Infrastructures" 2010.
Sabat, "The evolving mobile wireless value chain and market structure," Nov. 2002.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
Sharkey, "Coding for Life—Battery Life That Is," May 27, 2009.
Sharkey, Jeff, "Coding for Life—Battery Life, That Is," May 27, 2009.
Steglich, Stephan, "I-Centric User Interaction," Nov. 21, 2003.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Van Eijk, et al., "GigaMobile, Agent Technology for Designing Personalized Mobile Service Brokerage," Jul. 1, 2002.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
Windows7 Power Management, published Apr. 2009.
Wireless Broadband Alliance, "WISPr 2.0, Apr. 8, 2010"; Doc. Ref. No. WBA/RM/WISPr, Version 01.00.
Zhu et al., "A Survey of Quality of Service in IEEE 802.11 Networks," IEEE Wireless Communications, Aug. 2004.
"Ads and movies on the run," the Gold Coast Bulletin, Southport, Qld, Jan. 29, 2008.

(56) References Cited

OTHER PUBLICATIONS

"ASA/PIX: Allow Split Tunneling for VPN Clients on the ASA Configuration Example," Document ID 70917, Jan. 10, 2008.
"Communication Concepts for Mobile Agent Systems," by Joachim Baumann et al.; Inst. of Parallel and Distributed High-Performance Systems, Univ. of Stuttgart, Germany, pp. 123-135, 1997.
"End to End QoS Solution for Real-time Multimedia Application;" Computer Engineering and Applications, 2007, 43 (4): 155-159, by Tan Zu-guo, Wang Wen-juan; Information and Science School, Zhanjian Normal College, Zhan jiang, Guangdong 524048, China.
"Jentro Technologies launches Zenlet platform to accelerate location-based content delivery to mobile devices," The Mobile Internet, Boston, MA, Feb. 2008.
"The Construction of Intelligent Residential District in Use of Cable Television Network," Shandong Science, vol. 13, No. 2, Jun. 2000.
3rd Generation Partnership Project, "Technical Specification Group Core Network and Terminals; Access Network Discovery and Selection Function (ANDSF) Management Object (MO)," Release 9, Document No. 3GPP TS 24.312, V9.1.0, Mar. 2010.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
3rd Generation Partnership Project, "Technical Specification Group Services and System Aspects; Policy and Charging Control Architecture," Release 8, Document No. 3GPP TS 23.203, V8.4.0, Dec. 2008.
3rd Generation Partnership Project; "Technical Specification Group Services and System Aspects; IP Flow Mobility and seamless WLAN offlload; Stage 2," Release 10, Document No. 3GPP TS 23.261, V1.0.0, Mar. 2010.
Accuris Networks, "The Business Value of Mobile Data Offload—a White Paper", 2010.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Ahmed et al., "Multi Access Data Network Connectivity and IP Flow Mobility in Evolved Packet System (EPS)," 2010 IEEE.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Android Cupcake excerpts, The Android Open Source Project, Feb. 10, 2009.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Blackberry Mobile Data System, version 4.1, Technical Overview, 2006.
Byrd, Open Secure Wireless, May 5, 2010.
Chandrasekhar et al., "Femtocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Client Guide for Symantec Endpoint Protection and Symantec Network Access Control, 2007.
Dikaiakos et al., "A Distributed Middleware Infrastructure for Personalized Services," Nov. 24, 2003.
Dixon et al., Triple Play Digital Services: Comcast and Verizon (Digital Phone, Television, and Internet), Aug. 2007.
Droid Wall 1.3.7 description 20100428 obtained from https://www.freewarelovers.com/android/apps/droid-wall.
Ehnert, "Small application to monitor IP trafic on a Blackberry—1.01.03 ", Mar. 27, 2008; http://www.ehnert.net/MiniMoni/.
European Commission, "Data Roaming Tariffs—Transparency Measures," obtained from EUROPA—Europe's Information Society Thematic Portal website, Jun. 24, 2011: "http://ec.europa.eu/information_society/activities/roaming/data/measures/index_en.htm.".
Farooq et al., "An IEEE 802.16 WiMax Module for the NS-3 Simulator," Mar. 2-6, 2009.
Fujitsu, "Server Push Technology Survey and Bidirectional Communication in HTTP Browser," Jan. 9, 2008 (JP).
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Jing et al., "Client-Server Computing in Mobile Environments," GTE Labs. Inc., Purdue University, ACM Computing Surveys, vol. 31, No. 2, Jun. 1999.
Kasper et al., "Subscriber Authentication in mobile cellular Networks with virtual software SIM Credentials using Trusted Computing," Fraunhofer-Institute for Secure Information Technology SIT, Darmstadt, Germany; ICACT 2008.
Kassar et al., "An overview of vertical handover decision strategies in heterogeneous wireless networks," ScienceDirect, University Pierre & Marie Curie, Paris, France, Jun. 5, 2007.
Kim, "Free wireless a high-wire act; MetroFi needs to draw enough ads to make service add profits," San Francisco Chronicle, Aug. 21, 2006.
Knight et al., "Layer 2 and 3 Virtual Private Networks: Taxonomy, Technology, and Standarization Efforts," IEEE Communications Magazine, Jun. 2004.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Koutsopoulou et al., "Middleware Platform for the Support of Charging Reconfiguration Actions," 2005.
Kuntze et al., "Trustworthy content push," Fraunhofer-Institute for Secure Information Technology SIT; Germany; WCNC 2007 proceedings, IEEE.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and the Challenges," Scroll, vol. 1, No. 1, 2008.
Loopt User Guide, metroPCS, Jul. 17, 2008.
Muntermann et al., "Potentiale und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Nilsson et al., "A Novel MAC Scheme for Solving the QoS Parameter Adjustment Problem in IEEE802.11e EDCA," Feb. 2006.

\* cited by examiner

COMMUNICATIONS DEVICE WITH SECURE DATA PATH PROCESSING AGENTS

BACKGROUND

With the advent of mass market digital communications and content distribution, many access networks such as wireless networks, cable networks and DSL (Digital Subscriber Line) networks are pressed for user capacity, with, for example, EVDO (Evolution-Data Optimized), HSPA (High Speed Packet Access), LTE (Long Term Evolution), WiMAX (Worldwide Interoperability for Microwave Access), and Wi-Fi (Wireless Fidelity) wireless networks increasingly becoming user capacity constrained. Although wireless network capacity will increase with new higher capacity wireless radio access technologies, such as MIMO (Multiple-Input Multiple-Output), and with more frequency spectrum being deployed in the future, these capacity gains are likely to be less than what is required to meet growing digital networking demand.

Similarly, although wire line access networks, such as cable and DSL, can have higher average capacity per user, wire line user service consumption habits are trending toward very high bandwidth applications that can quickly consume the available capacity and degrade overall network service experience. Because some components of service provider costs go up with increasing bandwidth, this trend will also negatively impact service provider profits.

BRIEF DESCRIPTION OF THE DRAWINGS

Various embodiments of the invention are disclosed in the following detailed description and the accompanying drawings.

DETAILED DESCRIPTION

Figure 1:
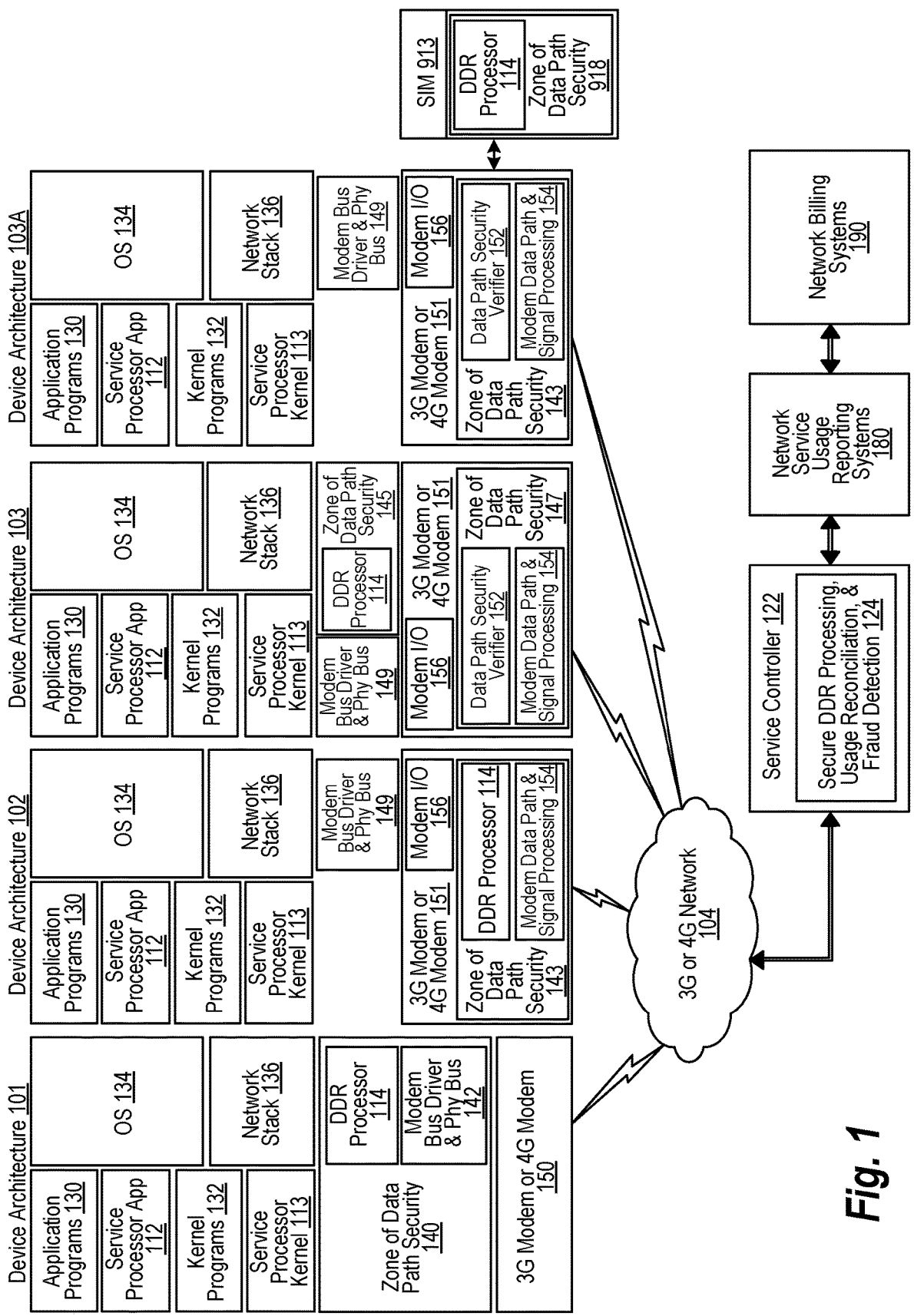
FIG. 1 illustrates a high level diagram of an advanced wireless service platform end-to-end DDR reporting and processing system in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, secure device data records (DDRs) are provided. In some embodiments, secure DDRs for device assisted services are provided. In some embodiments, secure DDRs for device assisted services are provided for service usage monitoring of a wireless communication device (e.g., firmware based monitoring of network service usage, such as based on a 5-tuple of a source address, port address, destination address, destination port, and protocol). In some embodiments, secure DDRs for device-assisted services are provided for service usage monitoring of a wireless connection and other input/output (I/O) connections or ports of a wireless communication device (e.g., firmware-based monitoring of network service usage, such as based on a 5-tuple of a source address, port address, destination address, destination port, and protocol). In some embodiments, a system for secure DDRs includes a processor of a wireless communication device for wireless communication with a wireless network, in which the processor is configured with a secure execution environment, and in which the secure execution environment is configured to: monitor service usage of the wireless communication device with the wireless network; and generate a plurality of device data records of the monitored service usage of the wireless communication device with the wireless network, in which each device data record is associated with a unique sequence order identifier; and a memory coupled to the processor and configured to provide the processor with instructions. In some embodiments, a system for secure DDRs includes a processor of a wireless communication device for wireless communication with a wireless network, in which the processor is configured with a secure execution environment, the secure execution environment configured to: monitor service usage of the wireless communication device with one or more of the networks and I/O connections for the device including but not limited to a wide area wireless network (e.g., 2G, 3G, 4G, etc.), a WiFi network or connection, a USB network or connection, an Ethernet network or connection, a Firewire connection, a Bluetooth connection, a near field communication (NFC) connection or another I/O connection or port; and generate a plurality of device data records of the monitored service usage of the wireless communication device with the wireless network, in which each device data record is associated with a unique sequence order identifier; and a memory coupled to the processor and configured to provide the processor with instructions. In some embodiments, the secure execution environment including the secure DDR processor is located in an application processor, in a modem processor, and/or in a subscriber identity module (SIM).

In many of the disclosed embodiments, a secure device data record processing system acts on communications that flow over a wide area wireless network connection to the device (e.g., a 2G, 3G, or 4G connection) or a wide area wireless modem (e.g., a 2G, 3G, or 4G modem). As would be understood by one of ordinary skill in the art, the secure device data record processing system can also act on communications that flow over one or more additional I/O networks, connections, ports or modems (e.g., a WiFi network, connection, port, or modem; a USB network, connection, port, or modem; an Ethernet network, connection, port, or modem; a Firewire network, connection, port, or modem; a Bluetooth network, connection, port, or modem; a near field communication (NFC) network, connection, port, or modem; or another I/O connection, port, or modem).

In some embodiments, a system for secure DDRs includes a processor of a wireless communication device for wireless communication with a wireless network, in which the processor is configured with a secure execution environment, and in which the secure execution environment is configured to: monitor service usage of the wireless communication device with the wireless network (and possibly one or more additional I/O connections for the device); and generate a plurality of device data records of the monitored service usage of the wireless communication device with the wireless network (and possibly one or more additional I/O connections for the device), in which each device data record is one of an ordered sequence of device data records with each sequential device data record providing an accounting of service usage over a service usage interval spanned by the device data record, and in which each device data record is associated with a secured unique sequence order identifier; and a memory coupled to the processor and configured to provide the processor with instructions. In this manner, communication activity over a device wireless access network connection (or other I/O port communication connection) is securely monitored and reported to a network server for further processing to determine if device access service policies are being properly enforced, or to determine of malicious software in the device operating environment is accessing the network (or other I/O connection or port). In some embodiments, the secure execution including the secure DDR processor environment is located in an application processor, in a modem processor, and/or in a subscriber identity module (SIM).

In some embodiments, a communication channel for delivering secure device data records to a network server for further analysis and processing includes a secure message receipt feedback loop, and if the secure message feedback loop is interrupted, a device environment security error condition is detected and acted on. In some embodiments, the ordered sequence of device data records is communicated to a service controller using a signed or encrypted communication channel. In some embodiments, the service controller observes the device data records to determine compliance with a device-based access network (or other I/O connections or ports) access policy. In some embodiments, the service controller also observes the integrity of the ordered sequence of device data records to determine if device data records have been tampered with or omitted. In some embodiments, if the service processor determines that the device data records have not been tampered with or omitted, the service controller sends back a signed or encrypted device data record receipt message. In some embodiments, if the service processor determines that the device data records have been tampered with or omitted, the service controller sends back an error message or does not send back a signed or encrypted device data record receipt message. In some embodiments, if the system for secure DDRs receives an error message from the service controller, or does not receive a signed or encrypted device data record receipt message within a certain period of time or within a certain number of transmitted device data records or within a certain amount of communication information processed, then (i) a device configuration error message can be generated for delivery to a security administrator or server, or (ii) one or more of the wireless network connections (or other I/O connection or port) for the wireless communication device are either blocked or restricted to a pre-determined set of safe destinations. In this manner, if a device service processor, the device operating environment, device operating system or device software is tampered with in a manner that produces wireless network (or other I/O port) access service usage characteristics that are not compliant with expected policy or allowed policy, a device configuration error message can be generated or device wireless network access (or other I/O connection access) can be restricted or blocked. Such embodiments can be helpful in securing device based network access (or I/O control) policies and can also be helpful in identifying device software that has been tampered with or any malware that is present on the device. In some embodiments, the restriction on wireless network access (or other I/O access) results in access to a limited number of network destinations or resources sufficient to allow further analysis or troubleshooting of the device configuration error condition.

Various techniques for providing device assisted services (DAS), are disclosed in co-pending U.S. patent application Ser. No. 12/380,780, entitled AUTOMATED DEVICE PROVISIONING AND ACTIVATION, filed on Mar. 2, 2009, published as U.S. Pub. App. No. 2010/0192212, co-pending U.S. patent application Ser. No. 12/695,019, entitled DEVICE ASSISTED CDR CREATION, AGGREGATION, MEDIATION AND BILLING, filed on Jan. 27, 2010, published as U.S. Pub. App. No. 2010/0197266, and co-pending U.S. patent application Ser. No. 12/694,445, entitled SECURITY TECHNIQUES FOR DEVICE ASSISTED SERVICES filed on Jan. 27, 2010, published as U.S. Pub. App. No. 2010/0199325, which are incorporated herein by reference for all purposes.

In some embodiments, a DDR processor is provided for wireless communication devices (e.g., for assisting in implementation of device assisted services (DAS) for wireless network service usage for wireless communication devices, such as a cellular phone, smart phone, laptop, PDA, gaming device, music device, tablet, computer, and/or any other device with wireless communication access) as described herein with respect to various embodiments. In some embodiments, a secure DDR processor (e.g., implemented/executed in a secure execution environment) is provided. In some embodiments, a DDR processor is secured using various techniques described herein. In some embodiments, the DDR processor includes a DDR generator. In some embodiments, the DDR processor generates DDRs. In some embodiments, the DDR processor reports DDRs to a network element (e.g., a service controller, a DDR network storage system, and/or another network element). In some embodiments, the secure DDR processor reports the DDRs to a device element/function, such as a service processor, which aggregates the DDRs (e.g., and can include other service usage and/or other information) in a report (e.g., or service processor reports) that is communicated to a network element. In some embodiments, DDRs as well as service processor reports are generated and communicated to a network element. In some embodiments, a DDR processor is secured using various techniques described herein.

In some embodiments, DDRs include device assisted and/or device based monitored service usage (e.g., based on various criteria, such as for a specified time interval, and/or event) as described herein with respect to various embodiments. In some embodiments, DDRs are periodically reported. In some embodiments, DDRs are reported based on an event and/or a request from a network element (e.g., a service controller or another network element/function). In some embodiments, DDRs are communicated to a device service processor (e.g., or another device element/function), which aggregates such DDRs and periodically provides service usage reports including such DDRs or providing such service usage reports based on a request and/or an event. In some embodiments, each DDR includes a unique identifier (e.g., a unique sequence identifier). In some embodiments, a missing DDR can be detected using the unique identifiers (e.g., sequence count and/or time stamp information associated with each DDR allows for detection of a potentially suspicious service usage event, such as a missing, delayed, and/or compromised device data record determined using the sequence count and/or time stamp information, and responsive/corrective actions can be performed upon detection of the suspicious service usage event, as described herein). In some embodiments, if a DDR is not received within a certain time period, then an access controller is activated to limit network access until DDRs are properly generated and reported (e.g., a network element, such as a service controller, sends a keep alive signal to the device to implement a time out period for verifying receipt of properly generated and validated DDRs from the device, and if the keep alive signal is not received within a specified time period, then the device based secured access controller can implement the restricted network access control function).

In some embodiments, a DDR network storage system is provided as described herein with respect to various embodiments. In some embodiments, a service controller is provided that includes the DDR network storage system and a DDR reconciliation function (e.g., for reconciling DDR records and/or DDR reports or other device based and/or network based service usage reports, such as CDRs, micro CDRs, and/or IPDRs or other service usage reports). In some embodiments, a network based reconciliation function reconciles DDRs (e.g., aggregated DDRs and/or DDR reports) with one or more network based service usage measures. In some embodiments, the network based reconciliation function reconciles DDRs with two or more network based service usage measures. In some embodiments, the network based reconciliation function reconciles DDRs with two or more network based service usage measures (e.g., CDRs, FDRs, IPDRs, DPI based measures including traffic related events, such as NBS and/or QoS, and/or other network based service usage measures). In some embodiments, the network based reconciliation function reconciles two or more device based service usage measures (e.g., DDRs, service processor reports, and/or other device based service usage measures including traffic related events, such as NBS and/or QoS) with a network based service usage measure. In some embodiments, the network based reconciliation function reconciles two or more device based service usage measures with two or more network based service usage measures. In some embodiments, the network based reconciliation function reconciles two or more device based service usage measures, in which one of the device based service usage measures is secured (e.g., deemed as secured and/or trusted based on various techniques described herein, such as for secure DDRs) and one or more of the other device based service usage measures is not secured (e.g., not completely trusted, such as a service processor reports generated by a service processor that is not implemented in a secure execution environment). In some embodiments, the reconciliation function reconciles based on various different reporting formats, such as time measure intervals, units of measure, and/or other different criteria used by different device and network based various service usage measures.

In some embodiments, a secure access controller is provided as described herein with respect to various embodiments. In some embodiments, the DDR processor includes the secure access controller. In some embodiments, the secure access control ensures that a wireless communication device with DAS does not have open network access until and/or unless the device is properly generating and reporting secure DDRs.

In some embodiments, the DDR processor includes a network busy state (NBS) monitoring and reporting function that is secured as described herein with respect to various embodiments. In some embodiments, a network element aggregates NBS information received from one or more wireless communication devices from the same sector and/or from various sectors within the service vicinity and establishes either the same network busy state rules (e.g., access control, charging and notification) and/or changes the exiting NBS rules appropriately.

In some embodiments, a secured boot sequence is provided. In some embodiments, the secured boot sequence ensures that the DDR processor is secured and properly generating DDRs prior to providing open network access control to the wireless communication device. In some embodiments, the secured boot sequence includes using the secure access controller to restrict network access until the secured boot sequence is completed. In some embodiments, the secure boot sequence includes verifying DDR ACK and receipt frames.

In some embodiments, a processor of a wireless communication device for wireless communication with a wireless network is provided, in which the processor is configured with a secure software or firmware instruction execution environment, and in which a program in the secure software or firmware instruction execution environment is configured to: monitor service usage of the wireless communication device with the wireless network; generate a plurality of device data records (DDRs) of the monitored service usage of the wireless communication device with the wireless network, in which the device data records are secure device data records for the monitored service usage, in which each device data record forms a portion of an ordered sequence of device data records with each sequential device data record providing an accounting of service usage over a service usage interval spanned by the device data record, and in which each device data record is associated with a unique sequence order identifier that is also secured.

In some embodiments, the sequence of device data records forms a contiguous and uninterrupted reporting of device service usage while the device is active on the network. In some embodiments, the secure software or firmware instruction execution environment is located and configured such that the network can only be accessed through a data path that is monitored by the program in the secure software or firmware instruction execution environment. In some embodiments, the secure software or firmware instruction execution environment is located in a modem processor (e.g., MPU). In some embodiments, the secure software or firmware instruction execution environment is located in an application processor (e.g., APU). In some embodiments, the secure software or firmware instruction execution environment is located in a subscriber identity module (SIM) (e.g., SIM card). In some embodiments, the secure software or firmware instruction execution environment is located in a combination of an APU, MPU, and/or SIM.

In some embodiments, the device data records are secured using various cryptographic techniques described herein, such as using one or more of the following: encryption, digital signatures, and integrity checks.

In some embodiments, a DDR processor located in a secure execution environment is configured to communicate a sequence of device data records to a device data record storage function, such as within a network element (e.g., a service controller), in which the plurality of secure device data records in combination with the unique sequence identifier provides traceability to identify if one or more usage records have been tampered with or omitted from the sequence of data records transmitted to the storage function. In some embodiments, the unique sequence identifier includes one or more of the following: sequence count, time stamp, start time indicator, stop time indicator, contiguous time interval identifier, and aggregate usage count at the beginning or end of the record, reference time, or elapsed time at the beginning or end of the record.

In some embodiments, the generation of a new device data record is determined by one or more of the following: a predetermined time, elapsed period of time, elapsed period of time since last report, maximum limit on elapsed period of time since last report, amount of one or more aspects of aggregate data usage, amount of one or more aspects of data usage since last report, maximum limit for one or more aspects of data usage since last report, a request to generate a DDR, a limit on maximum amount of memory or storage media required to contain or process DDR information prior to transmission, device power on or power off, modem or device subsystem power on or power off, modem or device subsystem entering or exiting a power save state, device or device subsystem authentication with a network element or server, or a detected event triggered by one or more service usage activities or detection of a service usage record tampering or fraud event or transition to a new network busy state and/or QoS traffic event.

In some embodiments, the DDR processor, service processor, or another device based element/function transmits DDRs based on one or more of the following: maximum time increment, maximum service usage increment, polling from service processor, and/or polling from service controller. In some embodiments, a maximum time increment on DDR transmissions is established to ensure minimal or no services can be hijacked once service controller authentication takes place. In some embodiments, at least a portion of the restricted set of network service activities includes access to the service controller or other network elements necessary to manage the ability of the device to access the network once the service controller authenticates with the service processor and conforms proper operation of the secure DDR generator. In some embodiments, at least a portion of the restricted set of network service activities includes access to a minimum set of roaming network service activities required to initiate the process for a roaming network to authenticate access privileges for the device. In some embodiments, at least a portion of the restricted set of network service activities includes access to a minimum set of roaming network service activities required to initiate the process for a corporate network to authenticate access privileges for the device. In some embodiments, at least a portion of the restricted set of network service activities includes access to a minimum set of roaming network service activities required to initiate the process for an MVNO network to authenticate access privileges for the device. In some embodiments, at least a portion of the more permissive set of service activities is the available to access at least a subset of the services available on a roaming network. In some embodiments, at least a portion of the more permissive set of service activities is the available to access at least a subset of the services available on an MVNO network. In some embodiments, at least a portion of the more permissive set of service activities is the available to access at least a subset of the services available on a corporate network.

In some embodiments, the device data record service usage information includes measurement of one or more of the following: voice service (e.g., VOIP) usage records; text service usage records; data network service usage records; data network flow data records; data network general purpose, aggregate or bulk service usage records; service usage classified at least in part by far end destination; service usage records classified at least in part by layer 3 network communications information such as IP address or ATM address; service usage classified at least in part by layer 4 network communications information such as IP address and port combinations; data network service usage records comparable to network based flow data records such as network based FDRs, CDRs or IPDRs; service usage classified at least in part by time of day; service usage classified at least in part by geographic location; service usage classified at least in part by the active network servicing the device; service usage classified at least in part by a roaming network connected to the device; service usage classified at least in part by network busy state or network congestion; service usage classified at least in part by QoS, service usage records classified at least in part by layer 7 network communications information such as server name, domain name, URL, referrer host or application service flow information; service usage classified at least in part by network communications protocol such as TCP, UDP, DNS, SMTP, IMAP, POP, FTP, HTTP, HTML, VOIP; service usage classified at least in part by the application name or the application identifier assigned by the operating system or another application identifier unique to the application acquiring or requesting service (e.g., device user identifier, such as Android user ID on an Android based device); and service usage classified at least in part by service activity.

In some embodiments, the DDR processor located in the secure execution environment is configured to send the device data records to a network element (e.g., storage function located in the network). In some embodiments, the DDR processor located in the secure execution environment is configured to provide a secure communication channel between the secure software or firmware instruction execution environment and the storage function located in the network (e.g., a network element, such as a service controller), in which the communication channel security protocol is configured to avoid tampering with the secure device data records (DDRs). In some embodiments, the DDR processor located in the secure execution is configured to perform an authentication sequence or process with a network element (e.g., a service controller) in which a secure device data record sequence initiation message is sent to a network destination followed by authentication protocol exchange sequences to authenticate the network element before transmitting the secure data records.

In some embodiments, the DDR processor located in the secure execution environment is configured to perform the following: send the device data record sequence to a network element (e.g., via a secure channel); implement a secure access controller for restricting network access to a predetermined subset of available network destinations; receive a secure message from a trusted network element (e.g., either directly from the network element or from another function on the device that forwards the secure messages from the network element to the DDR processor in the secure execution environment); if a validated (e.g., properly secured and configured) message is received that acknowledges receipt of one or more secure device data records or acknowledges an access network authentication sequence, then the secure access controller allows unrestricted or less restricted access to the network; if a validated message is not received that acknowledges receipt of one or more secure device data records or acknowledges an access network authentication sequence, then the secure access controller restricts access to a predetermined set of network destinations or functions until a validated message is received that acknowledges receipt of one or more secure device data records or acknowledges an access network authentication sequence.

In some embodiments, the DDR processor located in the secure execution environment is configured with an access controller that restricts access to a predetermined set of network destinations or functions if a predetermined maximum amount of time passes between: the time that a first message acknowledging receipt of one or more secure device data records or an authentication sequence is received by the DDR processor in the secure execution environment and the time that a second message acknowledging receipt of one or more secure device data records or an authentication sequence is received by the DDR processor in the secure execution environment; or the time that one or more secure device data records are sent by the DDR processor in the secure execution environment and the time that a message acknowledging receipt of one or more secure device data records or an authentication sequence is received by DDR processor in the secure execution environment; and the access controller otherwise allows unrestricted or less restricted access to the network.

In some embodiments, the DDR processor located in the secure execution environment is configured to send the device data record to the device data record storage function located in the network by first sending it to a second program function located on the device that then forwards the device data record to the device data record storage function located in the network. In some embodiments, the DDR processor located in the secure execution environment is configured to provide a second service usage report sequence in addition to the secure device data record sequence. In some embodiments, another client function/element (e.g., a service processor function/element or agent) is configured to provide a second service usage report sequence in addition to the secure device data record sequence. In some embodiments, the second service usage report sequence includes service usage classification that is different at least in part from the secure device data records. In some embodiments, the difference between device data usage classification includes at least in part that one record includes one or more of the following: application information, layer 7 network information, service flow association information, user defined input information, network busy state information, active network information or other information while the other record does not.

In some embodiments, the DDR processor located in the secure execution environment is configured to send the device data record sequence and the second device data record sequence in a manner that allows for simplified reconciliation of the two records. In some embodiments, the DDR processor located in the secure execution environment is configured to provide the second service usage report sequence in a manner that provides approximate alignment of a measurement interval start time and stop time spanned by one or more of the second service usage reports and the measurement interval spanned by one or more of the secure device data records.

In some embodiments, the DDR processor located in the secure execution environment is configured to: be based on the monitoring of service usage of the wireless communication device with the wireless communication network, create and record characterizations of network performance; analyze the characterizations of network performance and reduce the performance characterizations into one or more network performance statistics that characterize in summary form the performance level or congestion level of the network as experienced by the device; generate a plurality of network performance report messages that include a sequence of the network performance statistics created at different times; in which the network performance report messages are secured network performance reports; and send the secured network performance reports to the storage function located in the network.

In some embodiments, a processor of a network device configured as a device data record storage and processing function, for wireless communication with a wireless network in wireless communication with a plurality of wireless communication devices, with each wireless device including a secure device data record generator, in which the processor of the network device is further configured to: provide individual secure communication channels between each of the plurality of secure device data record processor and the network device, in which the communication channel security protocol is configured so that tampering with the device data records may be detected; receive over the secure communications channel a plurality of device data records from each of the secure device data record processors, in which the plurality of secure device data records are service usage records of monitored service usage of the wireless communication device with the wireless network, and in which each device data record forms a portion of an ordered sequence of device data records with each sequential device data record providing an uninterrupted accounting of service usage over the service usage interval spanned by the device data record, and in which the sequence of device data records forms a contiguous and uninterrupted reporting of device service usage, and in which each device data record is associated with a unique sequence order identifier; provide a device data record storage function in which the device data record sequence for each device is stored; for each device, analyze the stored sequence of device data records to determine if one or more of the device data records have been compromised by verifying that the information in the service usage record is properly configured according to the secure communication channel protocol; for each device, determine if one or more of the device data records have been removed or blocked from the device data record sequence originally transmitted from the device by determining if the secure contiguous sequence identifiers for the aggregate sequence are all present in the sequence; and if any device data record has been compromised, delayed or removed, set a fraud detection error flag for that device to restrict network access and also signals network apparatus or a network administrator to take further action.

In some embodiments, the secure device data records included in the device data record sequence include a secure network performance report that characterizes the network performance or congestion at the time the secure device data record was generated. In some embodiments, the device data record sequence is used at least in part as a record of service usage that forms an input factor in the business logic or rules used to compute a service usage bill. In some embodiments, the device data record sequence is used at least in part as a record of service usage that forms an input factor in the business logic or rules used to determine if one or more device access network service policies are being properly enforced. In some embodiments, the device data record sequence is used at least in part as a record of service usage that forms an input factor in updating an end user service usage notification message, service usage notification display or service purchase message trigger event.

In some embodiments, the network device processor is further configured to receive a device data record sequence from a second device program function that forwards the device data record after receiving it from the secure device data record generator. In some embodiments, the network device processor is further configured to receive a second service usage data record sequence from a second device program function. In some embodiments, the two device data record sequences possess service usage classification that is different at least in part (e.g., use of classification parameters; layer 3/4 and/or layer 7) over the same (or approximately the same or overlapping) time span. In some embodiments, the network device processor is further configured to compare the two data record sequences and determine if the two sequences of service usage reports match one another to within an allowable tolerance limit.

In some embodiments, the secure device data record(s) can accompany the corresponding layer-7 classification information (e.g., domain names, application identifier, HTTP information, associative classification, and/or other information as described herein) with the 5-tuple classification information (e.g., source address, port address, destination address, destination port, and protocol) received from the Service Processor included in the DDR report, which, for example, can be sent to the Service Controller (e.g., or another network element) to assist in the service usage reconciliation and/or verification, using various techniques described herein. In some embodiments, one or more of the service usage reconciliation and/or verification operations using the layer-7 classification information and the 5-tuple classification information are performed locally in the client (e.g., in a secure execution area). In some embodiments, one or more of the service usage reconciliation and/or verification operations using the layer-7 classification information and the 5-tuple classification information are performed locally in the client (e.g., in a secure execution area), and one or more of the service usage reconciliation and/or verification operations using the layer-7 classification information and the 5-tuple classification information are performed in the network (e.g., at one or more network elements, such as the Service Controller).

In some embodiments, a portion of the matching criteria is determining if the two sequences of service usage reports match in the reported network performance levels or network congestion levels. In some embodiments, the tolerance limit is based on total data usage over the usage interval spanned by the two data record sequences.

In some embodiments, the network device processor is further configured to identify the amount of service usage for one or more classification categories in the second service usage record sequence that can be reconciled with service usage for one or more classification categories in the secure device data record sequence. In some embodiments, a criteria in the classification category reconciliation includes determining if the two sequences of service usage reports match in the reported network performance levels or network congestion levels.

In some embodiments, the network device processor is further configured to identify the amount of service usage from the second service usage record sequence that cannot be reconciled with known service usage classifications in the secure device data record sequence. In some embodiments, a criteria in the classification category reconciliation includes determining if the two sequences of service usage reports match in the reported network performance levels or network congestion levels.

In some embodiments, a minimum tolerance limit is placed on the amount, relative amount or percentage of service usage for one or more classification categories in the second service usage record sequence that can be matched to or correlated with one or more classification categories in the secure device data record sequence. In some embodiments, when the minimum tolerance limit is not met a fraud detection error flag for that device is set to restrict network access and also signals network apparatus or a network administrator to take further action.

In some embodiments, a maximum tolerance limit is placed on the amount, relative amount or percentage of service usage for one or more classification categories in the second service usage record sequence that cannot be matched to or correlated with one or more classification categories in the secure device data record sequence. In some embodiments, when the maximum tolerance limit is exceeded a fraud detection error flag for that device is set to restrict network access and also signals network apparatus or a network administrator to take further action.

In some embodiments, the network device processor is further configured to determine if the service usage report spanned by the secure device data record sequence is consistent to within predetermined tolerance limits with one or more device service usage enforcement policies intended to be in place. In some embodiments, if the tolerance limits are exceeded a fraud detection error flag for that device is set to restrict network access and also signals network apparatus or a network administrator to take further action. In some embodiments, the network device processor is further configured to determine if the service usage report spanned by the second device service usage report sequence is consistent to within predetermined tolerance limits with one or more device service usage enforcement policies intended to be in place. In some embodiments, if the tolerance limits are exceeded a fraud detection error flag for that device is set to restrict network access and also signals network apparatus or a network administrator to take further action.

In some embodiments, the network device processor is further configured to provide one or more secure messages to each of multiple device programs running in a secure software or firmware instruction execution environment, in which the secure messages either acknowledge receipt of one or more secure device data records or acknowledge an access network authentication sequence. In some embodiments, the network device processor is further configured to send, for each device, a series of secure messages that directly or implicitly instruct the programs running in a secure software or firmware instruction execution environment to allow unrestricted or less restricted network access for a period of time that is either predetermined or is specified in a message from the network device processor to the program running in a secure software or firmware instruction execution environment. In some embodiments, the network device processor is further configured to send, for each device, a secure message that instructs the program running in a secure software or firmware instruction execution environment to restrict network access to a predetermined set of network destinations or functions.

In some embodiments, a secure network busy state (NBS) monitoring and reporting is provided. In some embodiments, the secure NBS monitoring and reporting facilitates NBS charging and control enforcement. In some embodiments, a processor of a wireless communication device for wireless communication with a wireless network, in which the processor is configured with a secure software or firmware instruction execution environment, and in which a DDR processor in the secure execution environment is configured to: monitor service usage of the wireless communication device with the wireless network; based on the monitoring of service usage of the wireless communication device with the wireless communication network, create and record characterizations of network performance; analyze the characterizations of network performance and reduce the performance characterizations into one or more network performance statistics that provide indications of the performance level or congestion level of the network as experienced by the device; generate a plurality of network performance report messages that include a sequence of the network performance statistics created at different times; in which the network performance report messages are secured network performance reports; and send the secured network performance reports to the storage function located in the network.

In some embodiments, the measures of network busy state or network congestion are formed by observing one or more of: the number of network access attempts, the number of access successes the number of access failures, the delay between access attempt and access success, network throughput data rate, data error rate, packet error rate, packet repeat rate, one way or round trip delay, one way or round trip delay jitter, TCP traffic back off parameters, TCP window parameters, modem channel quality, modem channel power, modem channel signal to noise ratio, modem over the air data rate, or network throughput data rate versus modem over the air data rate, and the sub network of the network that the device is connected to.

In some embodiments, the measures of service usage are obtained from observing the network traffic generated by the service usage of the device user. In some embodiments, the measures of service usage are obtained from: communicating one or more network traffic sequences between the device and a network function; and using the subset of service usage monitoring that includes the network traffic sequences to create and record characterizations of network performance.

In some embodiments, a processor of a network device configured as a device secure network performance record storage and processing function, for wireless communication with a wireless network in wireless communication with a plurality of wireless communication devices, with each wireless device including a secure network performance record generator, in which the processor of the network device is further configured to: provide individual secure communication channel between each of the plurality of secure network performance record generators and the network device, in which the communication channel security protocol is configured so that tampering with the secure network performance record may be detected; receive over the secure communications channel a plurality of secure network performance records from each of the secure network performance record generators, in which the plurality of secure network performance record are network performance statistics that provide indications of the performance level or congestion level of the network as experienced by the device; provide a device secure network performance record function in which the secure network performance record sequence for each device is stored; determine the sub network of the network that each device is connected to, and analyze the secure network performance records received from multiple devices connected to the same sub network to determine an aggregate characterization of the performance level or congestion level for the sub network, and perform the same operation to determine an aggregate characterization of the performance level or congestion level for other sub networks connected to the network; store the results of the aggregate characterization of the performance level or congestion level for each sub network that is characterized, and make the stored results available to other network devices or functions; and if any device data record has been compromised, delayed or removed, set a fraud detection error flag for that device to restrict network access and also signals network apparatus or a network administrator to take further action.

In some embodiments, a network performance characterization system is provided. In some embodiments, the network performance characterization system includes a processor of a wireless communication device for wireless communication with a wireless network, in which the processor is configured with a secure software or firmware instruction execution environment, and in which a program in the secure software or firmware instruction execution environment is configured to: communicate a plurality of traffic sequences between the device and a network device, in which the traffic sequences are secured; and initiate each traffic sequence based on one or more of the following: a pre-determined time or time interval, a service usage event or service usage condition that arises on the device, and as a response to a message communicated from the network device; and a processor of the network device in secure communication with the program (e.g., DDR processor) in the secure execution environment is configured to: monitor the plurality of the secure traffic sequences between service usage of the wireless communication device with the wireless network; use the monitoring results of the secure traffic sequences, create and record characterizations of network performance; analyze the characterizations of network performance and reduce the performance characterizations into one or more network performance statistics that provide indications of the performance level or congestion level of the network as experienced by the device; generate a plurality of network performance reports that include a sequence of the network performance statistics created at different times; in which the network performance reports are stored in a network performance report storage function; and the network performance report storage function is made available to other network devices or functions.

In some embodiments, the DDRs are applied to one or more of the following activities: service billing, service control, and/or access control; service usage measurement (e.g., fraud resistant and scalable device measurement of service usage); verifying monitored service usage; verifying that service usage control policies are properly implemented on the device; and a source of performance monitoring and/or measurement.

In some embodiments, the DDRs are communicated to a network element based on a configured time interval; based on a configured usage size (e.g., buffer size limit or predefine size limit for a device or based on other criteria); when modem resources reach a predefined threshold (e.g., usage threshold, such as out of memory or approaching a threshold limit usage of memory); in response to a request from a service processor executed on an application processor of the wireless communication device; in response to a request from a service controller (e.g., either directly or indirectly through a service processor executed on an application/general processor of the wireless communication device).

In some embodiments, a reconciliation process is provided for reconciling a plurality of device data records and service processor usage reports for monitored wireless communication devices to verify reported service usage for each of the monitored wireless communication devices, which includes one or more of the following: reconcile the received device data records from each of the plurality of monitored wireless communication devices and service processor usage reports for a predefined time period or based on a comparison for each received service processor usage report and associated device data records or based on a predefined service usage amount/bulk usage amount or based on a predefined period of time or based on a service policy verification setting; verify that the monitored wireless communication device has not been tampered with or compromised (e.g., missing, modified, delayed, and/or unreconciled DDRs or a discrepancy between received micro-CDRs and DDRs outside of tolerances); verify that the monitored wireless communication device's service usage is compliant with an associated service policy and/or service plan; verify that the monitored wireless communication device properly implemented a traffic control policy of an associated service policy/service plan for a period of time (e.g., QoS, NBS, throttling); verify an accuracy of the received service usage measures using the received plurality of device data records and service processor usage reports for each of the monitored wireless communication devices; and reconcile using a tolerance threshold. In some embodiments, the tolerance threshold (e.g., fixed amount, percentage based) accounts for variances between the received device data records and service processor usage reports for synchronized monitored time periods, including one or more of the following: a service provider configured tolerances, a configured tolerance in the reconciliation process for unclassified service usage in the received device data records and/or service usage that cannot be correlated with known service activities, redirected service usage activities for content distribution network services, and/or other possible differences and/or variations.

In some embodiments, a reconciliation engine performs one or more of the following: determine one or more patterns to account for synchronization errors or traffic classification errors over time (e.g., training period, periodic refining using heuristics); determine if the received device data records are properly associated within policy service usage activities (e.g., reverse DNS lookup, white list, or web crawler); perform a classification operation on the received plurality of device data records that is similar to a service processor classification (e.g., layer 7 service usage activity classification, such as reported in micro-CDRs/uCDRs), then group the received plurality of device data records usage into service usage activity classifications used by the service processor; determine the service processor usage reports' service usage measures for each service activity classification, then determine a percentage of each service usage activity that can be verified by classifying the received device data records' service usage measures; implement adaptive ambient techniques for reconciliation (e.g., using threshold based comparison techniques, for example, with DDRs and the use of reverse DNS for packet classification, then using the ratio of allowed usage for host sponsored service vs. ALL white-listed host names, vs. all unknown host names, vs. synchronization error tolerance, perform a comparison (with acceptable percentage of error) and identify potential fraud scenarios; perform reconciliation for one or more of the following classified services: sponsored services, user (e.g. open access) services, carrier services, network protection services (e.g., services that can be classified as background and thus be delayed in order to protect network bandwidth/resources for foreground/higher priority services) that are a part of the service plan classification definition; and reconcile using a third service usage measure (e.g., network based CDRs, FDRs, and/or IPDRs). In some embodiments, the secure device data record(s) can accompany the corresponding layer-7 classification information (e.g., domain names, application identifier, HTTP information, associative classification, and/or other information as described herein) with the 5-tuple classification information (e.g., source address, port address, destination address, destination port, and protocol) received from the Service Processor included in the DDR report, which, for example, can be sent to the Service Controller (e.g., or another network element) to assist in the service usage reconciliation and/or verification, using various techniques described herein.

In some embodiments, DDRs include one or more of the following: 5-tuple classification information, including a source address, a port address, a destination address, a destination port, and a protocol (e.g., inbound and outbound) and byte counts, and the tolerance threshold accounts for one or more of the following: usage measurement differences, time synchronization differences and/or information that is classified by the service processor with the advantage of information not available in the DDR processor classifier (e.g. application information, associative information, simpler classification implementations/algorithms in the DDR processor, etc.). In some embodiments, the service processor usage reports include one or more of the following that is not included in the received device data records: layer 7 monitored service usage information (e.g., domain names, application identifier, HTTP information, associative classification, and/or other information as described herein), and only a certain percentage of the received device data records are identified as associated traffic with a service usage activity, and for each service usage activity an allowance for unclassified traffic that varies by activity is provided (e.g., Amazon is "closed" while CNN is very diverse), in which a sum of all unclassified allowances does not exceed a total of unclassified received device data records information, and relaxing the tolerance for a first time interval and tightening the tolerance for a second time interval, in which the second time interval is longer than the first time interval. In some embodiments, the secure device data record(s) can accompany the corresponding layer-7 classification information (e.g., domain names, application identifier, HTTP information, associative classification, and/or other information as described herein) with the 5-tuple classification information (e.g., source address, port address, destination address, destination port, and protocol) received from the Service Processor included in the DDR report, which, for example, can be sent to the Service Controller (e.g., or another network element) to assist in the service usage reconciliation and/or verification, using various techniques described herein.

Advanced Wireless Service Platform (AWSP)

In some embodiments, an Advanced Wireless Service Platform (AWSP) is provided. In some embodiments, AWSP provides an enhanced networking technology platform that supports existing services and also provides for various new Internet and data service capabilities for wireless networks (e.g., 4G, 3G, and/or 2G networks), as described herein with respect to various embodiments. In some embodiments, wireless devices, processor(s), firmware (e.g., DDR firmware, as described herein with respect to various embodiments), and software provide an enhanced role in wireless network service policies for charging, access control and service notification to implement AWSP, as described herein with respect to various embodiments.

In some embodiments, AWSP supports a wide range of services, devices, and applications for consumer, enterprise, and machine to machine markets, as described herein with respect to various embodiments. In some embodiments, AWSP supports various device types, including the following: 4G and 3G smart phones, 4G and 3G feature phones, 4G and 3G USB dongles and cards, 4G-to-WiFi and 3G-to-WiFi bridge devices, 4G and 3G notebook and netbook computing devices, 4G and 3G slate computing devices, 4G and 3G consumer electronics devices (e.g., cameras, personal navigation devices, music players, and home power meters), and machine to machine devices (e.g., various types of consumer and industrial devices with minimal user interface (UI) capabilities such as geo-location tracking devices, parking meters, and vending machines).

In some embodiments, AWSP includes a device data record (DDR) processor. In some embodiments, the DDR processor includes firmware that is integrated into a secure hardware execution environment within an AWSP compliant processor (e.g., a processor or set of processors that are compatible with, support, approved for and/or certified for AWSP, such as through a wireless carrier AWSP chipset certification program). In some embodiments, the AWSP compliant processor is certified to qualify the processor for proper services delivery over AWSP, as described herein with respect to various embodiments.

In some embodiments, a DDR Firmware Developer's Kit (DDR FDK) is provided. In some embodiments, the DDR FDK includes firmware code (e.g., written in C), detailed DDR Processor specifications, detailed chipset Secure Execution Environment (SEE) specifications, DDR Processor chipset test criteria, and DDR Processor chipset certification procedures. For example, an approved chipset partner can integrate the DDR firmware into a Chipset Certification Device (CCD) for approved or certified processor(s) (e.g., chipsets that have been approved or certified under an AWSP Chipset Certification Program). In some embodiments, the CCD includes an approved chipset partner chipset Board Support Package (BSP) for a smart phone/feature phone device that includes the chipset submitted to the AWSP Chipset Certification Program. In some embodiments, the CCD includes a smart phone/feature phone device that includes the Approved Chipset Partner chipset submitted to the AWSP Chipset Certification Program. In some embodiments, various Operating Systems (OSs) are supported (e.g., Linux, Android, Apple, Microsoft, Palm/HP, Symbian, and/or various other operating systems and/or platforms).

In some embodiments, enhanced functionality includes integration of a Service Processor (SP) kernel program and application. In some embodiments, in addition to the DDR firmware, a Service Processor Software Developers Kit (SP SDK) is provided. In some embodiments, the SP SDK includes software and descriptive information for integrating the SP SDK kernel program and application software into a device OEM as described herein with respect to various embodiments. In some embodiments, an Approved Chipset Partner CCD connects to either Wireless Carrier's 3G (EVDO/UMTS) network or Wireless Carrier's 4G LTE network using a mutually agreeable WWAN wireless modem chipset that is certified for operation on Wireless Carrier's network.

DDR Processor Overview

In some embodiments, the DDR Processor is implemented within secure firmware embedded in either an applications processor unit (APU) or a modem processor unit (MPU). In some embodiments, the DDR Processor is provided as part of the device firmware build installed by an OEM at time of manufacture. In some embodiments, the DDR Processor monitors incoming and outgoing IP packets and gathers various statistics (e.g., Device Data Records (DDRs)). In some embodiments, a DDR is, in part, a record of the amount of data transmitted or service usage consumed along an IP flow. In some embodiments, an IP flow is specified by a source address, a destination address, a source port, a destination port, and a protocol type. In some embodiments, the secure device data record can also accompany the corresponding layer-7 classification information (e.g., domain names, application identifier, HTTP information, associative classification, and/or other information as described herein) with an IP flow (e.g., source address, port address, destination address, destination port, and protocol) received from the Service Processor. In some embodiments, DDRs also include other types of classification for network service usage, as described herein with respect to various embodiments. In some embodiments, DDRs also include various statistics related to or based on network service usage, as described herein with respect to various embodiments. In some embodiments, DDRs are used in 2G, 3G, and 4G wireless networks in both home and roaming network conditions for various service usage accounting, access control, and service policy enforcement verification functions, as described herein with respect to various embodiments.

FIG. 1 illustrates a high level diagram of an advanced wireless service platform end-to-end DDR reporting and processing system in accordance with some embodiments. In FIG. 1, four DDR implementation options are shown for securely embedding a DDR processor (e.g., DDR processor firmware and/or functionality) into an APU chipset or an MPU chipset. Each of these three options is described at a high level below and in more detail in following sections.

In some embodiments, a wireless communication device includes a DDR processor 114 in a secure execution environment. In some embodiments, the DDR processor 114 includes a DDR generator function (e.g., a function for generating secure DDRs, which can be reported to another element/function in the device and/or to a network element/function, such as a service controller 122) as described herein with respect to various embodiments. Various architectures are provided for implementing the DDR Processor in a secure execution environment.

Device architecture 101 includes the DDR processor 114 in a zone of data path security 140 (e.g., located in an application/general processor unit (APU)) as shown. Application programs 130 are monitored (e.g., service usage based monitoring) using a service processor application program 112. Kernel programs 132 are monitored using a service processor kernel program 113. An operating system (OS) 134 resides above a network stack 136 for network access, which is monitored by the DDR processor 114 for any network access through a modem bus driver and physical bus 142. As shown, 3G or 4G wireless network access is provided through a 3G or 4G modem 150 to a 3G or 4G networks 104, respectively. This device architecture and similar device architectures are described herein in more detail below.

Device architecture 102 includes the DDR processor 114 in a zone of data path security 143 (e.g., located in a modem processor unit (MPU)) as shown. Device architecture 102 is similar to device architecture 101 except that in device architecture 102 the zone of data path security 143 is located in 3G or 4G modem 151. Network communication via the modem 151 through modem bus driver and physical bus 149 and modem I/O 156 is monitored using the DDR processor 114 for any network access through a modem data path and signal processing 154. This device architecture and similar device architectures are described herein in more detail below.

Device architecture 103 includes the DDR processor 114 in a zone of data path security 145 (e.g., located in an APU or another processor/memory, such as a SIM card)) as shown. Device architecture 103 is similar to device architecture 101 except that in device architecture 103 the APU's modem bus driver and physical bus does not need to be in a secure zone and instead a data path security verifier 152 is included in the zone of data path security 147 in the MPU to restrict network access to only traffic that has been monitored by the DDR Processor 114 within APU. This device architecture and similar device architectures are described herein in more detail below.

Device architecture 103A includes the DDR processor 114 in a zone of data path security 918 (e.g., located SIM 913) as shown. Device architecture 103A is similar to device architectures 101 and 102, except that in device architecture 103A, as in device architecture 103, there are two zones of data path security. Zone of data path security 143 is located in 3G or 4G modem 151, and zone of data path security 918 is located on SIM 913. In device architecture 103A, modem bus driver and physical bus 149 does not need to be in a secure zone, and instead data path security verifier 152 is included in zone of data path security 143 in the MPU to restrict network access to only traffic that has been monitored by the DDR Processor 114 within SIM 913. This device architecture and similar device architectures are described herein in more detail below. Device architecture 103A enables a carrier to have complete control of the DDR processor functionalities, because the SIM considered in the industry to be a "carrier-owned" entity on the device.

As would be appreciated by a person having ordinary skill in the art, DDR processor 114 may be embedded in a secure zone of any other functional processor with a companion MPU to enforce network access. Such functional processors in which DDR processor 114 may be embedded include, for example, video processors, audio processors, display processors, location (e.g., GPS) processors, and other special-purpose processors as well as general-purpose processors such as digital signal processors (DSPs), microprocessors, etc.

In some embodiments, a Service Controller 122 is provided as shown. In some embodiments, Service Controller 122 is provided as an AWSP network server cloud system. In some embodiments, Service Controller 122 is provided as an AWSP network server cloud system that is used to perform one or more of the following: collect device service usage reports; manage certain aspects of device based network service policy; ascertain the Network Busy State (NBS) for various base stations on the network (e.g., wireless network(s)); manage the user notification and service plan selection UI processes configured on the device(s) (e.g., wireless communication device(s)); and manage certain aspects of service fraud detection. In some embodiments, the service controller 122 includes a secure DDR processing, usage reconciliation, and fraud detection function 124 as shown. In some embodiments, the service controller 122 communicates monitored service usage (e.g., reconciled service usage based on processed and reconciled secure DDRs) to network service usage reporting systems 180. In some embodiments, the reported service usage is aggregated and communicated to network billing systems 190 (e.g., for billing for the reported service usage).

In some embodiments, the Service Controller 122 communicates with various device-based elements of the AWSP system. In some embodiments, the Service Controller 122 communicates with various device-based elements of the AWSP system, including the following: the DDR Processor 114 and a Service Processor. In some embodiments, the Service Processor 112 includes an application Service Processor 112 (e.g., an application space or framework space program) and a kernel service processor 113 (e.g., a kernel space or driver space program). In some embodiments, the application service processor 112 and the kernel service processor 113 execute or perform in an OS partition on an application processor unit (APU) of a device (e.g., a wireless communication device). In some embodiments, the Service Processor is not generally in a secure execution area.

In some embodiments, the Service Processor performs various functions for the carrier network including collecting Network Busy State (NB S) information, service usage classification and reporting, certain network service policy enforcement functions, and/or certain user notification functions and roaming access policy enforcement functions, as described herein with respect to various embodiments. In some embodiments, the Service Processor also logs and reports device service usage information that assists a carrier (e.g., a service provider for a wireless network service or other services) in determining how to provide users with optimized services, information, and/or content.

In some embodiments, the DDR Processor 114 communicates DDRs to the Service Controller 122. In some embodiments, the DDR Processor 114 communicates DDRs to the Service Controller 122 via the Internet, a carrier network, and/or other network. In some embodiments, the DDR Processor 114 does not send DDRs directly to the Service Controller 122, but instead the DDR Processor 114 forwards the DDRs to the Service Processor. The Service Processor then forwards or relays the DDRs to the Service Controller 122 and, in some embodiments, along with additional service usage reports and/or other service policy management and user notification communications generated by or received by the Service Processor.

For example, the APU OS execution environment is generally not considered secure or trusted even though the Service Processor can be protected by the OS and/or other security elements within the system. In addition, the network data path between the DDR Processor 114 to the Service Processor is generally not considered to be secure or trusted and neither is the data path between the Service Processor and the Service Controller 122. Accordingly, in some embodiments, the DDR Processor 114 and the Service Controller 122 use cryptographic techniques to provide a secure link from the DDR Processor 114 to the Service Controller 122. In some embodiments, the DDR Processor 144 is considered secure and trusted based on various implementations and techniques as described herein with respect to various embodiments. In some embodiments, various techniques for securing the service usage monitoring and control performed by the DDR Processor 114 on a network data path, and securing the DDR reporting channel from the DDR Processor 114 to the Service Controller 122 are described herein with respect to various embodiments.

In some embodiments, a secure access controller function within the DDR Processor 114 is employed as described below to ensure that if the DDR flow is tampered with or blocked, then the device network access data path connection managed by the DDR Processor 114 is restricted to only those network destinations required to manage the DDR Processor 114 communication with the Service Controller 12. In some embodiments, the access controller function within the DDR Processor 114 receives feedback from the Service Controller 122 to restrict access or allow full access. For example, the restricted access list (e.g., a list of host names, IP addresses, and/or other identifiers for an access list) can either be pre-provisioned within the DDR Processor SEE or configured through the secure path as described in more detail herein.

In some embodiments, a secure, reliable, and trusted transmission of DDRs from the DDR processor 114 is provided by DDR reporting techniques, including the following: (1) the DDR Processor firmware is securely loaded and executed in a Secure Execution Environment (SEE); (2) the data path between the DDR Processor to the wireless modem antenna connection (e.g., a 3G or 4G network modem antenna connection) is secured to prevent fraudulent software or firmware from forming data paths that circumvent the DDR Processor data path processing; (3) the DDRs transmitted from the DDR Processor 114 to the Service Controller 122 are integrity checked in a manner that protects them from being tampered with or replayed; and (4) an authentication process between the DDR Processor 114 and the Service Controller 122 combined with a set of unique DDR report sequence identifiers and authentication session keep alive timers are used to maintain and verify the secure connection between the DDR Processor 114 and the Service Controller 122. For example, if the secure session or the flow of DDR records between the DDR Processor 114 and the Service Controller 122 are interrupted, then the secure access control function in the DDR Processor 114 can restrict access to the modem data path to the network destinations necessary to re-establish a securely authenticated session between the DDR Processor 114 and the Service Controller 122.

In some embodiments, the DDR Processor 114 also includes a secure Network Busy State Monitor function (e.g., NBS Monitor) as similarly described herein with respect to various embodiments. In some embodiments, the NBS Monitor logs and reports various network and modem performance parameters and also computes and reports a measure of network congestion referred to herein as the Network Busy State (NBS). In some embodiments, the NBS is a measure that indicates the level of network congestion at a give base station sector over a given measurement time interval. In some embodiments, all of this information is included in a Network Busy State Report (NBSR) that is part of the DDR message reports sent to the Service Controller 122 via the Service Processor 112.

Overview of Secure Image Programming, Secure Boot, Secure Execution, and Secure Firmware Update In some embodiments, the DDR Processor system includes a dedicated Secure Execution Environment (SEE) within the Application Processor Unit (APU) or modem chipset. In some embodiments, the SEE provides for a secure, trusted generation of DDRs as described herein. The basic functionality of the SEE in accordance with some embodiments is described below.

In some embodiments, the SEE is a secure memory execution partition that cannot be accessed by any external program, bus, or device port. In some embodiments, the secure memory execution partition includes code space and data space. In some embodiments, a secure boot loader executes within the SEE. In some embodiments, the only other code images allowed to execute in the SEE are secure images, meaning digitally-signed images whose signature is verified by the secure boot loader. In some embodiments, at time of device manufacture, the secure boot loader is programmed into nonvolatile memory in the on-chip SEE. For example, the secure boot loader can fetch a secure image from nonvolatile memory and install it in the SEE in a trusted and secure manner. In some embodiments, the secure boot loader is the only element capable of loading an image into the SEE.

In some embodiments, the DDR Processor 114 is implemented as a secure image. Installation of the DDR Processor image into the SEE using the secure boot loader is described below. Other secure images can be similarly installed as will be apparent to one of ordinary skill in the art in view of the embodiments described herein.

In some embodiments, the DDR Processor image is digitally signed by the device OEM. For example, the secure boot loader can verify the signature using a boot loader verification key and reject the image if the signature is invalid. In some embodiments, the boot loader verification key is a 2048-bit RSA public key embedded within the secure boot loader image.

In some embodiments, the signed DDR Processor image is stored in on-chip nonvolatile memory. In some embodiments, the signed DDR Processor image is stored in off-chip nonvolatile memory (e.g., if the on-chip storage capacity of the chipsets is too constrained to store this image).

Figure 2:
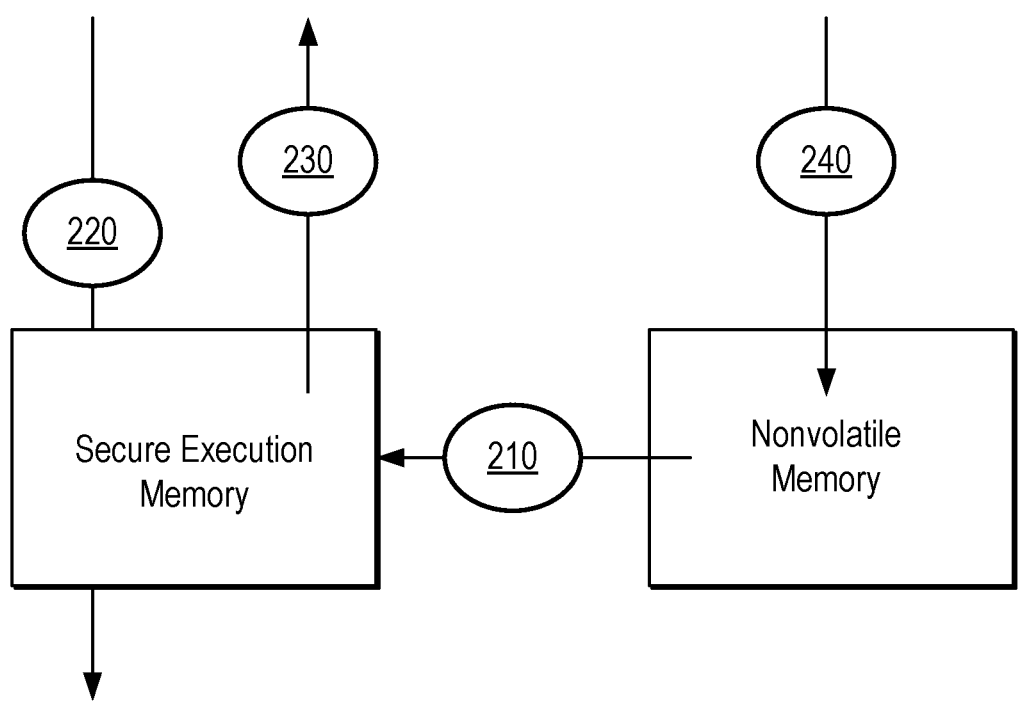
FIG. 2 illustrates a process for booting, executing, and updating the DDR firmware in accordance with some embodiments.

FIG. 2 illustrates a process for booting, executing, and updating the DDR firmware in accordance with some embodiments. As shown in FIG. 2, at 210, when the device boots, the Secure Boot Loader fetches the DDR Processor image from nonvolatile memory, installs it in the SEE, and executes it. In some embodiments, during installation, and prior to execution, the secure boot loader verifies the digital signature of the DDR Processor image using the boot loader verification key. If the signature is invalid, execution does not occur and an error message is sent to the Service Controller via the Service Processor, and the secure boot loader attempts to fall back to a previously stored image, as described herein with respect to various embodiments.

In some embodiments, the data path from the non-secure OS stack elements to the modem(s) being monitored and controlled by the DDR Processor must pass into the SEE and be made available to the DDR Processor, such as shown at 220 in FIG. 2. Once the OS stack data destined for the modem is transferred into SEE memory, the secure DDR Processor program analyzes and acts on the data destined for the modem as described herein with respect to various embodiments. In some embodiments, the DDR Processor includes a secure data interface from the SEE to the modem data path such that there are not any data paths that can circumvent the SEE (e.g., to avoid detecting and/or monitoring by the DDR Processor). Examples of secure execution partition and data interface solutions include a trusted API, an ARM Trust Zone, an Intel Smart & Secure, or a custom solution or proprietary solution specific, such as from a chipset supplier for specific chipsets.

In some embodiments, a communication channel (e.g., a DDR mail box) provides communication between the DDR Processor program executing in the SEE to a Service Processor application program executing in the non-secure OS environment (e.g., application space or user space), such as shown at 230 in FIG. 2. Example techniques for providing the DDR mailbox include shared memory using DMA channels, logical channels (e.g., endpoints) within the modem bus driver (e.g., USB interface) between the APU and MPU, and piggyback channels on top of an already exiting logical channel between the APU and MPU.

In some embodiments, the DDR Processor firmware image is updated, such as shown at 240 in FIG. 2. In some embodiments, the DDR Processor firmware image is updated using OEM processes supported by the chipset supplier for over the air (OTA) and over the network (OTN) update(s) of the chipset nonvolatile memory firmware image provided to device OEMs. In some embodiments, the DDR Processor is stored along with other chipset secure firmware drivers loaded by the secure boot loader either during the initial power up cycle, upon exiting from power save state and/or any other times that the download can be performed in secure manner. In some embodiments, the DDR Processor requires enough nonvolatile memory space to accommodate at least two images, one image that is currently running and a new downloaded image (e.g., each image can be of a specified maximum size, such as 0.5 MB or another size limit). In some embodiments, the secure boot loader includes a firmware image switch to use the new image once the download is complete. For example, the image switch function can include a fallback system to switch back to the current image if the new image has an invalid signature, or if the new image is older than the current image as indicated by revision numbers included within each image. The current image can be retained at least until the new image has been accepted by the secure boot loader.

Overview of DDR Processor Implementation Embodiments

The DDR Processor can be provided using different configurations for secure embedded DDR firmware (e.g., in AWSP chipsets) including in an APU implementation, an MPU implementation, and a combined APU/MPU implementation as described herein in accordance with various embodiments. Those of ordinary skill in the art will also appreciate that similar and various other secure partition configurations for providing secure embedded DDR firmware can be provided in view of the various embodiments described herein.

In some embodiments, the DDR processor is provided using an integration into the APU chipset SEE and nonvolatile memory, such as an APU implementation shown in device architecture 101 in which the DDR processor 114 and a modem bus driver and physical bus 142 are implemented in the zone of data path security 140 as shown in FIG. 1. The DDR Processor is securely implemented on the 2G, 3G, or 4G modem data path directly below the modem driver data path processing function and above the modem bus driver data path processing function (e.g., typically USB driver, SDIO driver, or similar bus driver function). For example, using this approach, the entire data path below the DDR Processor through the modem bus driver and through the 2G, 3G or 4G network modem can be secured to prevent data paths that circumvent the DDR Processor data path processing.

In some embodiments, the DDR processor is provided using an integration into the 2G, 3G, or 4G MPU chipset SEE and nonvolatile memory, such as an MPU implementation shown in device architecture 102 in which the DDR processor 114 and a modem data path and signal processing 154 are implemented in a zone of data path security 143 as shown in FIG. 1. The DDR Processor is securely implemented on the 2G, 3G, or 4G modem data path just below the modem bus driver and logical channel interface. For example, using this approach, the entire data path below the DDR Processor to the 2G, 3G or 4G network is secured to prevent data paths that circumvent the DDR Processor data path processing.

In some embodiments, the DDR processor is provided using an integration into the APU chipset SEE and nonvolatile memory, such as an APU and MPU implementation shown in device architecture 103 in which the DDR processor 114 is implemented in the zone of data path security 145, and a data path security verifier 152 and the modem data path and signal processing 154 are implemented in a zone of data path security 147 as shown in FIG. 1. The DDR Processor is securely implemented on the 2G, 3G, or 4G modem data path somewhere below the OS stack and above the modem bus driver. For example, using this approach, rather than securing the entire data path below the DDR Processor through the modem bus driver and through the 2G, 3G, or 4G network modem, the data path between the DDR Processor and the modem wireless network access connection is secured by integrity-checking the data that streams between the DDR Processor and a Data Path Security Verifier (DPSV) 152 function. Any data path information that is not properly accounted for and integrity-checked is not conducted to or from the wireless network connection. For example, this approach eliminates the need to secure APU firmware, hardware, and data path elements other than the DDR Processor itself.

Embedded DDR Processor Implementation on an Application Processor

In some embodiments, embedding the DDR processor in an Application Processor Unit (APU) (e.g., smart phone APU or other wireless communication device APU) provides a single secure DDR Processor location in the wireless network data path (e.g., 2G/3G/4G wireless network data path or other device I/O connection or port) that provides for service usage monitoring and access control for multiple wireless modems. Also, the APU implementation approach can allow APU chipset suppliers who may not necessarily have WAN modem components or technology to implement solutions compliant with the various AWSP techniques described herein. Further, the APU implementation approach generally more easily allows for OTA and OTN firmware updates for APU implementations as described herein (e.g., which can be more complicated to provide in certain MPU implementations). Many disclosed embodiments describe DDR APU implementations where the DDR acts on communications flows through one or more wide area network networks, connections, or modems. As would be appreciated by one of ordinary skill in the art, the APU embodiments for a secure device data record processing system can also act on communications that flow over one or more additional I/O networks, connections, ports, or modems (e.g., a WiFi network, connection, port, or modem; a USB network, connection, port, or modem; an Ethernet network, connection, port, or modem; a Firewire network, connection, port, or modem; a Bluetooth network, connection, port, or modem; a near field communication (NFC) network, connection, port, or modem; or another I/O connection, port, or modem).

Referring to device architecture 101 as shown in FIG. 1, the DDR Processor is embedded into the APU chipset SEE and nonvolatile memory as similarly described above. Along with the DDR Processor SEE, the secure data path environment, shown as the Zone of Data Path Security 140, includes the DDR Processor 114 and the modem bus driver and physical bus 142. For example, provided that the modem bus driver and the physical bus to the modem are secured against (e.g., or otherwise inaccessible to) fraudulent software or firmware attempting to circumvent the DDR Processor 114, the modem itself (e.g., 3G modem or 4G modem 150) need not be secured. In particular, the DDR Processor 114 is securely implemented on the 2G, 3G or 4G modem data path directly below the modem driver data path processing function and above the modem bus driver data path processing function (e.g., typically USB driver, SDIO driver or similar bus driver function). In some embodiments, the entire data path below the DDR Processor 114 through the modem bus driver and through the 2G, 3G or 4G modem is secured to prevent data paths that circumvent the DDR Processor data path processing. In some embodiments, all information communicated from the device over device network connection or I/O port via the data path processing function (e.g., typically a USB driver, an SDIO driver, an Ethernet driver, a Firewire driver, a WiFi driver, a Bluetooth driver, or a near field communication driver) is observed (and possibly processed to apply policy), classified, or reported on as it passes through the DDR Processor block. Accordingly, in some embodiments, the modem bus driver is either secured in the DDR SEE or in its own SEE, or the modem bus driver code and data path must be inaccessible to software or firmware on the APU that could circumvent the DDR Processor 114.

Figure 3:
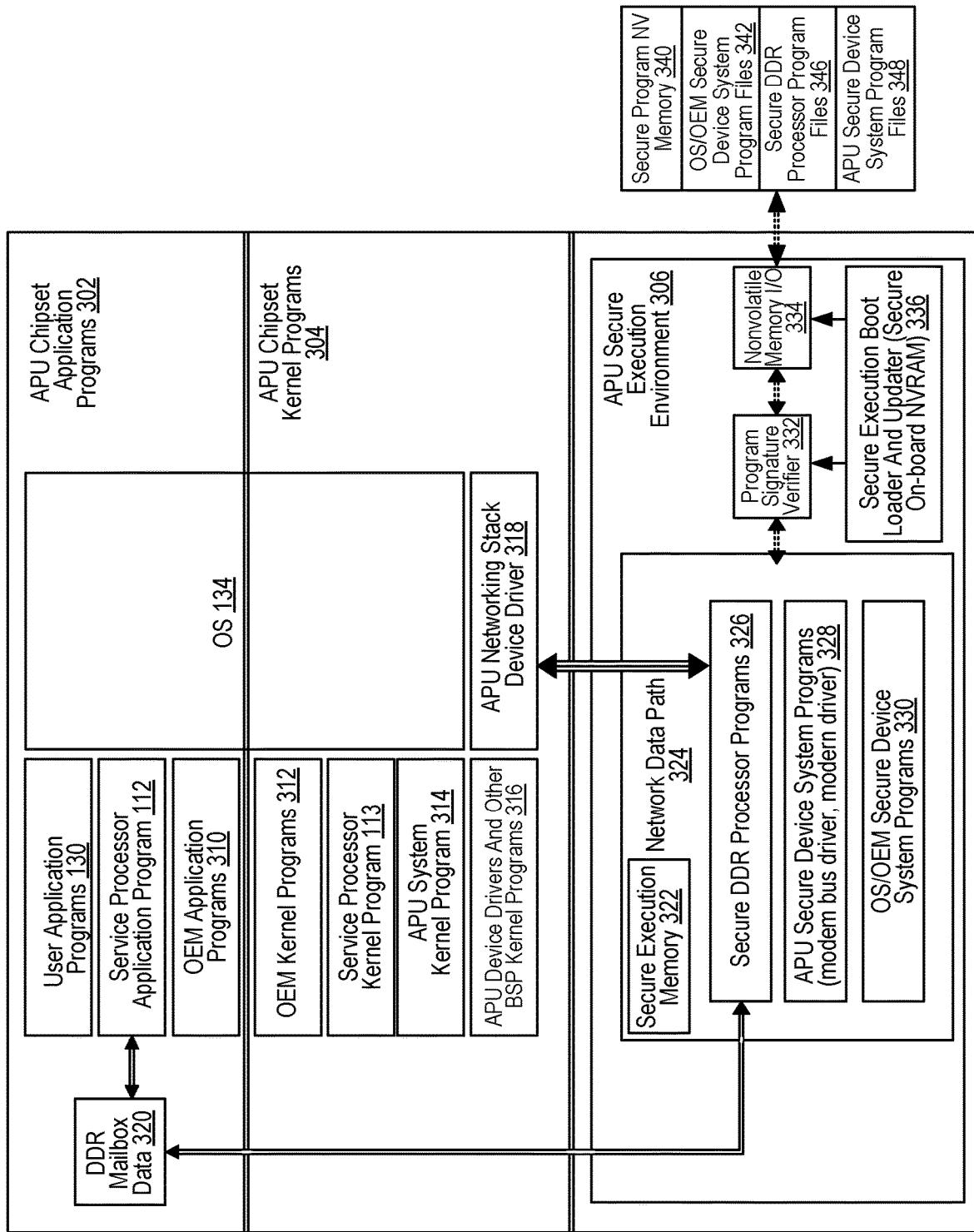
FIG. 3 illustrates an architecture for a secure embedded DDR Processor in an APU implementation in accordance with some embodiments.

FIG. 3 illustrates an architecture for a secure embedded DDR Processor in an APU implementation in accordance with some embodiments. In particular, FIG. 3 shows the major functional elements within an APU based solution in accordance with some embodiments, in which the DDR processor 114 resides in the APU's SEE together with other APU secure programs, and the DDR Processor's communication channel to the Service Processor application program 112 is via a shared mailbox (e.g., a shared memory). FIG. 3 also shows an interface to the non-volatile memory (e.g., for software downloads) with the presence of secure boot code to ensure that all secure codes are first digital signature verified before a download is considered complete. In some embodiments, the data path is a separate interface in which data frames are sent to the secure environment for the DDR processor to gain access and perform DDR usage measure in addition to controlling limited or unlimited network access.

Referring to FIG. 3, an APU can be logically partitioned into APU chipset application programs 302, APU chipset kernel programs 304, and a secure execution environment (SEE) shown as APU secure execution environment 306. The APU secure execution environment 306 communicates (e.g., using secure communication techniques, such as those described herein) with a network element/function (e.g., service controller 122 and/or other element(s)/function(s)). In some embodiments, secure program nonvolatile (NV) memory 340 includes OS/OEM secure device system program files 342, secure DDR processor program files 346, and APU secure device system program files 348 that can be fetched by the secure boot loader residing in the APU secure execution environment (SEE) 306 to be downloaded in to the SEE memory before code execution can take place as described herein.

The APU chipset application programs 302 include user application programs 130, service processor application program 112 (e.g., for performing various service processor functions that need not be implemented in the kernel, as described herein), and OEM application programs 310. The APU chipset kernel programs 304 include OEM kernel program 312, service processor kernel program 113 e.g., for performing various service processor functions that are preferably implemented in the kernel, as described herein), APU system kernel program 314, and APU device drivers and other BSP kernel programs 316. As also shown, OS 134 includes user/application space and kernel space implemented portions as would be apparent to one of ordinary skill in the art. Network access (e.g., 3G or 4G wireless network access) is communicated through APU network stack device driver 318, which resides in kernel space 304 as shown.

The APU SEE 306 includes a secure execution memory 322 for executing/storing secure DDR processor programs 326, APU secure device system programs (e.g., modem bus driver, modem driver) 328, and OS/OEM secure device system programs 330. The APU SEE 306 also includes a program signature verifier 332 for verifying the secure DDR processor programs 326 and/or other secure programs in the secure execution memory 322 as described herein. The APU SEE 306 also includes NV memory I/O 334 as shown. The APU SEE 306 also includes a secure execution boot loader and updater (e.g., secure on-board NVRAM) 336 for implementing a secure execution boot processes and secure update processes as described herein.

In some embodiments, the network data path 324 for any user or kernel mode applications or services are communicated from the APU networking stack device driver 318 and monitored using secure DDR processor programs 326.

As further described herein, secure DDR processor programs 326 communicate to the service processor application program 112 using a DDR mailbox function and communication channel as shown via DDR mailbox data 320. In some embodiments, the DDR mailbox function provides a secure communication channel using various techniques as described herein. In some embodiments, the DDR mailbox function is used to communicate secure DDRs generated using secure DDR processor programs 326 for monitored network service usage to the service processor application program 112. In some embodiments, the service processor application program 112 communicates the secure DDRs to a network element/function, such as the service controller 122. In some embodiments, the service processor application program 112 communicates the secure DDRs with a service processor report (e.g., which includes device based micro-CDRs/uCDRs based on monitored service usage based on service processor application programs 112 and/or service processor kernel programs 113, such as application based monitoring/layer-7 or application layer based monitoring, as described herein) to a network element/function, such as the service controller 122. In some embodiments, the service processor application program 112 communicates the secure DDRs with a service processor report for overlapping and/or common time periods/intervals (e.g., which facilitates reconciliation of device assisted service usage monitoring based on the two DAS assisted service usage measures by the service controller or other network elements/functions).

Figure 4:
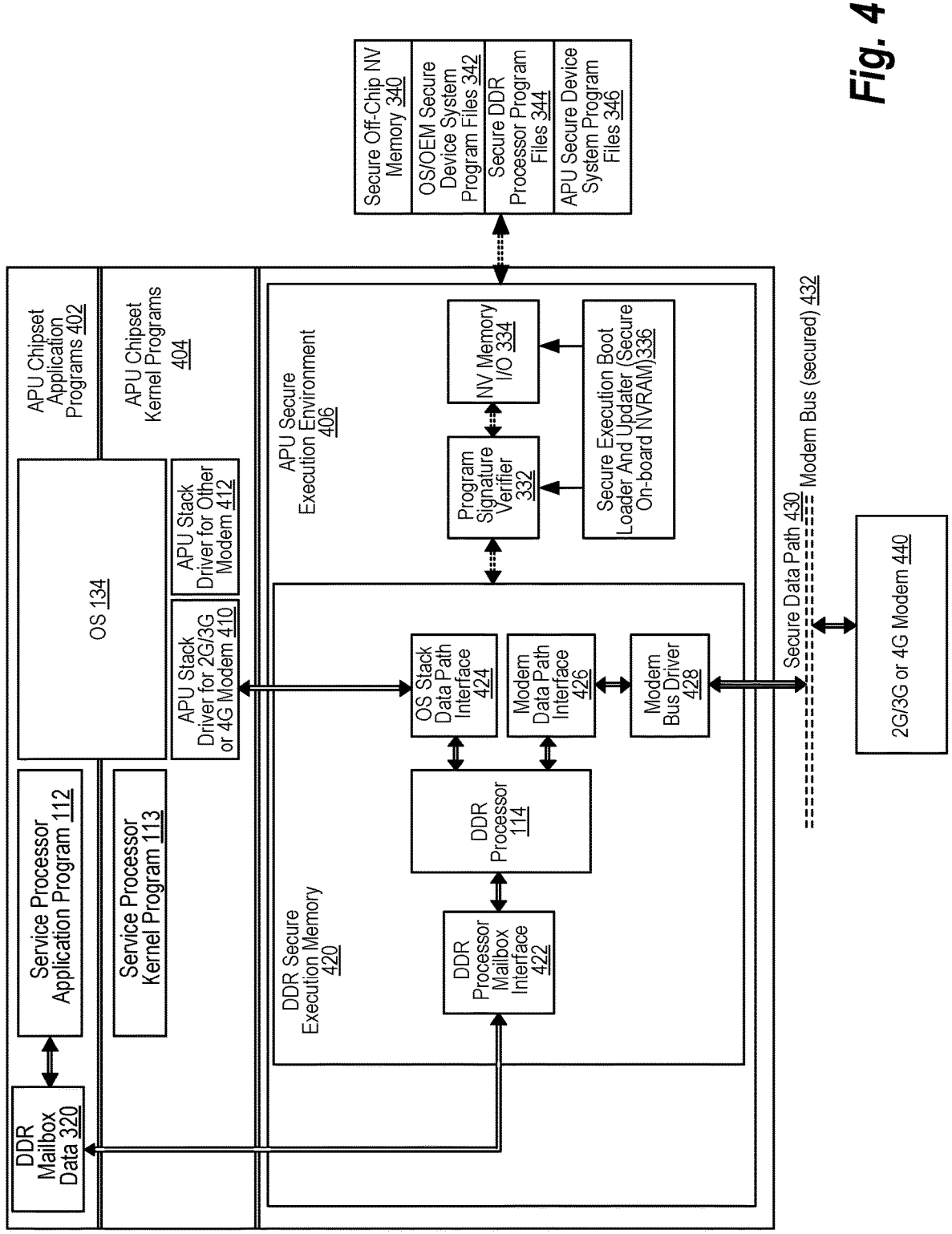
FIG. 4 illustrates another architecture for a secure embedded DDR Processor in an APU implementation along with a modem bus driver in accordance with some embodiments.

FIG. 4 illustrates another architecture for a secure embedded DDR Processor in an APU implementation along with a modem bus driver in accordance with some embodiments. In particular, FIG. 4 shows more detail on how DDR Processor 114 can be implemented in an APU secure operating environment along with a modem bus driver 428 (e.g., 2G, 3G, or 4G modem bus driver). DDR Processor 114 monitors IP packets going to and from the modem bus driver 428 (e.g. USB driver/controller), which provide for wireless network access via a secure data path 430 to a modem bus 432 for wireless access using a 2G/3G/4G modem 440 as shown. In some embodiments, DDR Processor 114 monitors IP packets going to and from device I/O driver (e.g., typically a USB driver, a 2G/3G/4G modem driver, an SDIO driver, an Ethernet driver, a Firewire driver, a WiFi driver, a Bluetooth driver, or a near field communication driver), which provides for device I/O access via a data path with secure DDR data path processing or monitoring.

As similarly described above, the secure execution boot loader and updater 336 loads DDR Processor 114 and modem bus driver images from nonvolatile (NV) memory 334 into the execution memory within SEE, shown as DDR secure execution memory 420, to execute (e.g., after code signature verification using secure program signature verifier 332). DDR Processor 114 and modem bus driver image and other secure images are all part of secure boot load to be signature verified before such are executed.

As shown, the DDR Processor sits in line with the 2G, 3G or 4G modem data path and all traffic between the OS stack and the 2G, 3G or 4G network is monitored by DDR Processor 114. DDR Processor OS stack data path interface 424 is provided that bridges between DDR secure execution environment (SEE) 420 and the unsecure OS stack in the kernel. Also, DDR Processor modem data path interface 426 is provided that similarly connects DDR Processor 114 to the modem data path fed by modem bus driver 428. In some embodiments, DDR Processor 114, which is provided in line on the data path and not simply a clone/monitor/drop function, also implements an access controller function to maintain the integrity of network access, for example, in the event that the DDR reports are tampered with or blocked from reaching the service controller 122 or DDR Processor 114 is tampered with, or Service Processor 112 is tampered with, as described herein.

As also shown, DDR processor mailbox interface 422 is provided that implements a mailbox function for passing DDR mailbox data 320 between secure DDR SEE 420 and unsecure Service Processor application 112. As would be apparent to one of ordinary skill in the art in view of the various embodiments described herein, the DDR mailbox function can be implemented in a variety of ways.

In some embodiments, the DDR Processor and USB driver execute in a secure environment on the application processor chipset, such as DDR secure execution memory 420. In some embodiments, the secure environment ensures no unauthorized ability to replace or modify the DDR Processor code or modem bus driver/controller code (e.g., a USB driver/controller or another device I/O driver/controller, such as a 2G/3G/4G modem driver/controller, an SDIO driver/controller, an Ethernet driver/controller, a Firewire driver/controller, a WiFi driver/controller, a Bluetooth driver/controller, or a near field communication driver/controller). In some embodiments, the secure environment also ensures that the data path from the DDR Processor to the physical modem bus driver (e.g., USB port, Ethernet port, Firewire port, WiFi port, Bluetooth port, NFC port, or another I/O bus port) is isolated from firmware outside the secure environment. That is, no firmware outside the secure environment has the ability to affect the accurate gathering of statistics by the DDR Processor. In some embodiments, the secure environment further ensures that there is no ability for code other than the DDR Processor to access sensitive crypto storage, such as keys. For example, this can include shielding sensitive storage from debug monitors and/or other monitoring/access activities or techniques. As would also be apparent to one of ordinary skill in the art, APU firmware, not just the DDR Processor, must be secured and not include bugs or vulnerabilities that can be exploited to allow for unauthorized access. For example, a common attack is buffer overflow, in which an attacker chooses inputs that cause an unchecked buffer to exceed its bounds, resulting in unintended behavior that the attacker can exploit.

There are various examples of APU chipset SEE Implementation techniques that can be used to meet these requirements as described above. For example, a conventional CPU with upgradeable firmware (e.g., including the DDR Processor) can be provided. The firmware can be stored in nonvolatile (NV) memory, or can be stored in flash memory in which the flash memory can be reprogrammed/updated with new or upgraded firmware. The firmware can be installed at time of manufacture and by design provides a compliant secure environment. Rigorous quality-assurance testing is required to ensure that bugs are unlikely to provide a means for compromising the secure environment. A new firmware image can be accepted for installation only if it has a valid digital signature. Version control checking can be included to prevent rollback to older versions. The firmware that validates the signature and version resides in firmware that can also be upgradeable. As another example, a security partitioned CPU can be provided, such as an ARM Trustzone or Intel Smart & Secure (e.g., or another suitable substitute including potentially supplier custom security environment CPU partitioning techniques). The DDR Processor, modem bus driver (e.g., a USB driver/controller or another device I/O driver/controller such as a 2G/3G/4G modem driver/controller, an SDIO driver/controller, an Ethernet driver/controller, a Firewire driver/controller, a WiFi driver/controller, a Bluetooth driver/controller, or a near field communication driver/controller), and any intervening code can execute in the secure partition, such as Trustzone's (e.g., or Smart & Secure's) secure mode. A secure boot procedure enforces the requirement that the DDR Processor, modem bus driver (e.g., a USB driver/controller or another device I/O driver/controller such as a 2G/3G/4G modem driver/controller, an SDIO driver/controller, an Ethernet driver/controller, a Firewire driver/controller, a WiFi driver/controller, a Bluetooth driver/controller, or a near field communication driver/controller), and intervening code can be included in a digitally signed, version-controlled code image. In such approaches, hardware firewalls can shield sensitive crypto storage from normal mode firmware. Also, the hardware firewalls ensure that normal mode firmware cannot tamper with the data path between the DDR Processor and the physical modem bus driver (e.g., USB port), thus, preventing interference with the gathering of service usage measure data and/or statistics as described herein.

Figure 5:
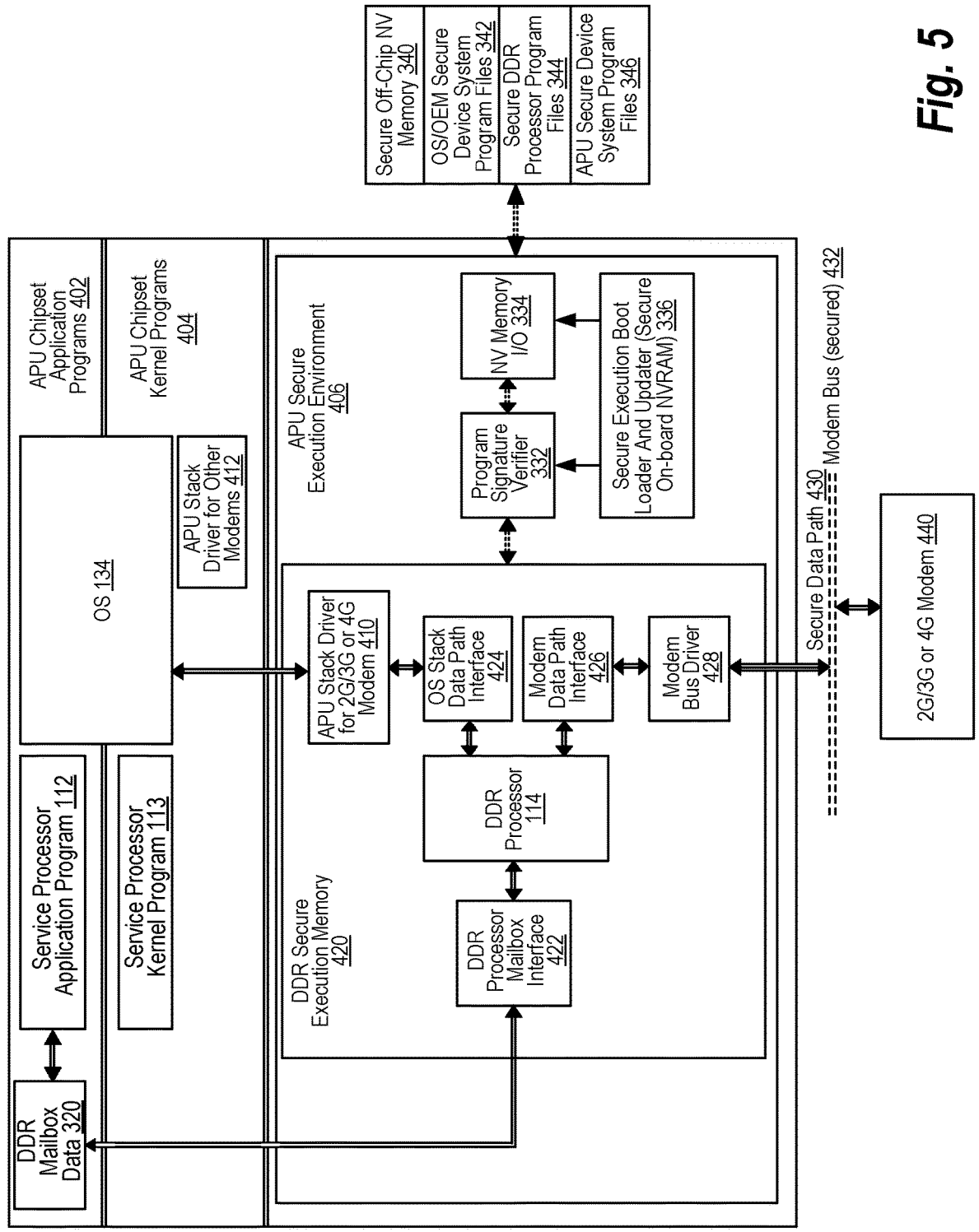
FIG. 5 illustrates another architecture for a secure embedded DDR Processor in an APU implementation along with a modem bus driver in accordance with some embodiments.

FIG. 5 illustrates another architecture for a secure embedded DDR Processor in an APU implementation along with a modem bus driver in accordance with some embodiments. In particular, FIG. 5 is similar to FIG. 4, except that as shown in FIG. 5, APU Stack Driver for 2G/3G or 4G Modem 410 is located in the DDR secure execution memory 420 instead of the APU kernel space 404.

Embedded DDR Processor Implementation on a Modem Processor

In some embodiments, in an MPU implementation, the DDR Processor resides in the modem processor with other secure modem data path processing code and hardware functions. For example, in an MPU-based secure DDR Processor implementation, once the data path below the modem bus driver interface is secured, it is relatively difficult to hack the device to create a data path that reaches the network by circumventing the DDR Processor. Also, for some MPU chipset families, it can be more straightforward to implement a secure execution environment, secure boot loader, and secure nonvolatile memory as compared to implementing the same functions in some APU families that do not have standard hardware security partition features, such as ARM Trust Zone and Intel Smart & Secure. Further, an MPU implementation can have less interaction with the OS kernel builds than in the case of an APU implementation. In some embodiments with an MPU implementation, DDR Processor 114 resides in a wireless wide area network modem such as a 2G, 3G or 4G modem, or in a local area or personal area modem such as a USB modem, an Ethernet modem, a Firewire modem, a WiFi modem, a Bluetooth modem, an NFC modem, or another I/O modem. Many of the described embodiments are for MPU implementations with wireless wide area network modem, but, as would be appreciated by one of ordinary skill in the art, other variations involving other I/O device modems are possible without departing from the scope of the disclosure.

However, it should also be observed that in a MPU DDR Processor implementation, the modem processor environment may not have a CPU with the same performance and secure execution memory space as an APU solution. This apparent disadvantage can be mitigated by designing and optimizing the DDR Processor firmware so that the code memory size is small and the CPU performance requirement is appropriate for a typically relatively low powered modem processor chipset CPUs. Also, as mentioned above, the OTA and OTN update process may be more complex than that achieved by certain APU chipset suppliers and their OEMs.

Figure 6:
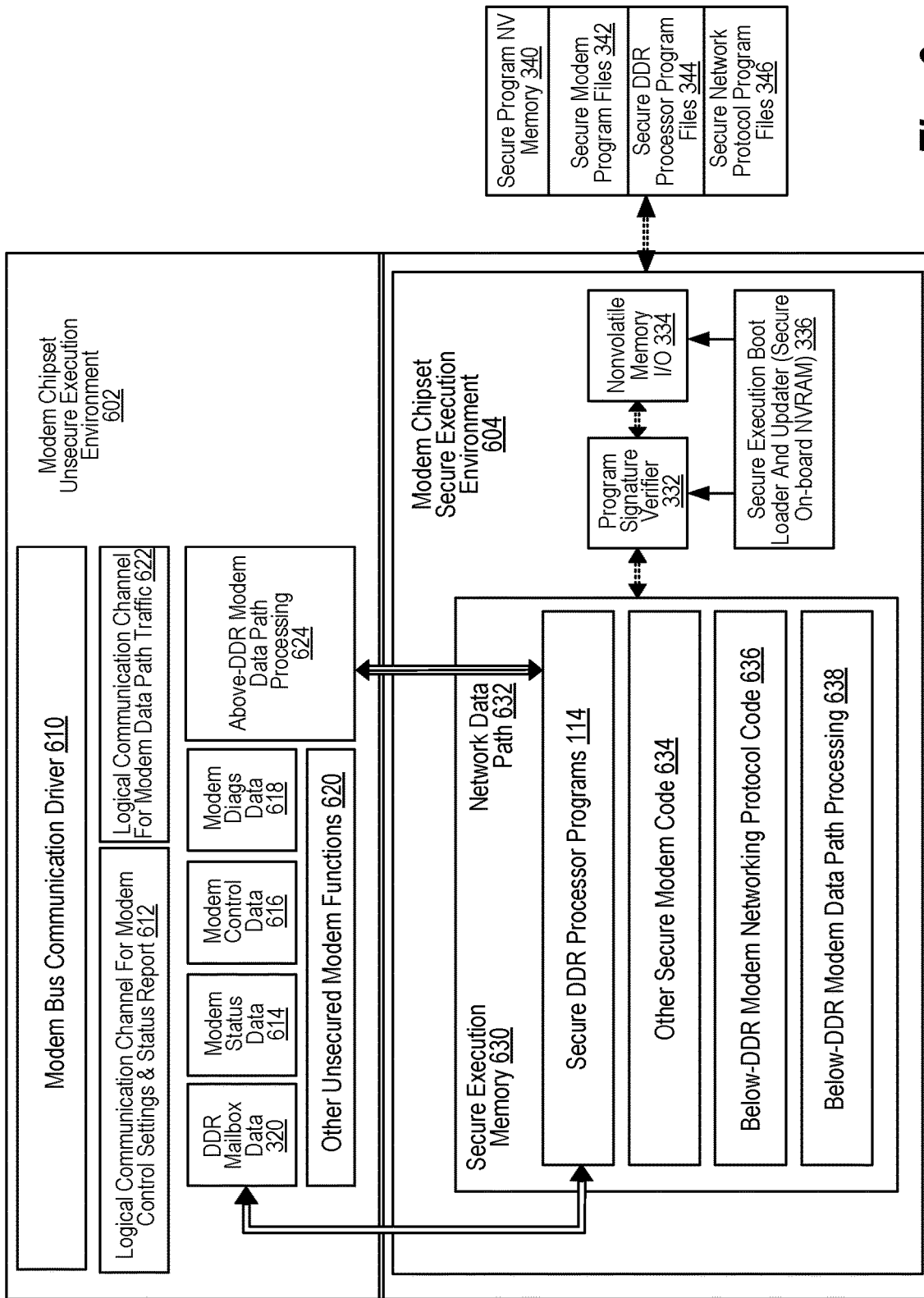
FIG. 6 illustrates an architecture for a secure embedded DDR Processor in an MPU implementation in accordance with some embodiments.

FIG. 6 illustrates an architecture for a secure embedded DDR Processor in an MPU implementation in accordance with some embodiments. In particular, FIG. 6 shows an MPU implementation that includes an embedded DDR Processor and modem data path from the DDR Processor to the network in the zone of data path security. In this approach, the DDR Processor 114 is embedded into secure execution environment (SEE) 604 and secure execution memory 630 of the modem chipset (e.g., 3G or 4G MPU chipset). As shown, to ensure that fraudulent software or firmware cannot circumvent the DDR Processor, the Zone of Data Path Security includes the DDR Processor 114 along with the modem data path processing and the modem signal processing that occurs between the DDR Processor and the antenna. In some embodiments, the DDR Processor 114 is securely implemented on the 3G or 4G modem data path just below the modem bus driver 610 and logical channel interface and the entire data path below the DDR Processor 114 to the 3G or 4G network is secured to prevent data paths that circumvent the DDR Processor data path processing.

Similar to the APU based approach discussed above, FIG. 6 shows the major functional blocks within a modem based solution in which the DDR Processor 114 resides in the modem's SEE monitor service usage via network data path 632, along with other secure modem code 634, below-DDR modem networking protocol code 636, and below-DDR modem data path processing 638, and the DDR processor's communication channel to the Service Processor application program is via a shared mailbox (e.g., serviced by a USB endpoint). This interface can either use a separate logical communication channel or be piggybacked on top of an already existing logical communication channel between APU and MPU. In some embodiments, the recipient of the DDR mailbox data 320 is the Service Processor Application code.

As also shown in FIG. 6, the interface to the non-volatile memory (e.g., for software/firmware downloads/updates) with the presence of secure boot code ensures that all secure codes are first digital signature verified before download is considered complete. The data path is a separate interface in which data frames are sent to the secure environment for the DDR processor to gain access and perform DDR usage measure in addition to controlling limited or unlimited network access.

Modem chipset unsecure execution environment 602 includes a modem bus communication driver 610. In some embodiments, a logical communication channel for modem data path traffic 622 and above DDR modem data path processing 624 is also provided. In some embodiments, a logical communication channel for modem control settings and status reports 612, modem status data 614, modem control data 616, modem diagnostics data 618, and other unsecured modem functions 620.

Figure 7:
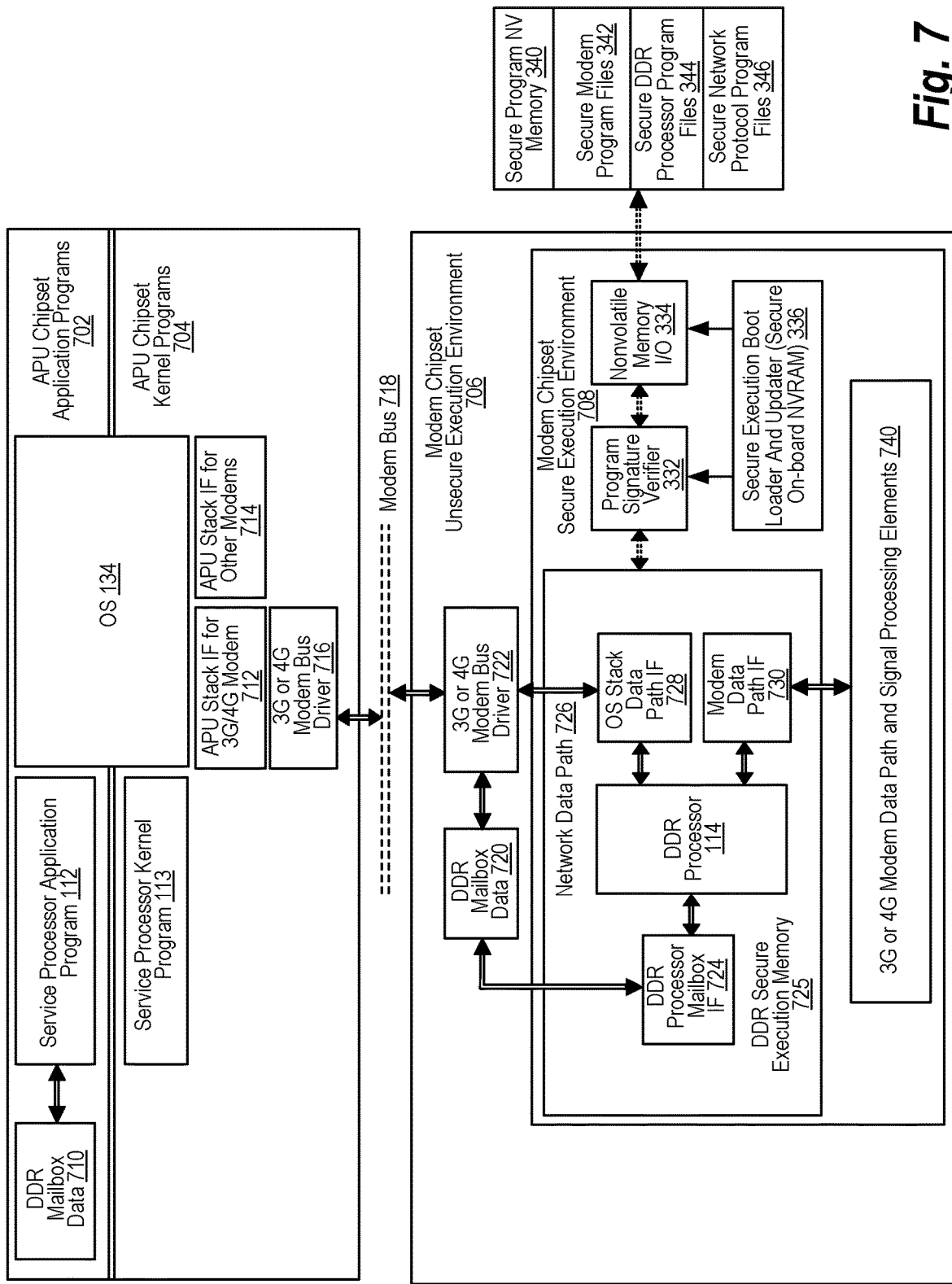
FIG. 7 illustrates another architecture for a secure embedded DDR Processor in an MPU implementation in accordance with some embodiments.

FIG. 7 illustrates another architecture for a secure embedded DDR Processor in an MPU implementation in accordance with some embodiments. In particular, FIG. 7 shows how the DDR Processor 114 is implemented in an MPU secure operating environment where the data path through the 3G or 4G modem network processing and signal processing is secured up to the antenna from access from software or firmware other than the DDR Processor. In some embodiments, the secure boot loader process operates as similarly described above.

As shown, APU chipset application programs 702, which includes DDR mailbox data 710 communicated to the service processor application program 112 as similarly described herein. APU chipset kernel programs 704 includes service processor kernel program 113 along with APU stack interface for 3G/4G modem 712, APU stack interface for other modems 714, and 3G or 4G modem bus driver 716 for communication via modem bus 718 to 3G or 4G modem bus driver 722 of modem chipset unsecure execution environment 706 as shown.

In some embodiments, the DDR Processor 114 is in line with the data path allowing for secure network/service usage measure and/or access control as similarly described herein with respect to various embodiments. In some embodiments, a DDR Processor OS stack data interface (IF) 728 is provided that bridges between the DDR secure execution environment (SEE) and the (potentially) unsecure modem bus driver interface 722 in modem chipset unsecure execution environment 706. As also shown, a DDR Processor modem data path interface 730 is provided that similarly connects the DDR Processor 114 to the modem data path processing and the modem signal processing 740 that occurs between the DDR and the antenna. As described herein, the DDR is in line on the data path and is not simply a clone/monitor/drop function, as the DDR Processor also implement an access controller function in accordance with some embodiments to maintain the integrity of network access in the event that the DDR reports are tampered with or blocked from reaching the Service Controller, or the DDR Processor is tampered with, or the Service Processor is tampered with.

As also shown, a mailbox function is provided that passes data between the secure DDR SEE 725 and the unsecure Service Processor application program 112. In particular, a DDR Processor mailbox interface (IF) 724 is in communication with a DDR mailbox 720, which is located in the modem chipset unsecure execution environment 706. DDR mailbox data 710 is shown as provided to the unsecure Service Processor application program 112, which is provided through the modem communication path via the modem bus driver 722 and the modem bus 718 as shown. The DDR Processor mailbox interface (IF) 724 is in communication with the DDR Processor 114 and is located in the DDR SEE 725. As would be apparent to one of ordinary skill in the art in view of the various embodiments described herein, the mailbox function can be implemented in a variety of ways. As similarly described above with respect to the various APU based embodiments, in accordance with some embodiments, the secure region is inclusive of all data path processing steps below the DDR Processor, and there is not any data path through the modem to the network that circumvents the DDR Processor.

In some embodiments, the DDR Processor executes in a secure environment in the MPU based embodiments, as similarly described above with respect to the APU based embodiments. In some embodiments, the secure environment ensures no unauthorized ability to replace or modify the DDR Processor code. In some embodiments, the secure environment also ensures that the data path from the DDR Processor to the antenna is isolated from firmware outside the secure environment. That is, no firmware outside the secure environment has the ability to affect the accurate gathering of statistics by the DDR Processor. In some embodiments, the secure environment further ensures that there is no ability for code other than the DDR Processor to access sensitive crypto storage, such as keys. For example, this can include shielding sensitive storage from debug monitors and/or other monitoring/access activities or techniques. As would also be apparent to one of ordinary skill in the art, MPU firmware, not just the DDR Processor, must be secured and not include bugs or vulnerabilities that can be exploited to allow for unauthorized access. For example, a common attack is buffer overflow, in which an attacker chooses inputs that cause an unchecked buffer to exceed its bounds, resulting in unintended behavior that the attacker can exploit.

Examples of secure execution environment (SEE) implementations in the MPU embodiments include the examples similarly discussed above for various secure execution environment (SEE) implementations in the APU embodiments.

Embedded DDR Processor Implementation on an Application Processor Combined with a Data Path Security Verifier on a Modem Processor In some embodiments, the DDR Processor is embedded in a SEE APU chipset, and a Data Path Security Verifier (DPSV) is embedded in the MPU chipset, such as shown in device architecture 103 of FIG. 1. For example, the DPSV can use cryptographic techniques to achieve a secure and trusted data path between the secure DDR Processor and the modem network antenna connection. This prevents a data connection between fraudulent software or firmware and the network without the need to secure the modem bus, the physical modem bus, and the modem data path elements above the DPSV element. By establishing a secure communication channel between the DDR Processor and the DPSV, a secure channel binding is created so that only network data path flows that are securely processed by the DDR Processor can reach the 3G or 4G modem connection to the wireless access network even if fraudulent software or firmware circumvents the DDR Processor by successfully gaining access to the modem bus interface. In the event that fraudulent software or firmware circumvents the DDR Processor and communicates intended unsecured data path information with the modem, the DPSV blocks the network data paths that are not processed and cryptographically secured by the DDR Processor.

Figure 8:
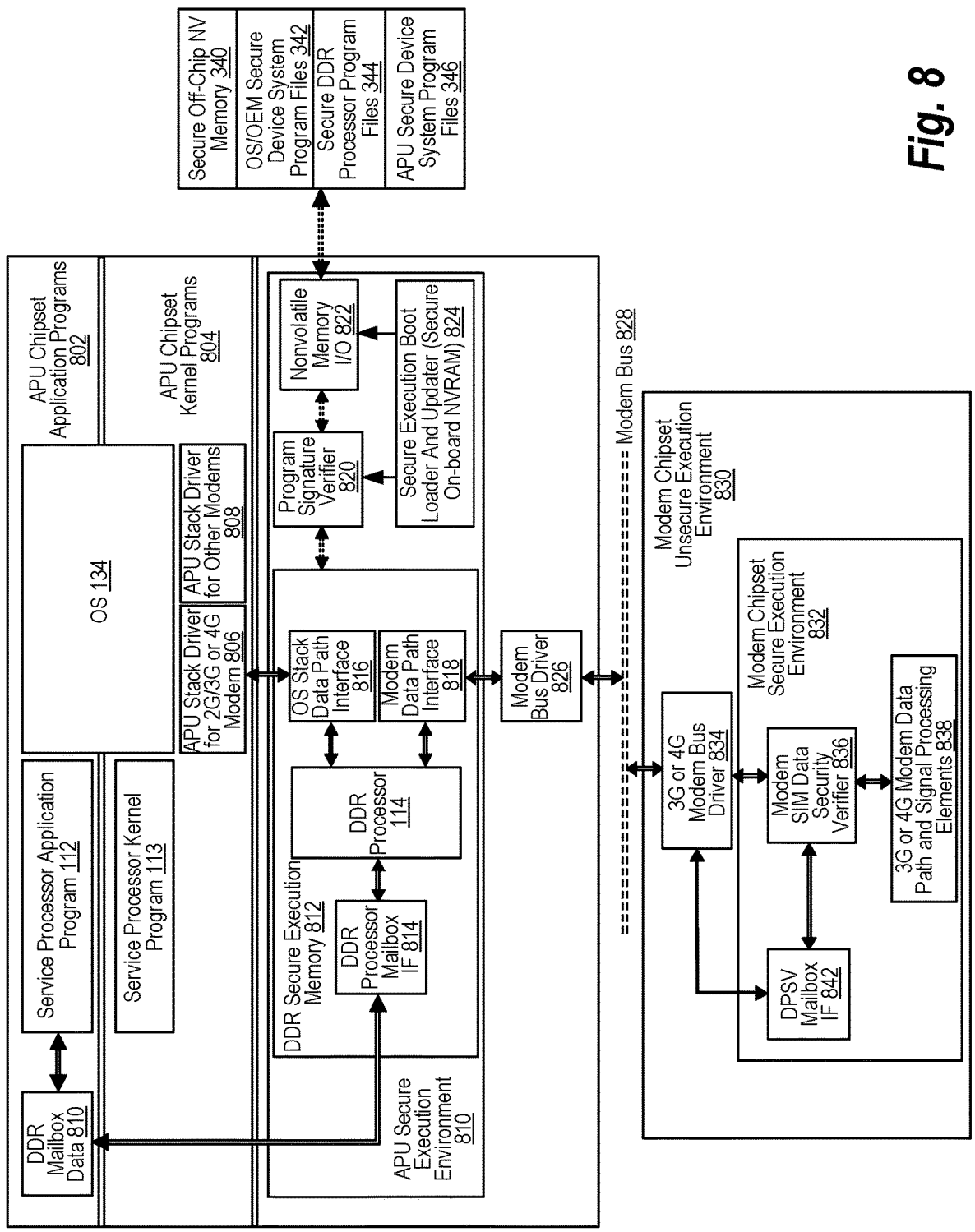
FIG. 8 illustrates an architecture for a secure embedded DDR Processor in an APU and a Data Path Security Verifier (DPSV) in an MPU implementation in accordance with some embodiments.

FIG. 8 illustrates an architecture for a secure embedded DDR Processor in an APU and a Data Path Security Verifier (DPSV) in an MPU implementation in accordance with some embodiments. In particular, as shown in FIG. 8, the DDR Processor 114 is embedded into the APU chipset SEE, and a second companion firmware image referred to herein as the Data Path Security Verifier (DPSV) 836 is embedded into the MPU chipset SEE (e.g., a 3G or 4G MPU chipset SEE). As also shown, to ensure that fraudulent software or firmware cannot circumvent the DDR Processor, there are two zones of data path security, one encompassing only the DDR Processor and the second one that includes the DPSV along with the modem data path processing and the modem signal processing that occurs between the DDR and the antenna (e.g., this second zone of data path security is similar to that of a modem-only implementation of the DDR Processor).

As mentioned above, this approach does not require securing the APU 3G or 4G modem bus driver and physical bus. For example, some vendors and/or chipset suppliers (e.g., AWSP APU chipset suppliers) may consider it easier to create two firmware images and two zones of data path security rather than securing the data path between the DDR Processor SEE and the modem antenna connection. As compared to the APU implementation based approach, the firmware for the APU is somewhat simplified and the security design work involved with securing the modem bus driver and physical bus can be eliminated. As compared to MPU implementation based approach, the modem firmware is also simplified. For example, in some APU chipset architectures, it may be difficult to secure the data path from the DDR Processor through the modem bus driver, the modem physical bus, and the modem itself. Also, in some MPU chipsets, as similarly discussed above, there may be a need to simplify or reduce the size of the secure firmware program image required on the MPU. Simpler and smaller firmware can reduce the frequency of required updates or perhaps eliminate them altogether. The APU DDR Processor and MPU DPSV implementation approach described herein reduces the firmware required on the MPU down to the DPSV. This allows more complex data path processing by the DDR Processor to be implemented on the APU, in which (i) secure firmware execution memory is typically larger and CPU performance is typically higher, and (ii) the firmware update system is typically more capable and more flexible. However, there are also drawbacks with the APU DDR Processor and MPU DPSV implementation approach. The primary drawback is that firmware generally must be embedded in both the wireless network chipset (MPU) and the device Application Processor (APU) chipset.

As shown in FIG. 8, a first SEE 810 is implemented on the APU chipset, which includes the DDR Processor 114 for securely monitoring communications from APU stack driver for 2G/3G/4G modem 806, using OS stack data path interface and/or modem data path interface 818 as similarly described herein. A second SEE 832 is implemented on the MPU chipset, which includes the Data Path Security Verification (DPSV) program 836. The DPSV 836 sits on the data path for the modem as shown. For example, the DPSV function can be quite simple: the DPSV 836 only passes data path information that is processed and acknowledged by the DDR Processor 114. The DPSV 836 is bound to the DDR Processor 114 so that it knows the secret session key of the DDR processor data path and can receive acknowledgements from the DDR Processor 114. Various techniques for how the DDR Processor 114 binds a secure data path channel to the DPSV 836, and how the DPSV 836 ensures that all 3G or 4G modem network service usage is being properly monitored and processed, is provided herein.

Referring to APU SEE 810, a program signature verifier 820, nonvolatile memory I/O 822, and secure execution boot loader and updater 824 as similarly described herein with respect to various embodiments. The APU SEE 810 also includes a DDR secure execution memory 812. The DDR secure execution memory 812 includes the DDR processor 114 for monitoring the data path through OS stack data path interface 816 and modem data path interface 818 for data path communications via modem bus driver 826 to modem bus 818 as shown. The DDR secure execution memory 812 also includes a DDR processor mailbox interface for providing DDR mailbox data 810 from DDR processor 114 to service processor application program 112 as shown and as similarly described herein. Similarly, the DPSV 836 uses the DPSV mailbox interface 842 as a communication channel to authenticate the DDR processor 114 and establish a secret session key to be used for message integrity check between the two. Various techniques for implementing the security binding between DDR Processor 114 and DPSV 836 are described herein.

In some embodiments, the DDR Processor executes in a secure environment in the APU based embodiments, as similarly described above with respect to the APU based embodiments. In some embodiments, the secure environment ensures no unauthorized ability to replace or modify the DDR Processor code. In some embodiments, the secure environment further ensures that there is no ability for code other than the DDR Processor to access sensitive crypto storage, such as keys. For example, this can include shielding sensitive storage from debug monitors and/or other monitoring/access activities or techniques. As would also be apparent to one of ordinary skill in the art, APU firmware, not just the DDR Processor, must be secured and not include bugs or vulnerabilities that can be exploited to allow for unauthorized access. For example, a common attack is buffer overflow, in which an attacker chooses inputs that cause an unchecked buffer to exceed its bounds, resulting in unintended behavior that the attacker can exploit.

Similarly, in some embodiments, the DPSV executes in a secure environment. In some embodiments, the secure environment ensures no unauthorized ability to replace or modify the DPSV code. In some embodiments, the secure environment further ensures that there is no ability for code other than the DPSV to access sensitive crypto storage, such as keys. In some embodiments, the secure environment further ensures that there is no ability for any code to interfere with the proper crypto functions of the DPSV or communications between the DPSV and the DDR Processor. For example, this can include shielding sensitive storage from debug monitors and/or other monitoring/access activities or techniques. As would also be apparent to one of ordinary skill in the art, MPU firmware, not just the DPSV, must be secured and not include bugs or vulnerabilities that can be exploited to allow for unauthorized access. For example, a common attack is buffer overflow, in which an attacker chooses inputs that cause an unchecked buffer to exceed its bounds, resulting in unintended behavior that the attacker can exploit.

In some embodiments, the APU includes a Data Path Processor (DPP) that includes the DDR Processor function, which is secured in an APU SEE as described herein. In some embodiments, the APU DPP also includes other service monitoring, control, and notification functions. In some embodiments, the modem includes a Data Path Security Verifier (DPSV) that secures the path between the APU DPP and the modem network data path so that only the DPP can transmit over the modem even if other software, firmware, buses, or ports have access to the modem. In some embodiments, the modem DPSV is bound to the APU DPP by one or more of the techniques described herein and/or similar or other techniques as would be apparent to one of ordinary skill in the art in view of the various embodiments described herein. For example, the APU DPP can be provided in a secured data path to the modem network connection that cannot be circumvented by software, firmware, buses, or ports on the device. This can be a hardwired data path via hardware design or a data path secured with a secure firmware or software execution environment for all the data path elements below the APU DPP. The APU DPP and modem exchange public keys and/or digital certificates and then execute a key exchange process to authenticate each other which results in a secret shared session key to be used as the basis for message integrity checking.

Once the secret shared session key is established between APU DPP and DSPV, the APU DPP uses the session key to append an integrity check on each frame to be transmitted, and the modem uses the session key to validate the integrity check. The modem only allows frames that have a valid integrity check to be transmitted, and it blocks frames that do not include a valid integrity check, meaning that only frames that were processed by the APU DPP get transmitted. Similarly, the modem DPSV uses the session key to append an integrity check to each received frame, and the APU DPP uses the session to validate the integrity check before it is sent to the higher layer (e.g., application layer, etc.).

In some embodiments, modem downstream data path messages between DPSV and DPP are sequenced. In some embodiments, APU DPP upstream messages include downstream sequence information so that modem DPSV can confirm that APU DPP is receiving all downstream packets, and if not, then the modem DPSV can inform the APU DPP, inform the Service Controller, and/or take action such as restricting access and/or other appropriate actions.

In some embodiments, the APU DPP generates secure DDRs and communicates the secure DDRs to the Service Controller in a sequenced and secure manner as described herein with respect to various embodiments.

In some embodiments, the Service Processor application and/or Service Processor kernel program informs the APU DPP as to which sockets/flows belong to which applications (e.g., can be or should be associated with which applications for application based service usage monitoring, billing, and/or control) so that the APU DPP knows which application is generating or receiving traffic in order to assist in application classification tag for charging, traffic control, and/or user notification policies.

In some embodiments, the APU DPP performs a variety of functions. In some embodiments, the APU DPP can perform DDR Processor functions. The APU DPP can perform any or all of the service monitoring functions of the Charging Agent (CA) and/or Policy Decision Agent (PDA). The APU DPP can count all network traffic, and in some examples, classifying traffic by application and/or destination, NBS, time of day, active network, and/or various other criteria as described herein. The APU DPP can generate charging records. The APU DPP can communicate charging records to the Service Controller (e.g., or another network charging function) and/or device notification UI.

In some embodiments, the APU DPP performs access controller functions. For example, the APU DPP can instruct the service processor application and/or kernel program to either allow or block/kill or background an application or destination. The service processor application and/or kernel program can either allow/block or background an application by manipulating the application access to the network or by intercepting the application program boot/start sequence, or from suspending/resuming the application. The service processor application and/or kernel program can perform the intercept functions by reprogramming or intercepting application management functions in the OS (e.g., such as the Android activity manager and/or the service manager functions). The APU DPP either instructs service processor application/kernel program to control application and/or traffic, or controls traffic directly in the DPP. The APU DPP can perform policy enforcement functions as described herein with respect to various embodiments.

In some embodiments, the APU DPP can perform NBS monitor functions and/or reporting functions. For example, the APU DPP can detect NBS, modem performance parameters, network assets involved in link, and/or geo-location information.

In some embodiments, the APU DPP obtains network time from network with "secure" ping-loop system to verify that network time stamp is not intercepted and delayed. For example, the APU DPP can either have a local reliable clock or can perform a ping-loop each time a report is started and/or stopped.

Examples of secure execution environment (SEE) implementations in the APU DDR Processor and MPU DPSV embodiments include the examples similarly discussed above for various secure execution environment (SEE) implementations in the APU embodiments. Specific examples are also listed below. Example commercially available APUs include the following: Intel Atom (e.g., Z5xx, Z6xx, D4xx, D5xx series) based solutions with Intel Trusted Execution Technology including TPM support; and ARM based solutions with ARM Trusted Zone Architecture. Example APU specification requirements can also include: common hardware security blocks (e.g., AES, DES, RSA, Diffie-Hellman, SHA, and a random generator). Example commercially available MPUs include the following: EVDO chipset based solutions (e.g., ARM 11-based CPU architecture, including ARM Trusted Zone Architecture with many common hardware crypto blocks); HSPA chipset based solutions (e.g., Snapdragon/ARM based CPU architecture, including ARM Trusted Zone Architecture with many common hardware crypto blocks); and LTE chipset based solutions (e.g., Snapdragon/ARM based CPU architecture, including ARM Trusted Zone Architecture with many common hardware crypto blocks).

Figure 9:
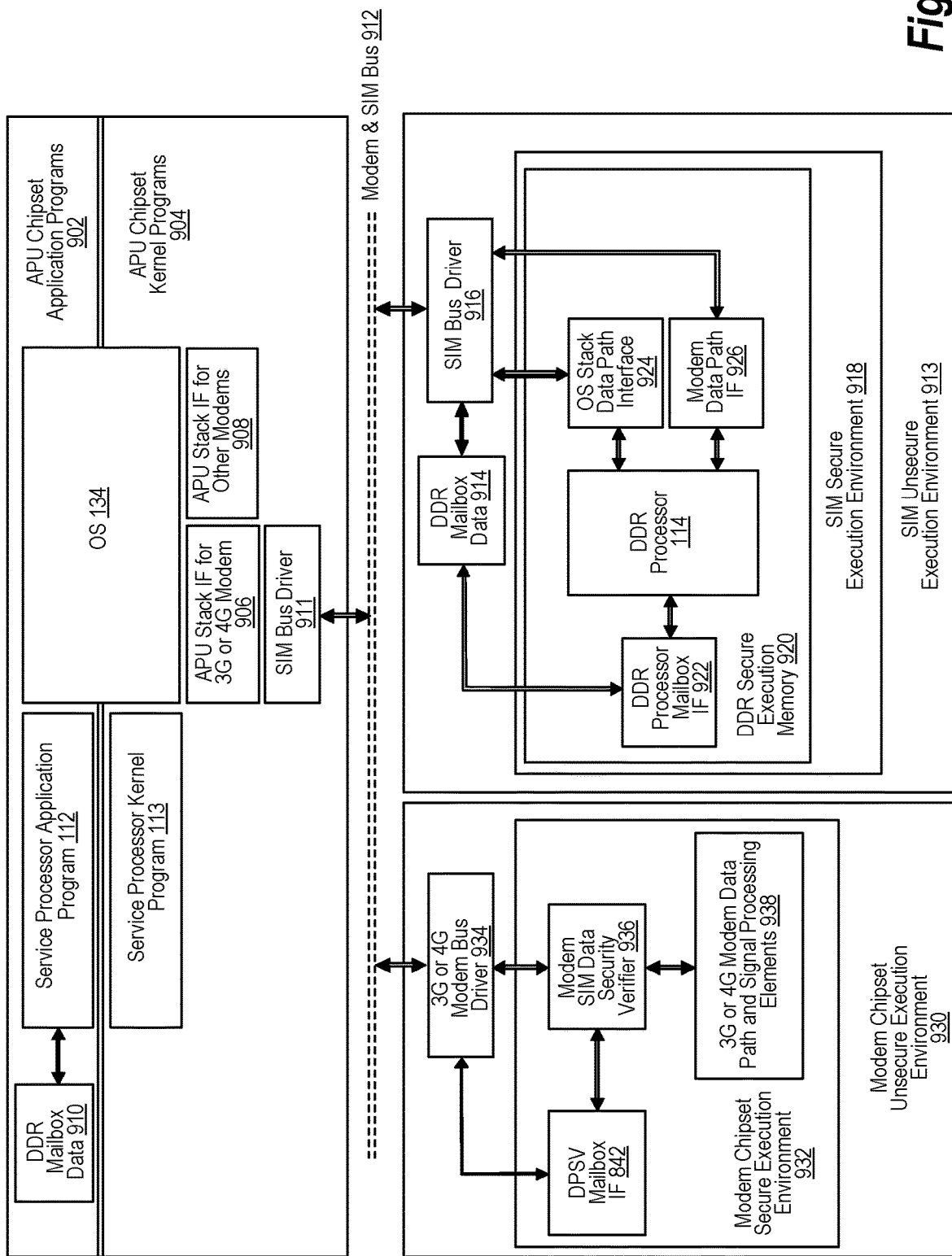
FIG. 9 illustrates an architecture for a secure embedded DDR Processor in a Subscriber Identity Module (SIM) and a Data Path Security Verifier (DPSV) in an MPU implementation in accordance with some embodiments.

FIG. 9 illustrates an architecture for a secure embedded DDR Processor in a Subscriber Identity Module (SIM) and a Data Path Security Verifier (DPSV) in an MPU implementation in accordance with some embodiments. In particular, as shown in FIG. 9, the DDR Processor 114 is embedded a SIM SEE 918, and the Data Path Security Verifier (DPSV) 936 is embedded into the MPU chipset SEE 932 (e.g., a 3G or 4G MPU chipset SEE). Data communications from the APU, such as those similarly described herein including the mailbox function, communicate using the SIM bus driver 911 using modem and SIM bus 912 as shown.

As shown in FIG. 9, a first SEE 918 is implemented in a SIM 913, which includes the DDR Processor 114 for securely monitoring communications from modem and SIM bus 912 to SIM bus driver 916, using OS stack data path interface 924 and/or modem data path interface 926 as similarly described herein. A mailbox function is similarly provided as described herein using DDR processor mailbox interface 922, DDR mailbox data 914, and DDR mailbox data 910 as shown.

As also shown in FIG. 9, data path communications via modem and SIM bus 913 to 3G/4G modem bus driver 934 to 3G/4G modem data path and signal processing elements 938 are monitored using modem SIM data security verifier 936 as described herein. The modem SIM data security verifier 936 is implemented in a modem chipset SEE 932 of the modem chipset/MPU 930 as shown. Additionally, there is a DPSV mailbox 842 that provides the communication channel to APU which the final destination to be DDR processor within the SIM for authentication and establishment of secret session key to be used as the basis for message integrity checking.

In some embodiments, the SIM includes a Data Path Processor (DPP) that embeds the DDR function, which is secured in the SIM SEE. For example, the SIM DPP can also include other service monitoring, control, and notification functions. In some embodiments, the modem includes a Data Path Security Verifier (DPSV) that secures the path between the SIM DPP and the modem network data path so that only the DPP can transmit over the modem even if other software, firmware, buses, or ports have access to the modem.

In some embodiments, the modem DPSV is bound to the SIM DPP by one of the following techniques and/or similar or other techniques as would be apparent to one of ordinary skill in the art in view of the various embodiments described herein.

For example, the SIM DPP can be provided in a secured data path to the modem network connection that cannot be circumvented by software, firmware, buses, or ports on the device. The secured data path can be a hardwired data path via hardware design or a data path secured with a secure firmware or software execution environment for all the data path elements below the SIM DPP. In some embodiments, the communication between the DPSV 936 and DDR Processor 114 is secured using various secure communication techniques, such as those described herein. In some embodiments, the DPSV has a unique private/public key pair and a digital certificate (cert) that attests to the authenticity of its public key. The DDR Processor has a unique private/public key pair and a digital certificate (cert) that attests to the authenticity of its public key. The DPSV and the DDR Processor exchange public keys and certs, then execute a key exchange process that authenticates each other and results in a secret, shared session key. The DDR Processor receives upstream network data flows from the device OS networking stack and, using the session key, it appends an integrity check to each upstream data message that it sends to the DPSV. The DPSV blocks any upstream data path information that does not have a valid integrity check from the DDR Processor and informs the DDR Processor that it is receiving invalid upstream data so that the DDR Processor may inform the Service Controller of a possible fraud event. The DPSV receives downstream network data flows and, using the session key, it appends an integrity check to each downstream data message that it sends to the DDR Processor. Each downstream data message is, for example, sequenced so that data messages cannot be blocked or replayed without being detected by the DDR Processor. If the DDR Processor receives a downstream data message with an invalid integrity check, the DDR Processor rejects the message and informs the Service Controller of a possible fraud event. The DDR Processor acknowledges each non-rejected downstream data message in the next upstream data message it sends to the DPSV. If the DPSV stops receiving downstream data message acknowledgements, it blocks downstream network data flows and informs the DDR Processor so that the DDR Processor may inform the Service Controller of a possible fraud event. The DDR Processor securely sends DDR reports to the Service Controller by way of the Service Processor as described herein with respect to various embodiments.

In some embodiments, the modem downstream data path messages between the DPSV and DPP are sequenced. In some embodiments, the SIM DPP upstream messages include downstream sequence information so that modem DPSV can confirm that the SIM DPP is receiving all downstream packets and, if not, then modem DPSV can inform the SIM DPP, inform the Service Controller, and/or take action such as restricting access or another appropriation action(s).

In some embodiments, the SIM-MPU interface is a physical interface (e.g., a bus). In some embodiments, the SIM-MPU interface is a logical interface (e.g., via untrusted APU). In some embodiments, the SIM is logically an independent security hardware module (e.g., part of a secure execution environment) embedded into any device processing element (e.g., a SIM, video processor, audio processor, display processor, etc.).

In some embodiments, a SIM and MPU exchange comprises several components. In some embodiments, each of the MPU and the SIM has its own public/private encryption key pair with a certificate. In some embodiments, the MPU and SIM exchange keys using a key exchange protocol. In some embodiments, this key exchange takes place over a physical bus between the MPU and the SIM. In some embodiments, this key exchange takes place through a logical bus (e.g., via an untrusted APU). Such key exchanges protocols are well known in the art and are not described here. In some embodiments, after the MPU and SIM have mutually authenticated the keys using certificates, they establish a shared session key. In some embodiments, the MPU and SIM initialize a transmit count value to zero, a receive count value to zero, a maximum transmit count value to an integer N, and a maximum receive count value to an integer M. In some embodiments, the values of M and N are the same. In some embodiments, the values of M and N are implementation-dependent and can be determined based on the MPU's receive and transmit packet processing capabilities. For example, by choosing M to be 3 and N to be 2, the SIM block expects to get an ACK frame from the MPU after no more than three received packets and no later than after two transmitted packets; otherwise the SIM concludes that fraud has occurred and informs a network element.

In some embodiments, the MPU sends only a relevant portion of the transmit frame to the SIM for each outgoing packet in order to reduce SIM processing requirements. In some embodiments, the relevant portion of the transmit frames includes a header, transmit count, and an integrity check. In some embodiments, the header includes information such as one or more of source and destination addresses, source and destination ports, a protocol tag, and a packet length in bytes. In some embodiments, the transmit count counts transmitted frames and increments with each transmit frame. In some embodiments, the integrity check is determined by hashing one or more of the session key, header, and the transmit count.

In some embodiments, the MPU also sends only a relevant portion of the receive frame to the SIM for each incoming packet. In some embodiments, the relevant portion of the receive frames includes a header, receive count, and an integrity check. In some embodiments, the header is the same as the transmit frame header (e.g., one or more of source and destination addresses, source and destination ports, a protocol tag, and a packet length in bytes). In some embodiments, the receive count increments with each received frame. In some embodiments, the integrity check is determined by hashing one or more of the session key, header, and transmit count.

In some embodiments, the frame acknowledgment (e.g., ACK) is the sum of the maximum transmit count, the maximum receive count, and the integrity check. In some embodiments, the maximum transmit count is set to (transmit count+N), where transmit count is the transmit count from the most recent transmit frame. In some embodiments, the maximum receive count is set to (receive count+M), where receive count is the receive count from the most recent received frame. In some embodiments, the integrity check is determined by hashing one or more of the session key, maximum transmit count, and maximum receive count.

In some embodiments, the interface between the MPU and the SIM is a logical channel (e.g., via untrusted APU). In some embodiments, on the transmit side the APU sends the SIM the transmit frame header only (e.g., one or more of source and destination addresses, source and destination ports, a protocol tag, and a packet length in bytes). In some embodiments, the SIM sends back to the APU the transmit count, the maximum receive count (e.g., receive count+M), and an integrity check. In some embodiments, the SIM increments the value of the transmit count for every transmitted frame. In some embodiments, the SIM determines the integrity check by hashing one or more the session key, the header, the transmit frame count and the maximum receive count. In some embodiments, the APU appends the header and the frame body to the SIM-delivered transmit count, max receive count, and the integrity check and sends the result to the MPU. In some embodiments, the MPU transmits only the frames passing the integrity check one at time. In such embodiments, the MPU may not use a maximum transmit count.

In some embodiments, the interface between the MPU and the SIM is a logical channel (e.g., via untrusted APU). In some embodiments, on the receive side the MPU sends the APU the header (e.g., one or more of source and destination addresses, source and destination ports, a protocol tag, and a packet length in bytes), the receive count, an integrity check, and the frame body. In some embodiments, the receive count is incremented for every received packet. In some embodiments, the integrity check is determined by hashing one or more of the session key, the header, and the receive count. In some embodiments, the APU sends only the header (e.g., one or more of source and destination addresses, source and destination ports, a protocol tag, and a packet length in bytes), the receive count, and the integrity check to the SIM. In some embodiments, the MPU can process more than a single receive frame before obtaining the SIM confirmation feedback. In some embodiments, the SIM ACK frame (e.g., the indication of the maximum receive count) is piggybacked onto the frame as described herein.

In some embodiments, the MPU sends the entire data frame to the SIM, and the SIM appends an integrity check to be validated on the transmit side and on the receive side. In some embodiments, the DSPV engine adds the integrity check to the data frames and sends them to the SIM. In such embodiments, the SIM interfaces with the APU, and the SIM (DDR Processor) is in the middle of the data exchange.

In some embodiments, in each transmit frame, the MPU increments the transmit count and compares that value to the value of maximum transmit count as obtained from the most recent frame acknowledgment. In some embodiments, if the transmit count is greater than the maximum transmit count, the MPU determines that the SIM is not receiving valid transmit frame data. In some embodiments, the MPU informs a network element (e.g., a trusted entity such as a service controller) that a fraud has occurred after determining that the SIM is not receiving valid transmit frame data.

In some embodiments, if the MPU detects an invalid integrity check in a frame acknowledgment, or if the SIM detects an invalid integrity check on a transmit frame, the MPU or the SIM determines that malicious behavior is occurring. In some embodiments, when the MPU or the SIM determines that malicious behavior is occurring, the MPU or the SIM informs a network element (e.g., a trusted entity such as a service controller) that a fraud has occurred. In some embodiments, if the MPU or the SIM does not determine that malicious behavior is occurring, the SIM updates the DDR data collection using the header from the transmit frame and reports the results to the network element.

In some embodiments, in each receive frame, the MPU increments the receive count and compares that value to the value of the maximum transmit count as obtained from the most recent frame acknowledgment. In some embodiments, if the receive count is greater than the maximum receive count, the MPU determines that the SIM is not receiving valid receive frame data. In some embodiments, the MPU informs a network element (e.g., a trusted entity such as a service controller) that a fraud has occurred after determining that the SIM is not receiving valid receive frame data.

In some embodiments, if the MPU detects and invalid integrity check in a frame acknowledgment, or if the SIM detects an invalid integrity check on a receive frame, the MPU or the SIM determines that malicious behavior is occurring. In some embodiments, when the MPU or the SIM determines that malicious behavior is occurring, the MPU or the SIM informs a network element (e.g., a trusted entity such as a service controller) that a fraud has occurred. In some embodiments, if the MPU or the SIM does not determine that malicious behavior is occurring, the SIM updates the DDR data collection using the header from the receive frame and reports the results to the network element.

In some embodiments, the SIM DPP generates secure DDRs and communicates the secure DDRs to the Service Controller in a sequenced and secure manner as described herein with respect to various embodiments.

In some embodiments, the Service Processor application and/or Service Processor kernel program informs the SIM DPP which sockets/flows belong to which applications so that the SIM DPP knows which application is generating or receiving traffic in order to assist in application classification tag for charging, traffic control, and notification policy.

In some embodiments, the SIM DPP performs a variety of functions, as described herein. For example, the SIM DPP can perform the DDR Processor functions. The SIM DPP can perform any or all of the service monitoring functions of the Charging Agent (CA) and/or Policy Decision Agent (PDA). The SIM DPP counts all traffic with the network, and in some cases, also classifies the traffic by application and/or destination, NBS, time of day (TOD), active network, and/or various other criteria. The SIM DPP can generate charging records. The SIM DPP can communicate charging records to the Service Controller (e.g., or another network charging function) and/or device notification UI.

As another example, the SIM DPP can perform various access controller functions. The SIM DPP can instruct the Service Processor application and/or kernel program to either allow, block/kill, or background an application or destination. The Service Processor application and/or kernel program can allow, block/kill, or background an application by manipulating the application access to the network or by intercepting the application program boot/start sequence, or from suspending/resuming the application. The Service Processor application and/or kernel program can perform the intercept functions by reprogramming or intercepting application management functions in the OS (e.g., such as the Android activity manager and/or the service manager functions). As an example, the SIM DPP can either instruct the Service Processor application and/or kernel program to control the application and/or traffic, or controls traffic directly in the DPP. The SIM DPP can also perform policy enforcement functions as described herein.

As yet another example, the SIM DPP can perform NBS monitoring and/or reporting functions. The SIM DPP can detect NB S, modem performance parameters, network assets involved in link, and geo-location.

As yet a further example, SIM DPP can obtain a network time from network with "secure" ping-loop system to verify that network time stamp is not intercepted and delayed. For example, the SIM DPP can either have local reliable clock or can perform ping-loop each time a report is started and/or stopped.

Figure 10:
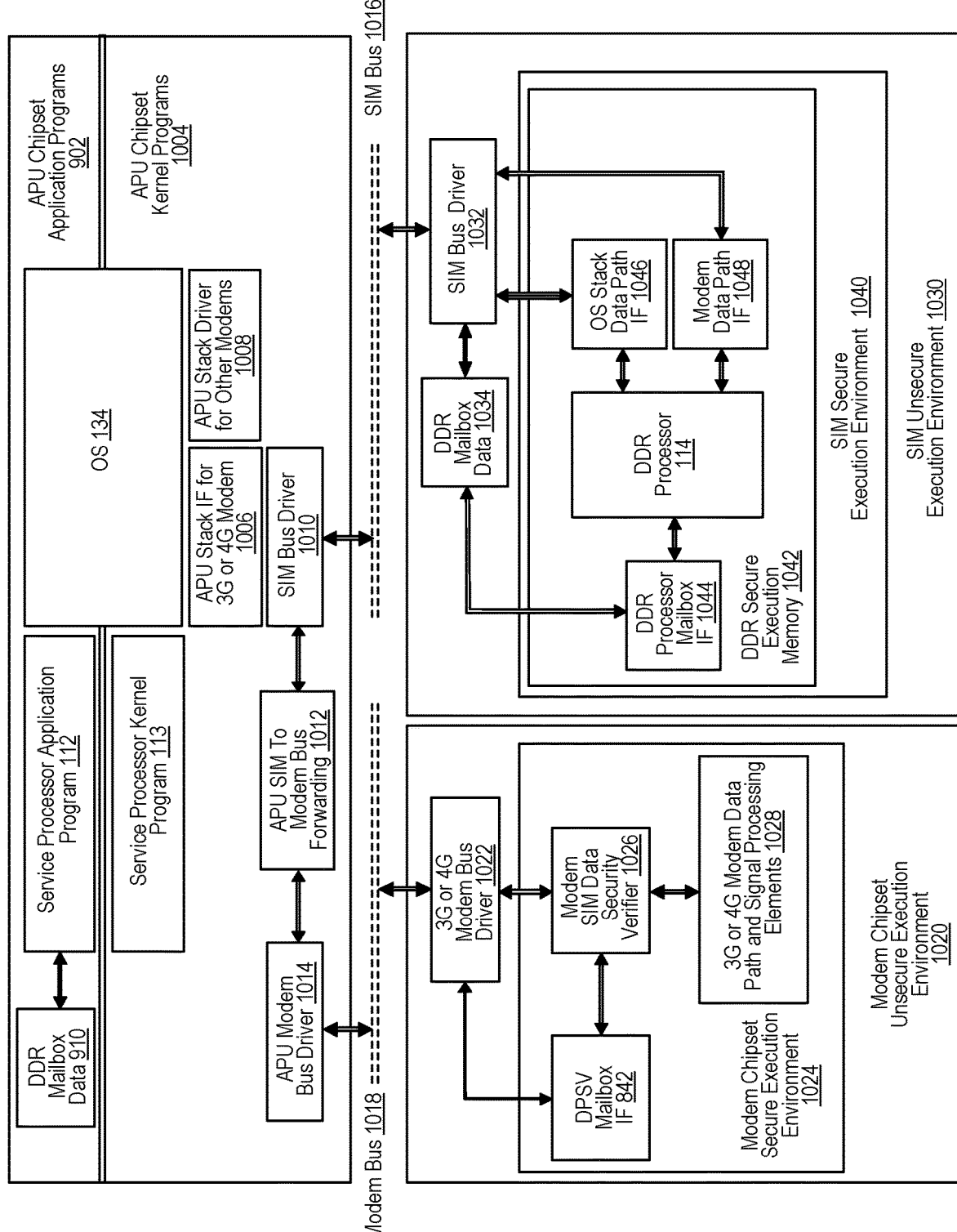
FIG. 10 illustrates another architecture for a secure embedded DDR Processor in a Subscriber Identity Module (SIM) and a Data Path Security Verifier (DPSV) in an MPU implementation in accordance with some embodiments.

FIG. 10 illustrates another architecture for a secure embedded DDR Processor in a Subscriber Identity Module (SIM) and a Data Path Security Verifier (DPSV) in an MPU implementation in accordance with some embodiments. In some applications it may be desirable to locate the DDR Processor on a standalone chipset that attaches to the APU or MPU chipset, such as a SIM card. FIG. 10 illustrates such an implementation in accordance with some embodiments. For example, an embedded DDR Processor can be implemented on a smart phone APU chipset combined with a Data Path Security Verifier (DPSV) implemented on a 3G or 4G wireless modem chipset.

In some embodiments, a hardware or firmware secure data path between the DDR Processor and the modem DPSV is not required, such as shown in FIG. 10, in which the DDR Processor is implemented on the SIM card (e.g., or another standalone security chipset) by providing a data path logical channel forwarding function on the APU and providing a mailbox data communication function between the Service Controller and the DDR Processor to connect over a SIM data bus. In addition, the DDR Processor reports to the Service Controller can be secured with none of the system elements on the APU being secured in a hardware assisted secured execution environment (SEE).

Referring to FIG. 10, the secure DDR Processor 114 is located in DDR Secure Execution Memory 1042 of SIM Secure Execution Environment 1040 on the SIM as shown, as similarly described above with respect to FIG. 9. The architecture of the APU is similar to that shown in and discussed above with respect to FIG. 9, except that an APU SIM to modem bus forwarding function 1012 and an APU bus driver function 1014 are added to the APU in the APU Chipset Kernel Programs 1004 as shown in FIG. 10. A secure DPSV 1026 is located in modem chipset SEE 1024 of the modem for monitoring communications from 3G/4G modem bus driver using 3G/4G modem data path and signal processing elements 1028 as similarly described above with respect to FIG. 9. However, in FIG. 10 in comparison with FIG. 9, the MPU and SIM are separate hardware or chipsets that communicate with the APU via independent communication buses. In particular, the MPU communicates with the APU via modem bus 1018 using 3G/4G modem bus driver 1022 to APU modem bus driver 1014 and APU SIM to modem bus forwarding function 1012 as shown. The SIM communicates with the APU via SIM bus 1016 using SIM bus driver 1032 to SIM bus driver 1010 as shown. Also, the DPSV uses DPSV mailbox 842 as the communication channel to authenticate the DDR processor 114 in the SIM where the connection is established within the APU. As shown the APU has two communication channels; a first communication channel with the DDR processor and a second communication channel with the DPSV.

In some embodiments, a first logical communication channel is created over the SIM bus 1016 between the Service Processor DDR mailbox 910 on the APU and the DDR mailbox 1034 on the SIM, and this supports the communication between the Service Processor (e.g., Service Processor application program 112 and/or Service Processor kernel program 113) and the DDR Processor 114 using DDR processor mailbox interface 1044 to DDR mailbox data 1034 to SIM bus driver 1032 as shown. A second logical data channel is created over the SIM bus 1016 between the OS networking stack and the DDR Processor 114, and this is the logical channel intended for all OS networking stack communications with the 3G or 4G network using OS stack data path interface 1046 to SIM bus driver 1032 as also shown. A third logical communication channel is created between the SIM DDR Processor 114 and the modem DPSV 1026. This third logical communication channel is formed by forwarding data between the SIM bus interface (e.g., modem data path interface 1048 to SIM bus driver 1032) located on the SIM, the SIM bus driver 1010 located on the APU, the SIM to modem bus forwarding function 1012 located on the APU, the modem bus driver 1014 located on the APU, and the modem bus interface 1022 located on the modem as also shown.

In some embodiments, the communication between the DPSV 1026 and DDR Processor 114 is secured using various secure communication techniques, such as those described herein. In some embodiments, the DPSV has a unique private/public key pair and a digital certificate (cert) that attests to the authenticity of its public key. The DDR Processor has a unique private/public key pair and a digital certificate (cert) that attests to the authenticity of its public key. The DPSV and the DDR Processor exchange public keys and certs, then execute a key exchange process that authenticates each other and results in a secret, shared session key. The DDR Processor receives upstream network data flows from the device OS networking stack and, using the session key, it appends an integrity check to each upstream data message that it sends to the DPSV. The DPSV blocks any upstream data path information that does not have a valid integrity check from the DDR Processor and informs the DDR Processor that it is receiving invalid upstream data so that the DDR Processor may inform the Service Controller of a possible fraud event. The DPSV receives downstream network data flows and, using the session key, it appends an integrity check to each downstream data message that it sends to the DDR Processor. Each downstream data message is, for example, sequenced so that data messages cannot be blocked or replayed without being detected by the DDR Processor. If the DDR Processor receives a downstream data message with an invalid integrity check, the DDR Processor rejects the message and informs the Service Controller of a possible fraud event. The DDR Processor acknowledges each non-rejected downstream data message in the next upstream data message it sends to the DPSV. If the DPSV stops receiving downstream data message acknowledgements, it blocks downstream network data flows and informs the DDR Processor so that the DDR Processor may inform the Service Controller of a possible fraud event. The DDR Processor securely sends DDR reports to the Service Controller by way of the Service Processor as described herein with respect to various embodiments.

In some embodiments, the DDRs transmitted from the DDR Processor to the Service Controller are integrity checked and sequenced in a manner that cannot be tampered with or replayed. An authentication process between the DDR Processor and the Service Controller combined with a set of unique DDR report sequence identifiers and authentication session keep-alive timers are used to maintain and confirm the secure connection between the DDR Processor and the Service Controller. If the secure session or the flow of DDR records between the DDR Processor and the Service Controller are interrupted, then the access control function in the DDR Processor restricts access of the 3G or 4G modem data path to the network destinations necessary to reestablish a securely authenticated session with between the DDR and the Service Controller.

Figure 11:
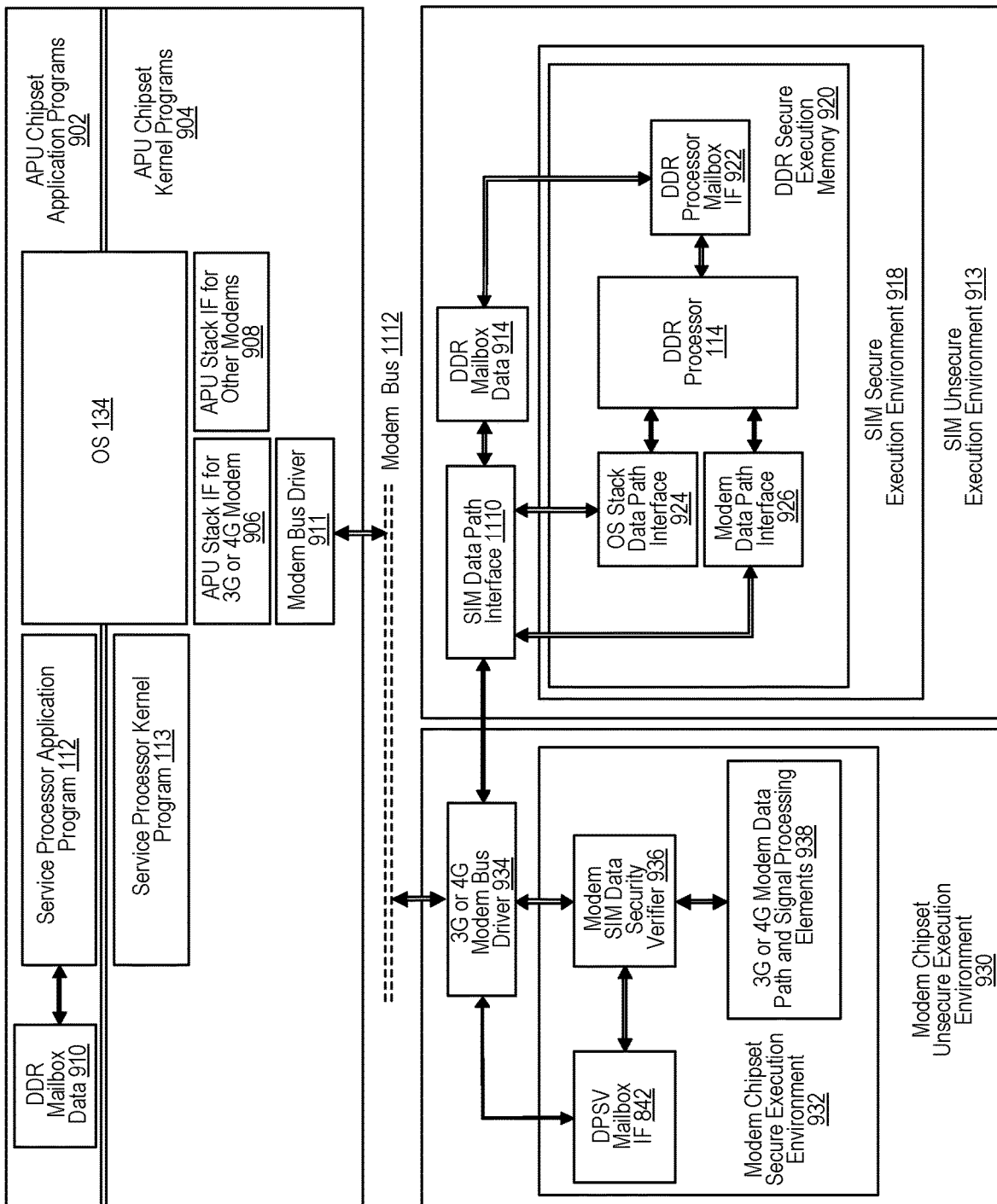
FIG. 11 illustrates another architecture for a secure embedded DDR Processor in a Subscriber Identity Module (SIM) and a Data Path Security Verifier (DPSV) in an MPU implementation in accordance with some embodiments.

FIG. 11 illustrates another architecture for a secure embedded DDR Processor in a Subscriber Identity Module (SIM) and a Data Path Security Verifier (DPSV) in an MPU implementation in accordance with some embodiments. FIG. 11 is similar to FIG. 9 except that as shown a SIM data path interface 1110 is provided for direct communication from the SIM with 3G or 4G modem bus driver 934 on the MPU. SIM communications, such as those similarly described herein to the APU including the mailbox function, communicate using the SIM data path interface 1110 to the 3G or 4G modem bus driver 934 using modem bus 1112 to communicate with the APU via modem bus driver 911 and the APU stack interface for 3G or 4G modem 906 as shown.

In some embodiments, various other architectures including various other locations of the DDR Processor can be provided using these or similar techniques as will now be apparent to one of ordinary skill in the art in view of the embodiments described herein.

In some embodiments, various other architectures including various other locations of the DDR Processor and/or DPSV can be provided using these or similar techniques as will now be apparent to one of ordinary skill in the art in view of the embodiments described herein.

For example, the DDR Processor (e.g., and/or various secured elements of the Service Processor) can be located in various other locations (e.g., in various secure operating environments) that involve network access policy enforcement at higher levels in the network stack. In particular, certain functions performed by the Service Processor without hardware security can be located in hardware secured execution memory. Such functions can include 3G and 4G network data path processing and usage report functions, 3G and 4G network application access management and usage reporting functions, and 3G and 4G service user notification and customer activity status functions.

Figure 16:
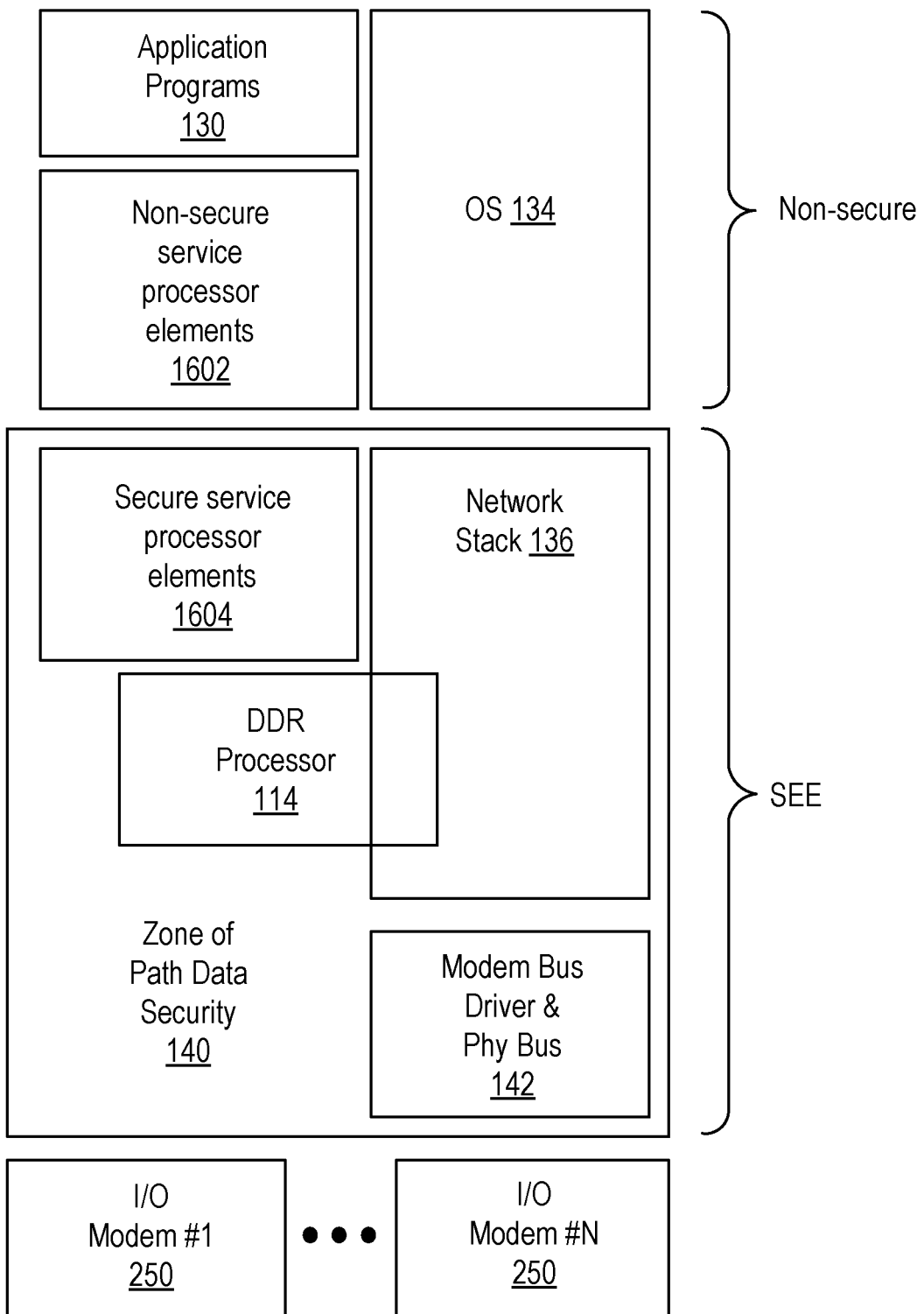
FIG. 16 illustrates an advanced wireless service platform end-to-end DDR reporting and processing system in accordance with some embodiments.

FIG. 16 illustrates an embodiment in which the secure execution environment (referred to in FIG. 16 as zone of data path security 140 or SEE) includes secure service processor elements 1604. FIG. 16 illustrates a number of I/O modems 250 for various device I/O ports numbered #1 through #N (e.g., possibly including but not limited to 2G, 3G, 4G, WiFi, Ethernet, USB, Firewire, Bluetooth, and NFC). Modem bus driver and physical layer bus 142 are located in the secure execution environment (zone of data path security 140), and thus the secure execution environment protects secure service processor elements 1604 and the data path between secure service processor elements 1604 and the device I/O ports. In some embodiments, secure service processor elements 1604 include the portions of the service processor that are desired to be protected from malware or unauthorized user tampering or configuration changes, including but not limited to the secure service processor elements responsible for policy enforcement, I/O port communication activity monitoring and reporting, I/O port communication control or traffic control, application activity monitoring, application control, application access control or traffic control, network destination monitoring and reporting, network destination access control or traffic control, and device environment monitoring and integrity verification. Network stack 136 is also shown in FIG. 16 in the secure execution environment, but in general not all of the network stack functions need to be implemented in the secure execution environment, provided that the data path below the monitoring point in secure service processor elements 1604 and I/O modems 250 is secured (e.g., unauthorized data path access is not available or allowed). In the embodiment shown in FIG. 16, secure service processor elements 1604 interact with network stack 136 to implement the various I/O port activity monitoring and control functions described herein. Non-secure service processor elements 1602 are also included but not limited to user interface elements.

In some embodiments, using secure execution environment partitioning technology, large portions or the entire service processor functionality are implemented in hardware secured execution environments in the APU or MPU. In some embodiments, using secure CPU partitioning technology, large portions or the entire Service Processor functionality are implemented in hardware secured execution environments in the APU or MPU. As an example embodiment, service processor functions that can be executed within a secure execution environment include policy enforcement actions in accordance with a set of policy instructions stored in the secure execution environment such as: managing policy for one or more of 2G, 3G or 4G network (and/or other I/O ports such as Ethernet, WiFi, USB, Firewire, Bluetooth, or NFC), wherein the policy management can include application access management, application traffic processing, application access monitoring and reporting, or application access service accounting and reporting. As another example embodiment, secure service processor element functions that can be executed within a secure execution environment include managing policy for one or more applications wherein the policy specifies whether to block, allow, or throttle the applications in accordance with a set of policy instructions stored in the secure execution environment. As another example embodiment, secure service processor element functions that can be executed within a secure execution environment include managing policy for one or more applications wherein the policy includes application activity monitoring and reporting or operating environment monitoring and reporting (e.g., monitoring the security status or presence of malware in the device operating environment). As another example embodiment, secure service processor element functions that can be executed within a secure execution environment include managing policy for one or more network destinations or resources that can include websites, domains, URLs, IP and/or TCP addresses, server names, other devices, or content sources, wherein the policy includes access management, traffic control, access monitoring or access service accounting. As another example embodiment, secure service processor element functions that can be executed within a secure execution environment include managing policy for one or more roaming access networks. As another example embodiment, secure service processor element functions that can be executed within a secure execution environment include monitoring and reporting communication activity on one or more device I/O connections including one or more of a 2G, 3G, 4G and/or other I/O port. In some embodiments, secure service processor element functions that can be executed within a secure execution environment include monitoring, classifying (e.g., identifying application and/or network destination associated with the I/O port activity) and reporting communication activity on one or more device I/O connections, including one or more of a 2G, 3G, 4G and/or other I/O port. In some embodiments, a service controller located in the network provides the set of policy instructions stored in the secure execution environment by communicating them to the secure service processor element via a secure communication link as described herein. In some embodiments, these policy enforcement actions involving reporting can include sending the reports to a service controller located in the network via a secure communication link into the secure execution environment as described herein for further processing of the reports. In some embodiments, sending the reports to a service controller located in the network via a secure communication link into the secure execution environment can include the authenticated secure sequencing and receipt protocols described herein.

As another example embodiment, secure service processor element functions that can be executed within a secure execution environment can include one or more of: (i) a secure application manager that identifies traffic associated with a specific application or group of applications to differentially manage one or more of 2G, 3G and 4G application access policies (e.g., allow, block, throttle, defer for later transmission, apply a given QoS level) or service usage accounting (and/or accounting for application access by one or more other I/O ports, such as Ethernet, WiFi, USB, Firewire, Bluetooth, or NFC), (ii) a secure application manager that identifies when an application is attempting to run and determines whether to permit the application to run or to not allow the application to run based on a set of application policies, (iii) a secure application manager that differentially manages 3G and 4G application access (and/or application access or service usage accounting for one or more other I/O ports) according to network access policy set by the service controller and network busy state determined on the device, and (iv) 3G and 4G network traffic that is classified and processed according to application identifier, layer 7 destination as well as layer 3/4 destination and network busy state. In some embodiments, securing such service processor functions can be augmented by: (i) configuring the secure execution environment with the various operating environment techniques disclosed herein so that the service processor achieves a similar degree of protection from hacking and malware described for lower levels of stack processing (e.g., the DDR processor SEE embodiments described herein), (ii) protecting or securing the data path between the DDR Processor (e.g., and/or elements of the service processor) and the modem antenna connection from circumvention or tampering by device malware, and (iii) providing sufficient secure or protected memory and sufficient secure execution environment CPU cycles to execute the more sophisticated data path processing functions.

In some embodiments, a secure communication between a network-based service controller and a device-based secure service processor element operating in a secure execution environment on a device connected to a wide area access network is used for secure (or trusted) delivery of secure service processor element I/O activity monitor records for one or more I/O ports (e.g., an I/O port including but not limited to 2G, 3G, 4G, Ethernet, WiFi, USB, Firewire, Bluetooth, or NFC), wherein the secure communication includes a secure message receipt feedback loop. In some embodiments, if the secure message feedback loop is interrupted, a secure service processor element secure communication channel error condition is detected and acted on. In some embodiments, an ordered sequence of secure service processor element I/O activity reports is communicated to a service controller using a signed or encrypted communication channel, and if the ordered sequence is interrupted or tampered with, a device secure service processor element secure communication channel error condition is detected and acted on. In some embodiments, the service controller observes the integrity of the ordered sequence of secure service processor element I/O activity reports to determine if device data records have been tampered with or omitted. In some embodiments, if the secure service processor element determines that the I/O activity monitor records have not been tampered with or omitted, the service controller sends back a signed or encrypted I/O activity monitor record receipt message. In some embodiments, if the secure service processor element determines that an I/O activity monitor record has been tampered with or omitted, the service controller sends back an error message or does not send back a signed or encrypted I/O activity monitor record receipt message. In some embodiments, if the secure service processor element receives an error message from the service controller, or does not receive a signed or encrypted I/O activity monitor record receipt message within a certain period of time or within a certain number of transmitted I/O activity monitor records or within a certain amount of communication information processed, then (i) a device configuration error message is generated for delivery to a security administrator or server, and/or (ii) one or more of the wireless network connections or other I/O connections or ports of the wireless communication device are either blocked or restricted to a pre-determined set of safe destinations. In this manner, if a device secure service processor element, the device operating environment, device operating system, or device software is tampered with in a manner that produces wireless network or other I/O port access service usage characteristics that are not compliant with expected policy or allowed policy, a device configuration error message can be generated, or device wireless network access or other I/O connection accesses can be restricted or blocked. Such embodiments can be helpful in securing device-based network access (or I/O control) policies and can also be helpful in identifying device software that has been tampered with or any malware that is present on the device. In some embodiments, the restriction on wireless network accesses or other I/O accesses results in access to a limited number of network destinations or resources sufficient to allow further analysis or troubleshooting of the device configuration error condition.

In some embodiments, the secure service processor element executing within a secure execution environment and communicating with a service controller via a secure communication link that includes a secure message receipt feedback loop observes device application and/or I/O port activity and generates one or more of the following device activity reports: service usage reports, service usage reports including service usage classification, application service usage reports, network destination service usage reports, service usage reports including network type identifiers, service usage reports including location identifiers, application access monitoring reports, application access service accounting reports, application activity monitoring reports, device operating environment monitoring reports.

In some embodiments, the secure service processor element executing within a secure execution environment and communicating with a service controller via a secure communication link that includes a secure message receipt feedback loop observes device application and/or I/O port activity and generates a roaming network service usage report.

In some embodiments, the service controller observes the secure service processor element I/O activity records to determine if the device is in compliance with a service controller policy condition. In some embodiments, determining whether the device is in compliance with the service controller policy condition comprises verifying that the device secure service processor element is properly implementing a device policy. In some embodiments, the device policy being verified is a network access service policy enforcement set. In some embodiments, the device policy that is verified is a network access service policy enforcement set comprising a network access service plan policy enforcement set, including a set of policies for one or more of network access control or traffic control, network application control, network destination control, network charging or accounting, and network service usage notification. In some embodiments, the device policy that is verified is whether or not the device application activity is in accordance with a set of pre-determined policies (e.g., determining if the applications that are accessing the network or other I/O ports are all allowed applications, or determining if the applications accessing the network or other I/O ports are behaving according to expected policy behavior). In some embodiments, the device policy verification includes whether the device is accessing approved or unapproved networks. In some embodiments, the device policy verification includes whether the device is communicating specified content via one or more allowed wireless connections or other I/O ports, or is communicating specified content over one or more wireless networks or I/O ports that are not allowed. In some embodiments, the device policy verification includes whether the device is communicating specified content via an allowed secure link over one or more wireless connections or other I/O ports, or is communicating specified content over an insecure link. In some embodiments, the device policy verification includes whether the device is communicating from an allowed location or from a location that is not allowed. In some embodiments, the device policy verification includes whether or not the device operating environment monitoring reports indicate that the device operating environment is free of any malicious software or erroneous operating conditions.

In some embodiments, secure service processor elements 1604 are implemented within a secure execution environment (zone of data path security 140) that is located on a SIM card. The various embodiments described in relation to FIGS. 9, 10 and 11 and the associated disclosures facilitate implementation of secure service processor elements 1604 on a SIM card by simply replacing DDR processor 114 by the secure service processor elements and adapting the embodiment descriptions, as would be understood by one of ordinary skill in the art. This allows sophisticated device wide area network access control or charging functions, as described in the context of the various secure service processor element embodiments, to be implemented on a SIM card that can controlled and distributed by a network operator.

Additional embodiments are now provided for various aspects of DDR Processor functional operations.

DDR Firmware Installation, Security Credential Configuration, and Update

Figure 12:
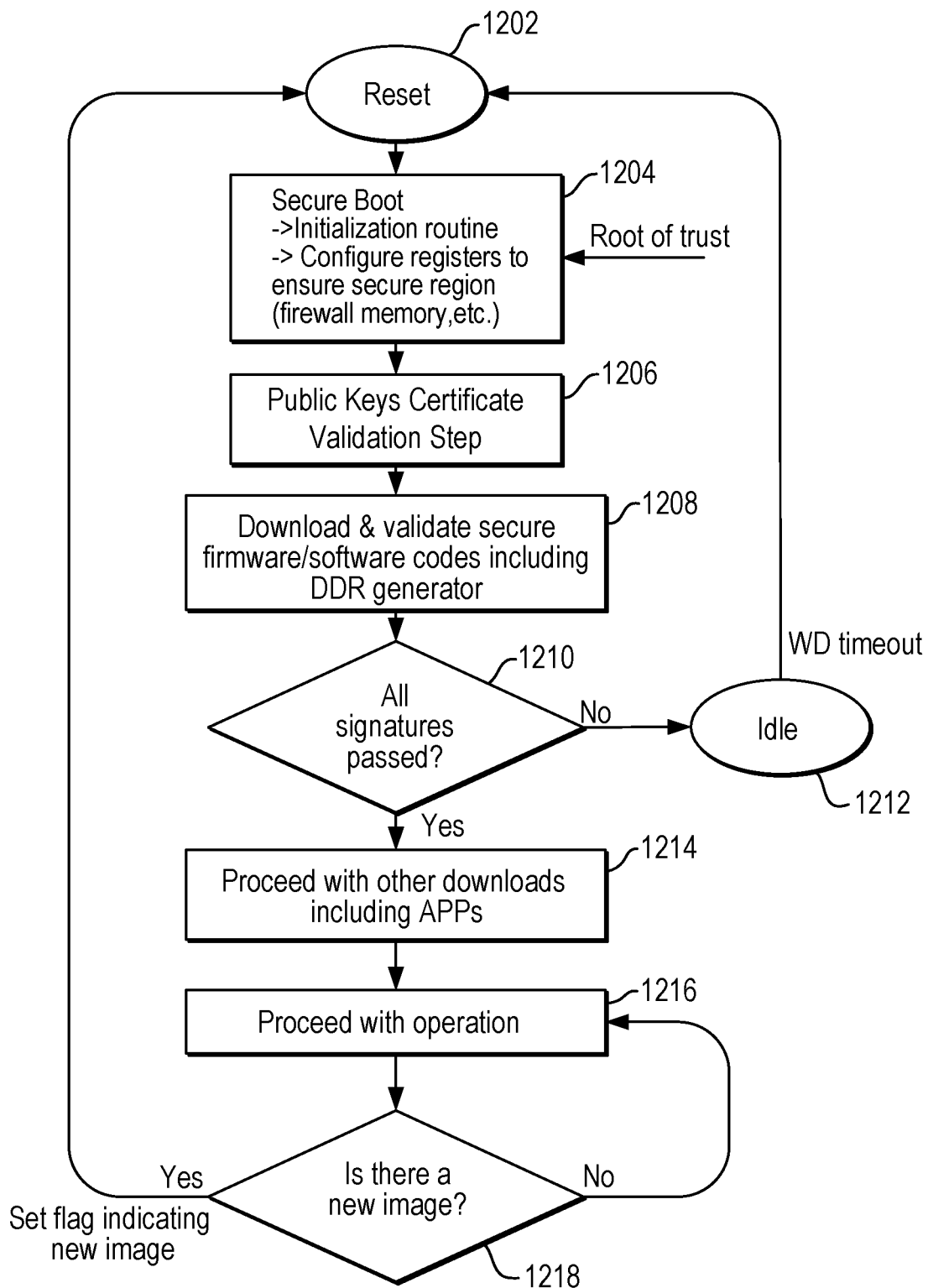
FIG. 12 illustrates a secure boot sequence flow diagram in accordance with some embodiments.

FIG. 12 illustrates a secure boot sequence flow diagram in accordance with some embodiments. In some embodiments, upon a reset and/or power up at 1202, the system (e.g., APU, SIM, and/or MPU, whichever the DDR is embedded on in the wireless communication device) starts by executing a secure boot (e.g., executing secure boot code) at 1204. As part of the secure boot, an initialization routine is performed to configure system parameters (e.g., configures registers to ensure secure region, such as HW/firmware firewall memory) to establish the secure/normal region boundary and interfaces. The secure boot code also has access to the root of trust, which is hidden to all other firmware/software. At 1206, a public keys certificate validation step is performed in which the secure boot downloads and verifies its own public key (e.g., using a hashing technique) and then downloads public keys of all secure codes at 1206. At 1208, the secure boot proceeds to download and verify/validate digital signatures of every secure software package (e.g., including the DDR Processor including a DDR generator) before allowing normal software routines to be downloaded. For example, this can be performed using a chain of trust built on the root of trust. At 1210, the secure boot determines if all signatures are properly validated. If any digital signature fails, then the secure boot stays looped in the idle state as shown at 1212 until it gets reset as shown at 1202 (e.g., watch dog timer expires) and/or the platform is flashed with a new image. If all of the digital signatures are properly validated, then the secure boot proceeds with other downloads (e.g., including applications) at 1214. Normal operation proceeds and the secure boot is completed at 1216. At 1218, whether there is a new image is determined. If not, then normal operation continues at 1216. When new secure software image is downloaded (e.g., the image is stored in new area of the flash memory with a "secure" flag set), and the system can return to reset state to have the secure boot reading the new image (e.g., based on the flag) and validate the digital signature of the image before it becomes the current image.

Mailbox Communication Channel Between the Service Processor and DDR Processor

Figure 13:
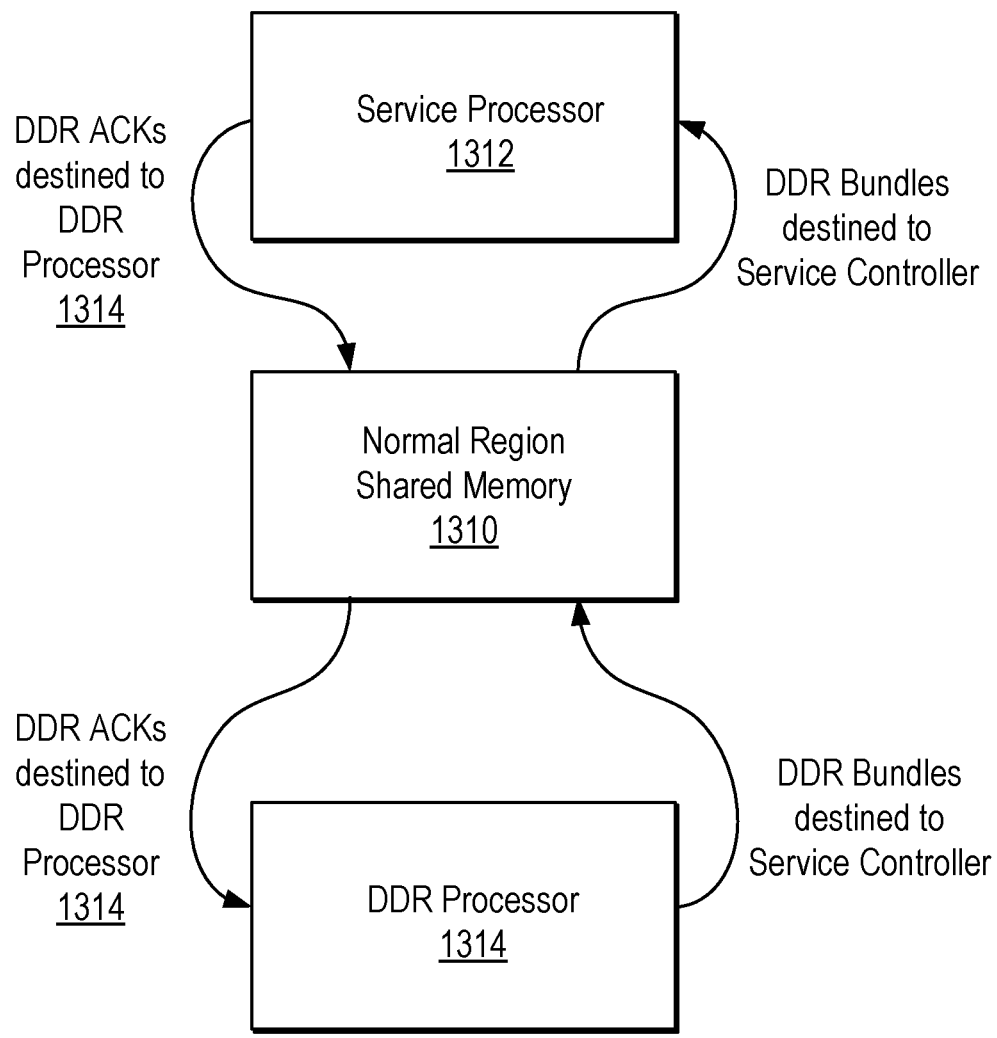
FIG. 13 illustrates a functional diagram for passing DDR Service Processor mailbox messages between secure and unsecure memory regions in accordance with some embodiments.

FIG. 13 illustrates a functional diagram for passing DDR Service Processor mailbox messages between secure and unsecure memory regions in accordance with some embodiments. In some embodiments, a logical communication channel between the DDR Processor 1314 and the Service Processor 1312 is provided in order to send secure DDR messages (e.g., DDR message bundles) to the Service Controller (e.g., via the Service Processor's communication agent). In some embodiments, this logical communication channel is referred to in various embodiments described herein as the DDR Mailbox Data functional element/block. For example, for ease of implementation, it can be assumed that the DDR processor does not have an IP address of its own hence can only send its message to the Service Controller through the Service Processor using this logical channel. The logical channel can be based on shared memory (e.g., normal region) architecture, shown as normal region shared memory 1310. As described herein with respect to various embodiments, the DDR messages are encrypted and can only be decrypted by the Service Controller. This logical channel can also be used for Service Controller to send down new DDR software updates.

In some embodiments, in which the DDR Processor is located in the APU, then the shared memory can be accessed via both Service Processor and DDR Processor using the APU's direct memory access (DMA) engines.

In some embodiments, in which the DDR Processor is located in the MPU, then a modem interface is provided to support an additional logical channel (e.g., USB endpoint for 2G/3G/4G) to satisfy this requirement. In some embodiments, the logical channel is piggybacked on top of an existing configuration and status channel that provides the control channel between the APU and the MPU.

DDR Processor Record Generator

In some embodiments, a DDR report spans a measurement period. Measurement periods are generally contiguous, meaning the next period begins immediately after the current period ends, with no traffic falling between periods. At the start of a period, all prior DDRs are deleted. During the period, the table of DDRs grows, since each observed IP flow creates an entry in the table. The period ends when either DDR storage exceeds a predefined threshold, or when a DDR report is requested by the Service Processor. DDR data not yet sent to the Service Processor application remains in memory across power cycles and battery pulls.

In some embodiments, at the end of the measurement period, the DDR report is prepared by the DDR Processor and sent to the Service Processor. For example, various secure communication and/or crypto techniques can be used to ensure that the contents of the report are kept private, and to ensure that any tampering with the DDR report will be detected by the Service Controller.

In some embodiments, the report also includes time stamps that identify the start and end of the measurement period. Timestamps are calibrated and confirmed via a periodic handshake with the Service Controller to ensure that the DDR Processor time base has not been altered. Data compression is used to minimize the size of the report.

In some embodiments, each DDR report message includes a unique sequence identifier that allows the Service Controller to determine if any DDRs have been blocked from the sequence. The report is stored by the Service Processor for subsequent forwarding to the Service Controller. Data stored by the Service Processor remains in memory across power cycles and battery pulls.

In some embodiments, the DDR processor resides in the modem where the secure DDR usage report is then sent to the Service Processor (e.g., communication agent within the Service Processor) to be sent to the Service Controller.

DDR Processor Access Controller

Figure 14:
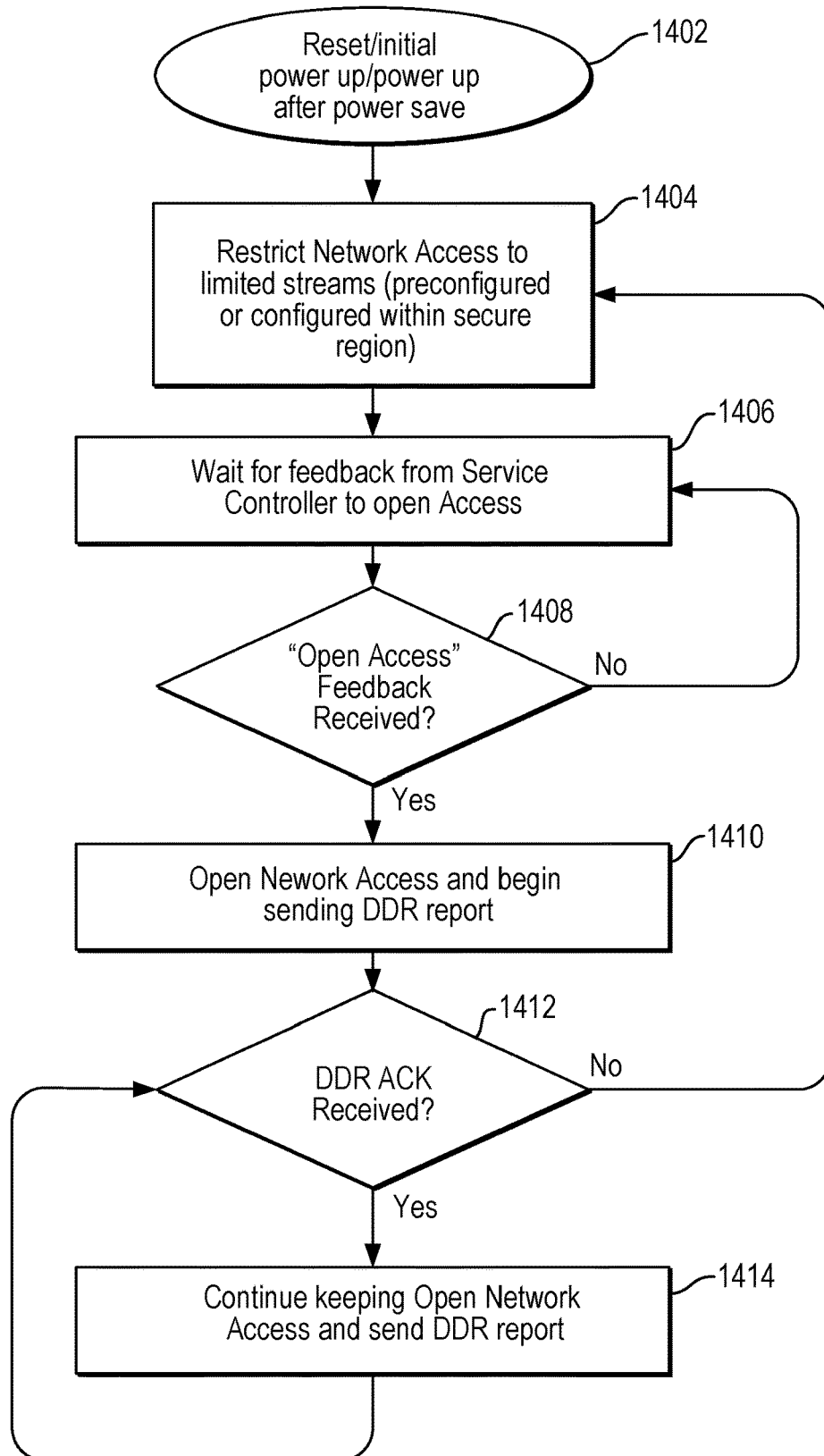
FIG. 14 illustrates a flow diagram for a DDR Processor Service Controller session authentication and verification in accordance with some embodiments.

FIG. 14 illustrates a flow diagram for a DDR Processor Service Controller session authentication and verification in accordance with some embodiments. In some embodiments, the DDR Processor includes an access controller function (e.g., Access Controller). In some embodiments, upon reset and/or powering up a DDR Processor access control function, such as the Access Controller, restricts network access (e.g., to only a few pre-configured IP addresses and/or host names including certain carrier/wireless service provider services).

In some embodiments, the Access Controller ensures that the Service Processor correctly delivers DDRs to the Service Controller. If the DDR flow is blocked or tampered with, then the Access Controller blocks cellular (e.g., or managed WiFi) wireless network access until the proper flow of DDRs is restored. In some embodiments, the network access restriction is only applied to networks that have network access services maintained and managed by the network operator. For example, this function can disabled for WiFi access that is not managed by the network operator.

In some embodiments, once a modem is authenticated (e.g., via a PPP session) via AAA, either after initial power up and/or after restoring from power save, the Access Controller restricts limited network access (e.g., based on set of IP addresses/host names and/or other criteria) until it gets feedback from the Service Controller to allow open access. Also, while traffic is running and the DDR Processor sending DDR records/reports, it continually expects to receive secure DDR ACK frames to allow open access, otherwise it enters a restrict access state again.

Referring now to FIG. 14, at reset and/or initial power up or power up after a power save mode, the process begins, as shown at 1402. At 1404, the Access Controller restricts network access to limited streams (e.g., preconfigured or configured within the secure region. At 1406, the Access Controller waits for feedback from the Service Controller to open network access. At 1408, whether the feedback is received from the Service Controller is determined. If not, then the process returns to 1406 to continue to wait for feedback from the Service Controller. If the feedback is received (e.g., and the secured Service Controller feedback is properly verified and/or validated, as described herein), then the Access Controller opens network access and DDR reports begin to be sent at 1410. At 1412, whether a DDR ACK frame is received in response to such DDR report(s) is determined. If not, then the process returns to 1404 and network access is restricted. If the DDR ACK frame is received (e.g., and the secured DDR ACK frame is properly verified and/or validated, as described herein), then the Access Controller continues to maintain open network access and to send DDR reports at 1414.

DDR Processor Network Busy State (NBS) Monitor

In some embodiments, the Network Busy State (NBS) Monitor is a secure firmware program element in the DDR Processor that monitors, records, and/or securely reports information on network busy state (e.g., or network congestion state) to the Service Controller for storage, network congestion analysis, and/or service charging and control policy security purposes. For example, the NBS Monitor can perform one or more of the following functions within the SEE: log active network information (e.g., active network type, home/roaming, current carrier, base station, and/or base station sector); monitor network access attempts and successes; monitor network speed; monitors round trip delay; monitor packet error rate; monitor modem performance parameters (e.g., RF channel, RF signal strength and variability, SNR, raw modem bit rate, raw modem bit error rate, and/or channel bandwidth); implements algorithm to classify busy state of network; and report network busy state history within DDRs.

Binding and Securing the Secure Communication Channel Between the DDR Processor and the Service Controller In some embodiments, binding and securing the secure communication channel between the DDR Processor and the Service Controller is provided as described below. The DDR Processor has a unique private/public key pair and a digital certificate (cert) that attests to the authenticity of its public key. The Service Controller has a unique private/public key pair. Its public key is well known and included in the DDR Processor code image. The DDR Processor sends its public key and cert to the Service Controller, and the two execute a key exchange process that authenticates each other and results in a secret, shared session key. The DDR Processor uses the session key to encrypt DDR reports it sends to the Service Controller and to append an integrity check to messages it sends to the Service Controller. The Service Controller uses the session key to append an integrity check to messages it sends to the DDR Processor.

As will now be apparent to one of ordinary skill in the art in view of the various embodiments described herein, various other secure communication and crypto techniques can be used to provide for binding and securing the secure communication between the DDR Processor and the Service Controller.

Binding and Securing the Secure Communication Channel Between the DDR Processor and the DPSV in an APU/MPU Implementation In some embodiments, binding and securing the secure communication channel between the DDR Processor and the DPSV in an APU/MPU implementation is provided as described below. The DPSV has a unique private/public key pair and a digital certificate (cert) that attests to the authenticity of its public key. The DDR processor has a unique private/public key pair and a digital certificate (cert) that attests to the authenticity of its public key. The DPSV and the DDR Processor exchange public keys and certs, then execute a key exchange process that authenticates each other and results in a secret, shared session key. The DDR Processor receives upstream network data flows from the device OS networking stack and, using the session key, it appends an integrity check to each upstream data message that it sends to the DPSV. The DPSV blocks any upstream data path information that does not have a valid integrity check from the DDR Processor and informs the DDR Processor that it is receiving invalid upstream data so that the DDR Processor may inform the Service Controller of a possible fraud event. The DPSV receives downstream network data flows and, using the session key, it appends an integrity check to each downstream data message that it sends to the DDR Processor. Each downstream data message is sequenced so that data messages cannot be blocked or replayed without being detected by the DDR Processor. If the DDR Processor receives a downstream data message with an invalid integrity check, the DDR Processor rejects the message and informs the Service Controller of a possible fraud event. The DDR Processor acknowledges each non-rejected downstream data message in the next upstream data message it sends to the DPSV. If the DPSV stops receiving downstream data message acknowledgements, it blocks downstream network data flows and informs the DDR Processor so that the DDR Processor may inform the Service Controller of a possible fraud event. The DDR Processor securely sends DDR reports to the Service Controller by way of the Service Processor as described herein. The DDRs transmitted from the DDR Processor to the Service Controller are integrity checked and sequenced in a manner that cannot be tampered with or replayed. An authentication process between the DDR Processor and the Service Controller combined with a set of unique DDR report sequence identifiers and authentication session keep alive timers are used to maintain and confirm the secure connection between the DDR Processor and the Service Controller. If the secure session or the flow of DDR records between the DDR Processor and the Service Controller are interrupted, then the Access Controller function in the DDR Processor restricts access of the 2G, 3G, or 4G modem data path to the network destinations necessary to reestablish a securely authenticated session with between the DDR and the Service Controller.

As will now be apparent to one of ordinary skill in the art in view of the various embodiments described herein, various other secure communication and crypto techniques can be used to provide for binding and securing the secure communication channel between the DDR Processor and the DPSV in an APU/MPU implementation.

Security Requirements for OEM Programming of DDR Processor

In some embodiments, code signing for the DDR Processor is provided. In particular, the DDR Processor code image is digitally signed by the device OEM. The signature is verified by the Secure Boot Loader using a fixed public key embedded within the Secure Boot Loader code image. This imposes the security requirement that the OEM operate a secure code-signing facility that preserves the secrecy of the fixed signing key. The OEM ensures that only authorized personnel are able to access the code-signing facility and that they do so only for legitimate DDR Processor images.

In some embodiments, a random seed for the DDR device private key is provided. In particular, at the time of device manufacture, a private/public key pair called the DDR Device Key is assigned. The DDR Device Key is unique to each device and is used to establish a secure communications link to the Service Controller. For example, the DDR Device Key can be a Diffie-Hellman key pair with a 1024-bit modulus, 1024-bit base, and a 128-bit private exponent. The private exponent of the DDR Device Key (DDR Device Private Key) is unique to each device and stored in, for example, 128 bits of on-chip nonvolatile memory (e.g., OTP memory) in the SEE. The modulus and base are common to all devices and are embedded within the DDR Processor image. The public portion of the DDR Device Key (e.g., DDR Device Public Key) is not permanently stored; instead, it is calculated by the DDR Processor using the modulus, base, and private exponent. The DDR Processor includes a factory initialization routine that is executed while the device is being initialized and tested at the factory. The factory initialization routine generates the DDR Device Private Key and programs it into the nonvolatile memory of the SEE. The DDR Device Private Key never leaves the device and is accessible only to the DDR Processor. The factory initialization routine computes the DDR Device Public Key and exports it to the factory tester. For example, the factory tester can provide a 128-bit random string to be used by the factory initialization routine as a seed to generate the DDR Device Private Key. This requires that the factory tester include or have access to a high-quality random bit source. Various suitable methods can be used, such as FIPS 140-2 ("deterministic random number generators") seeded with the output of a hardware random source.

In some embodiments, at the time of device manufacture, a digital certificate called the DDR Device Cert is assigned to the device. The DDR Device Cert is unique to each device and is used to establish a secure communications link to the Service Controller. The contents of the DDR Device Cert include the DDR Device Public Key. The DDR Device Cert is signed by the issuing certificate authority, and the signature is verified by the Service Controller when establishing a secure link. The DDR Device Cert is not sensitive information and, for example, can be stored in either on-chip or off-chip nonvolatile memory. The OEM issues a DDR Device Cert for the DDR Device Public Key exported by the factory initialization routine, which imposes the security requirement that the OEM operates, or has access to, a certificate authority (CA). If the OEM chooses to access an outsourced CA, then the OEM's primary obligation is to ensure that only authorized personnel are able to request certificates, and that they do so only for devices that have DDR Device Public Keys legitimately exported by the FI routine. If the OEM chooses to operate a CA, the OEM has the additional obligation of maintaining the security of the CA, specifically, preserving the secrecy of the CA's fixed key that signs certificates.

As will now be apparent to one of ordinary skill in the art in view of the various embodiments described herein, various other security techniques can be used or required for OEM programming for the DDR Processor.

Figure 15:
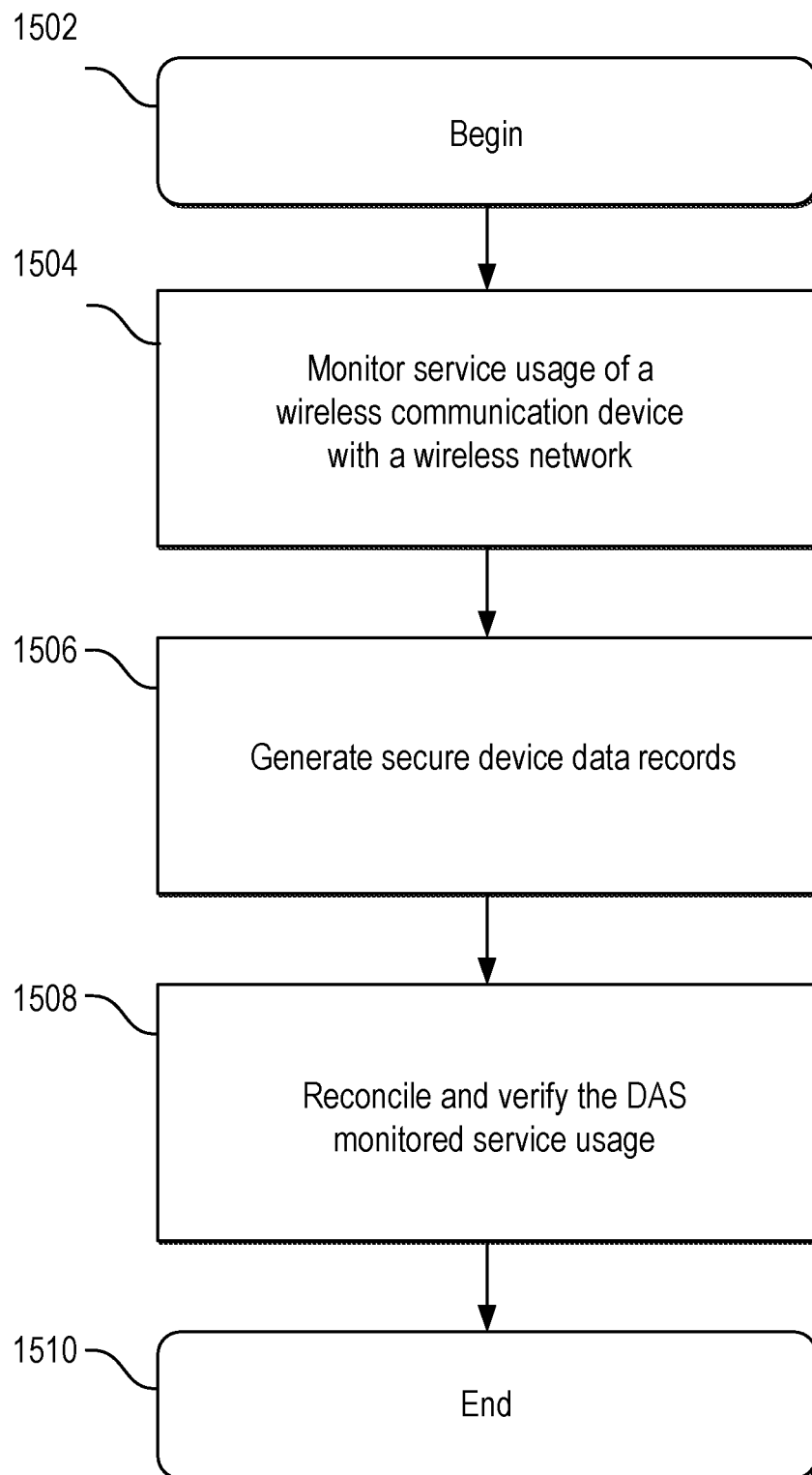
FIG. 15 illustrates a flow diagram for secure device data records for implementing device assisted services (DAS) in accordance with some embodiments.

FIG. 15 illustrates a flow diagram for secure device data records for implementing device assisted services (DAS) in accordance with some embodiments. At 1502, the process begins. At 1504, service usage of a wireless communication device with a wireless network is monitored (e.g., using DAS client based monitoring techniques, such as including the various techniques described herein for implementing secure DDRs). At 1506, secure device data records of the monitored service usage of the wireless communication device with the wireless network are generated. In some embodiments, each device data record is one of an ordered sequence of device data records with each sequential device data record providing an accounting of service usage over a service usage interval spanned by the device data record, and each device data record is associated with a secured unique sequence order identifier. At 1508, the device data records (DDRs) are reconciled and verified using the various reconciliation and verification techniques described herein. For example, the DDRs can be verified using the unique sequence order identifier (e.g., and various other integrity checking based techniques, as described herein with respect to various embodiments). As another example, the DDRs can be reconciled with other service usage reports by comparison with service processor reports (e.g., layer-7 classification reports) and/or by comparison with network based service usage reports (e.g., network flow records, such as CDRs or IPDRs), as described herein with respect to various embodiments. At 1510, the process ends (e.g., and can repeat for continued service usage monitoring).

Exemplary Service Policy Verification Combinations

In some embodiments, a communications device comprises: one or more communication I/O ports, at least one of which is a wide area network connection port; storage for storing a device communication activity policy; a secure execution environment that is not accessible by user application software; a one or more secure data path processing agents configured to: execute in the secure environment, monitor device data communications activity on one or more device I/O ports, generate a device data record that summarizes an aspect of the device communications activity that provides information suitable for verifying that a device policy enforcement client is properly implementing the device communication activity policy, and communicate the device data record via a trusted communication link over the wide area network connection port to a network element; and a trusted data path between the one or more secure data path processing agents and the one or more I/O ports that cannot be accessed by device user application software. In some embodiments, the data path is trusted because tampering with or alterations to data on the data path are detectable. In some embodiments, intermediate elements on the data path cannot alter or tamper with the data without detection. In some embodiments, the data path is trusted because data sent over it is signed. In some embodiments, the trusted data path between the one or more secure data path processing agents and the one or more I/O ports is further configured to secure communications by encryption.

In some such embodiments, the trusted communication link includes a secure message receipt feedback loop.

In some embodiments, the one or more secure data path processing agents are further configured to restrict the access of one or more device I/O ports, and if the secure message receipt feedback loop indicates an error, then the one or more secure data path processing agents restricts access of one or more device I/O ports. In some embodiments, the restriction of access for one or more device I/O ports allows communication to a network element configured to provide the device with error handling service when a secure message receipt feedback loop error condition exists.

In some embodiments, the communications device receives the device communication activity policy from a network element. In some embodiments, the device communication activity policy comprises an application activity monitoring policy. In some embodiments, the device communication activity policy comprises a network destination, address or resource monitoring policy.

In some embodiments, the information suitable for verifying that the device policy enforcement client is properly implementing the device communication activity policy comprises communication activity records for one or more device I/O ports.

In some embodiments, the secure execution environment and the one or more secure data path processing agents are located in a secure execution partition controlled by an application processor. In some embodiments, the secure execution environment and the one or more secure data path processing agents are located in a secure execution partition controlled by an operating system or secure partitioning software. In some embodiments, the secure execution environment and the one or more secure data path processing agents are located in a secure execution partition controlled by a modem processor. In some embodiments, the secure execution environment and the one or more secure data path processing agents are located on a SIM card.

In some embodiments, the wide area network is a wireless network, and the information suitable for verifying that the device policy enforcement client is properly implementing the device communication activity policy comprises device wireless network service usage records.

In some embodiments, the wide area network is a wireless network, and the device communication activity policy comprises a network access control policy for the wireless network. In some such embodiments, the wireless network access control policy is a set of one or more control policies for one or more applications operating on the device. In some embodiments, the wireless network access control policy is set of one or more specific access control policies for one or more network destinations, addresses or resources accessible over the wireless network. In some embodiments, the wireless network is a roaming network, and the network access control policy defines policies that are specific to a device roaming network connection condition and different than a home network connection condition.

In some embodiments, the wide area network is a wireless network and the device communication activity policy comprises a network access service usage accounting policy for the wireless network. In some such embodiments, the network access service usage accounting policy is a set of one or more service usage accounting policies for one or more applications operating on the device. In some embodiments, the network access service usage accounting policy is a set of one or more service usage accounting policies for one or more network destinations, addresses or resources accessible over the wireless network. In some embodiments, the wireless network is a roaming network, and the network access service usage accounting policy defines service usage accounting policies that are specific to a device roaming network connection condition and different than a home network connection condition. In some such embodiments, the device communication activity policy further comprises requesting an access network service cost acknowledgement or payment indication from a device user and restricting device roaming network access privileges if the user does not provide an service cost acknowledgement or payment indication.

In some embodiments, a network system comprises: memory configured to store a device communication activity policy; a trusted communication link over a wide area network to a one or more secure data path processing agents; a communication link over the wide area network to a device policy enforcement client; and a policy verification processor configured to (i) store the device data records, (ii) receive device data records from a communications device over the trusted communication link, the device data records containing information that summarizes an aspect of the device communications activity that provides information suitable for verifying that the device policy enforcement client is properly implementing the device communication activity policy, (iii) analyze the information contained in the device data record to determine if the device policy enforcement client is properly implementing the device communication activity policy, and (iv) take an error handling action if the analysis indicates that the device policy enforcement client is not properly implementing the device communication activity policy.

In some such embodiments, the trusted communication link includes a secure message receipt feedback loop. In some embodiments, the network system further comprises an error handling processor that detects when an error condition exists with the secure message receipt feedback loop, flags the error condition to an administrator or error tracking system, and communicates with the device to analyze the error or provide error messages to a device user.

In some embodiments, the network system communicates the device communication activity policy to the device. In some embodiments, the device communication activity policy comprises an application activity monitoring policy. In some embodiments, the device communication activity policy comprises a network destination, address or resource monitoring policy.

In some embodiments, the information suitable for verifying that the device policy enforcement client is properly implementing the device communication activity policy comprises communication activity records for one or more device I/O ports.

In some embodiments, the wide area network is a wireless network, and the information suitable for verifying that the device policy enforcement client is properly implementing the device communication activity policy comprises device wireless network service usage records.

In some embodiments, the wide area network is a wireless network, and the device communication activity policy comprises a network access control policy for the wireless network. In some such embodiments, the wireless network access control policy is a set of one or more control policies for one or more applications operating on the device. In some embodiments, the wireless network access control policy is a set of one or more specific access control policies for one or more network destinations, addresses or resources accessible over the wireless network. In some embodiments, the wireless network is a roaming network and the network access control policy defines policies that are specific to a device roaming network connection condition and different than a home network connection condition.

In some embodiments, the wide area network is a wireless network, and the device communication activity policy comprises a network access service usage accounting policy for the wireless network. In some such embodiments, the network access service usage accounting policy is a set of one or more service usage accounting policies for one or more applications operating on the device. In some embodiments, the network access service usage accounting policy is a set of one or more service usage accounting policies for one or more network destinations, addresses or resources accessible over the wireless network. In some embodiments, the wireless network is a roaming network and the network access service usage accounting policy defines service usage accounting policies that are specific to a device roaming network connection condition and different than a home network connection condition.

Exemplary Combinations Using a Receipt Feedback Loop

In some embodiments, a communications device comprises: one or more I/O ports, at least one of which is a wide area network connection port; a secure execution environment that cannot be accessed by user application software; a one or more secure data path processing agents configured to: (i) execute in the secure environment, (ii) monitor communication activity for one or more of the I/O ports, (iii) generate a device data record that summarizes an aspect of the device I/O port communication activity, (iv) communicate the device data record via a trusted communication link over the wide area network connection port to a network element, the trusted communication link comprising a secure message receipt feedback loop wherein the one or more secure data path processing agents receives a successful transmission receipt from the network element for data records that are successfully transmitted to and verified by the network element, (v) track transmitted device data records and successful transmission receipts received from the network element, and (vi) if one or more successful transmission receipts are not received for corresponding transmitted device data records within a specified event interval after sending the device data record to the network element over the trusted communication link, then restrict access of one or more device I/O ports; and a secure data path between the one or more secure data path processing agents and the one or more I/O ports that cannot be accessed by device user application software. In some such embodiments, the restriction of access for one or more device I/O ports still allows the communications device to communicate with a network element configured to provide the device with error handling service when a secure message receipt feedback loop error condition exists. In some such embodiments, the specified event interval comprises a period of time, a number of records transmitted, or a number of communications with the network element.

In some embodiments, the secure execution environment and one or more secure data path processing agents are located in a secure execution partition controlled by an application processor. In some embodiments, the secure execution environment and one or more secure data path processing agents are located in a secure execution partition controlled by a modem processor. In some embodiments, the secure execution environment and one or more secure data path processing agents are located on a SIM card.

In some embodiments, the aspect of the device I/O port communication activity that is summarized in the device data record comprises a summary of device application access activity. In some embodiments, the aspect of the device I/O port communication activity that is summarized in the device data record comprises a summary of device network access activity. In some embodiments, the aspect of the device I/O port communication activity that is summarized in the device data record comprises a summary of device content communication activity.

In some embodiments, a network system comprises: a trusted communication link over a wide area network to a one or more secure data path processing agents for the purpose of receiving device data records, the device data records comprising a summary of an aspect of the device I/O port communication activity, the trusted communication link comprising a secure message receipt feedback loop wherein the network based system transmits a successful transmission receipt to the one or more secure data path processing agents for data records that are successfully received by and verified by the network based system; and a storage system to store the device data records. In some embodiments, the network system further comprises an error handling processor that detects when an error condition exists with the secure message receipt feedback loop, and, after detecting an error, flags the error condition to an administrator or error tracking system. In some embodiments, the network system further comprises a system to communicate with the device during an error condition to analyze the error condition or provide error messages to a device user.

In some embodiments, the network system further comprises a device data record analyzer configured to: (i) store a device I/O port communication activity policy comprising allowable device I/O port communication behavior, (ii) compare device data records to the I/O port communication activity policy, and (iii) declare an I/O port activity error condition when the device data records indicate I/O port communication activity that is outside of the behavioral limits specified in the I/O port communication activity policy.

In some embodiments, the aspect of the device I/O port communication activity that is summarized in the device data record comprises a summary of device application access activity. In some embodiments, the aspect of the device I/O port communication activity that is summarized in the device data record comprises a summary of device network access activity. In some embodiments, the aspect of the device I/O port communication activity that is summarized in the device data record comprises a summary of device content communication activity.

Exemplary Combinations Using a SIM Card

In some embodiments, a communications device comprises: one or more communication I/O ports comprising at least a wide area network connection port; storage for storing a device communication activity policy; and a SIM card configured with: (i) a secure execution environment that is not accessible by user application software, (ii) one or more secure data path processing agents configured to execute in the secure execution environment and act on device data path communication to one or more of the I/O ports to enforce the device communication activity policy, and (iii) a trusted data path link for data path communication from the one or more secure data path processing agents to one or more I/O port modems, the one or more I/O port modems comprising a secure modem processor execution environment that is not accessible by user application software. In some embodiments, the one or more secure data path processing agents are further configured with a trusted communication link over the wide area network connection port to a network element.

In some such embodiments, the device communication activity policy is a device I/O port communication reporting policy, and the one or more secure data path processing agents are further configured to: (i) monitor and/or report communication activity conducted on the one or more I/O ports, (ii) create device data records that summarize the communication activity, and (iii) transmit the device data records to the network element over the trusted communication link. In some embodiments, the monitoring and/or reporting of communication activity comprises monitoring data usage. In some embodiments, the monitoring and/or reporting of data usage comprises a classification of the network destinations accessed in association with the data usage. In some embodiments, the monitoring and/or reporting of data usage comprises a classification of the device applications generating the data usage. In some embodiments, monitoring communication activity comprises monitoring roaming service usage. In some embodiments, monitoring communication activity comprises monitoring service usage for one or more QoS classes. In some embodiments, monitoring communication activity comprises monitoring voice usage.

In some embodiments, the service processor is further configured to gather application information from device agents.

In some embodiments, the device communication activity policy is device I/O port communication control policy and the service processor is further configured to: (i) monitor communication activity conducted on the one or more I/O ports, and (ii) enforce I/O port communication policy on the one or more I/O ports.

In some embodiments, the communication control policy specifies a control policy for one or more network destinations. In some embodiments, the communication control policy specifies a control policy for one or more device applications. In some embodiments, the communication control policy specifies a control policy for a roaming network. In some embodiments, the communication control policy specifies a control policy for a QoS service class.

In some embodiments, the trusted data path communication between the one or more secure data path processing agents and the one or more I/O port modems is secured by signing or encrypting with a shared key. In some embodiments, the one or more secure data path processing agents are further configured with a trusted communication link over the wide area network connection port to a network element, and the shared key is acquired from the network element.

Although the foregoing embodiments have been described in some detail for purposes of clarity of understanding, the invention is not limited to the details provided. There are many alternative ways of implementing the invention. The disclosed embodiments are illustrative and not restrictive.

INCORPORATION BY REFERENCE

This document incorporates by reference for all purposes the following non-provisional U.S. patent applications: application Ser. No. 12/380,778, filed Mar. 2, 2009, entitled VERIFIABLE DEVICE ASSISTED SERVICE USAGE BILLING WITH INTEGRATED ACCOUNTING, MEDIATION ACCOUNTING, AND MULTI-ACCOUNT, now U.S. Pat. No. 8,321,526 (issued Nov. 27, 2012); application Ser. No. 12/380,780, filed Mar. 2, 2009, entitled AUTOMATED DEVICE PROVISIONING AND ACTIVATION, now U.S. Pat. No. 8,839,388 (issued Sep. 16, 2014); application Ser. No. 12/695,019, filed Jan. 27, 2010, entitled DEVICE ASSISTED CDR CREATION, AGGREGATION, MEDIATION AND BILLING, now U.S. Pat. No. 8,275,830 (issued Sep. 25, 2012); application Ser. No. 12/695,020, filed Jan. 27, 2010, entitled ADAPTIVE AMBIENT SERVICES, now U.S. Pat. No. 8,406,748 (issued Mar. 26, 2013); application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013); application Ser. No. 12/694,451, filed Jan. 27, 2010, entitled DEVICE GROUP PARTITIONS AND SETTLEMENT PLATFORM, now U.S. Pat. No. 8,548,428 (issued Oct. 1, 2013); application Ser. No. 12/694,455, filed Jan. 27, 2010, entitled DEVICE ASSISTED SERVICES INSTALL, now U.S. Pat. No. 8,402,111 (issued Mar. 19, 2013); application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012); application Ser. No. 13/134,005, filed May 25, 2011, entitled SYSTEM AND METHOD FOR WIRELESS NETWORK OFFLOADING, now U.S. Pat. No. 8,635,335 (issued Jan. 21, 2014); application Ser. No. 13/134,028, filed May 25, 2011, entitled DEVICE-ASSISTED SERVICES FOR PROTECTING NETWORK CAPACITY, now U.S. Pat. No. 8,589,541 (issued Nov. 19, 2013); application Ser. No. 13/229,580, filed Sep. 9, 2011, entitled WIRELESS NETWORK SERVICE INTERFACES, now U.S. Pat. No. 8,626,115 (issued Jan. 7, 2014); application Ser. No. 13/237,827, filed Sep. 20, 2011, entitled ADAPTING NETWORK POLICIES BASED ON DEVICE SERVICE PROCESSOR CONFIGURATION, now U.S. Pat. No. 8,832,777 (issued Sep. 9, 2014); application Ser. No. 13/239,321, filed Sep. 21, 2011, entitled SERVICE OFFER SET PUBLISHING TO DEVICE AGENT WITH ON-DEVICE SERVICE SELECTION, now U.S. Pat. No. 8,898,293; application Ser. No. 13/248,028, filed Sep. 28, 2011, entitled ENTERPRISE ACCESS CONTROL AND ACCOUNTING ALLOCATION FOR ACCESS NETWORKS, now U.S. Pat. No. 8,924,469; application Ser. No. 13/248,025, filed Sep. 28, 2011, entitled SERVICE DESIGN CENTER FOR DEVICE ASSISTED SERVICES, now U.S. Pat. No. 8,924,543;

This document incorporates by reference for all purposes the following provisional patent applications: Provisional Application No. 61/206,354, filed Jan. 28, 2009, entitled SERVICES POLICY COMMUNICATION SYSTEM AND METHOD; Provisional Application No. 61/206,944, filed Feb. 4, 2009, entitled SERVICES POLICY COMMUNICATION SYSTEM AND METHOD; Provisional Application No. 61/207,393, filed Feb. 10, 2009, entitled SERVICES POLICY COMMUNICATION SYSTEM AND METHOD; and Provisional Application No. 61/207,739, entitled SERVICES POLICY COMMUNICATION SYSTEM AND METHOD, filed Feb. 13, 2009; Provisional Application No. 61/270,353, filed on Jul. 6, 2009, entitled DEVICE ASSISTED CDR CREATION, AGGREGATION, MEDIATION AND BILLING; Provisional Application No. 61/275,208, filed Aug. 25, 2009, entitled ADAPTIVE AMBIENT SERVICES; and Provisional Application No. 61/237,753, filed Aug. 28, 2009, entitled ADAPTIVE AMBIENT SERVICES; Provisional Application No. 61/252,151, filed Oct. 15, 2009, entitled SECURITY TECHNIQUES FOR DEVICE ASSISTED SERVICES; Provisional Application No. 61/252,153, filed Oct. 15, 2009, entitled DEVICE GROUP PARTITIONS AND SETTLEMENT PLATFORM; Provisional Application No. 61/264,120, filed Nov. 24, 2009, entitled DEVICE ASSISTED SERVICES INSTALL; Provisional Application No. 61/264,126, filed Nov. 24, 2009, entitled DEVICE ASSISTED SERVICES ACTIVITY MAP; Provisional Application No. 61/348,022, filed May 25, 2010, entitled DEVICE ASSISTED SERVICES FOR PROTECTING NETWORK CAPACITY; Provisional Application No. 61/381,159, filed Sep. 9, 2010, entitled DEVICE ASSISTED SERVICES FOR PROTECTING NETWORK CAPACITY; Provisional Application No. 61/381,162, filed Sep. 9, 2010, entitled SERVICE CONTROLLER INTERFACES AND WORKFLOWS; Provisional Application No. 61/384,456, filed Sep. 20, 2010, entitled SECURING SERVICE PROCESSOR WITH SPONSORED SIMS; Provisional Application No. 61/389,547, filed Oct. 4, 2010, entitled USER NOTIFICATIONS FOR DEVICE ASSISTED SERVICES; Provisional Application No. 61/385,020, filed Sep. 21, 2010, entitled SERVICE USAGE RECONCILIATION SYSTEM OVERVIEW; Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; Provisional Application No. 61/387,247, filed September 28, entitled SECURED DEVICE DATA RECORDS, 2010; Provisional Application No. 61/407,358, filed Oct. 27, 2010, entitled SERVICE CONTROLLER AND SERVICE PROCESSOR ARCHITECTURE; Provisional Application No. 61/418,507, filed Dec. 1, 2010, entitled APPLICATION SERVICE PROVIDER INTERFACE SYSTEM; Provisional Application No. 61/418,509, filed Dec. 1, 2010, entitled SERVICE USAGE REPORTING RECONCILIATION AND FRAUD DETECTION FOR DEVICE ASSISTED SERVICES; Provisional Application No. 61/420,727, filed Dec. 7, 2010, entitled SECURE DEVICE DATA RECORDS; Provisional Application No. 61/422,565, filed Dec. 13, 2010, entitled SERVICE DESIGN CENTER FOR DEVICE ASSISTED SERVICES; Provisional Application No. 61/422,572, filed Dec. 13, 2010, entitled SYSTEM INTERFACES AND WORKFLOWS FOR DEVICE ASSISTED SERVICES; Provisional Application No. 61/422,574, filed Dec. 13, 2010, entitled SECURITY AND FRAUD DETECTION FOR DEVICE ASSISTED SERVICES; Provisional Application No. 61/435,564, filed Jan. 24, 2011, entitled FRAMEWORK FOR DEVICE ASSISTED SERVICES; and Provisional Application No. 61/472,606, filed Apr. 6, 2011, entitled MANAGING SERVICE USER DISCOVERY AND SERVICE LAUNCH OBJECT PLACEMENT ON A DEVICE.

What is claimed is:

1. A communications device comprising:
    a wide area network port configured to connect the communications device to a wide area network;
    a memory configured to store a device communication activity policy;
    a secure execution environment configured to be inaccessible to a user application software; and
    a secure data path processing agent configured to:
        execute in the secure execution environment;
        monitor a device data communications activity, the device data communications activity being through the wide area network port;
        generate a device data record comprising information about the device data communications activity to assist a network element in determining whether the communications device is operating or has operated in accordance with the device communication activity policy; and
        send the device data record to the network element over a trusted communication link between the secure data path processing agent and the network element.

2. The communications device of claim 1, wherein the secure data path processing agent includes a device data record mailbox, wherein the device data record mailbox is configured to relay the device data record to an agent outside of the secure execution environment for transmission to the network element.

3. The communications device of claim 1, further comprising:
a subscriber identity module (SIM), wherein at least a portion of the SIM is within the secure execution environment.

4. The communications device of claim 3, wherein the secure data path processing agent resides on the SIM.

5. The communications device of claim 4, wherein the secure data path processing agent includes a data path security verifier.

6. The communications device of claim 1, further comprising:
an applications processor unit within the secure execution environment.

7. The communications device of claim 6, wherein the secure data path processing agent resides within the applications processor unit.

8. The communications device of claim 7, wherein the secure data path processing agent includes a data path security verifier in a wireless modem chipset of the communications device.

9. The communications device of claim 8, wherein the data path security verifier restricts network access to allow only monitored device data communications activity.

10. A method for use by a communications device including a wide area network port configured to connect the communications device to a wide area network, and further including a secure data path processing agent, a secure execution environment configured to be inaccessible to a user application software, and a memory configured to store a device communication activity policy, the method comprising:
executing, by the secure data path processing agent, in the secure execution environment;
monitoring, by the secure data path processing agent, a device data communications activity, the device data communications activity being through the wide area network port;
generating, by the secure data path processing agent, a device data record comprising information about the device data communications activity to assist a network element in determining whether the communications device is operating or has operated in accordance with the device communication activity policy; and
sending, by the secure data path processing agent, the device data record to the network element over a trusted communication link between the secure data path processing agent and the network element.

11. The method of claim 10, wherein the secure data path processing agent includes a device data record mailbox, and wherein the method further comprises:
relaying, using the device data record mailbox, the device data record to an agent outside of the secure execution environment for transmission to the network element.

12. The method of claim 10, the communications device further includes a subscriber identity module (SIM), and wherein at least a portion of the SIM is within the secure execution environment.

13. The method of claim 12, wherein the secure data path processing agent resides on the SIM.

14. The method of claim 13, wherein the secure data path processing agent includes a data path security verifier.

15. The method of claim 10, wherein the communications device further includes an applications processor unit within the secure execution environment.

16. The method of claim 15, wherein the secure data path processing agent resides within the applications processor unit.

17. The method of claim 16, wherein the secure data path processing agent includes a data path security verifier in a wireless modem chipset of the communications device.

18. The method of claim 17, further comprising:
restricting, using the data path security verifier, network access to allow only monitored device data communications activity.

* * * * *